(12) United States Patent
Fenner

(10) Patent No.: US 6,819,670 B1
(45) Date of Patent: *Nov. 16, 2004

(54) DATA PACKET ROUTING FOR MOBILE NETWORKS

(75) Inventor: Peter R. Fenner, Dallas County, TX (US)

(73) Assignee: Fenner Investments, Ltd., Richardson, TX (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/227,688

(22) Filed: Jan. 8, 1999

Related U.S. Application Data

(63) Continuation of application No. 08/174,361, filed on Dec. 28, 1993, now Pat. No. 5,860,136, which is a continuation-in-part of application No. 07/952,988, filed on Sep. 29, 1992, now Pat. No. 5,490,258, which is a continuation-in-part of application No. 07/737,147, filed on Jul. 29, 1991, now abandoned, which is a continuation-in-part of application No. 07/367,012, filed on Jun. 16, 1989, now Pat. No. 5,095,480.

(51) Int. Cl.[7] .......................... H04L 12/28; H04J 3/24
(52) U.S. Cl. ....................... 370/392; 270/400; 270/349
(58) Field of Search .............................. 370/404, 396, 370/217, 400, 349, 401, 392, 328, 397; 320/352, 238, 393, 353, 389, 331, 340, 349, 351, 415, 413; 455/428, 436, 439, 445, 39, 517, 524; 340/825.44

(56) References Cited

U.S. PATENT DOCUMENTS 3,355,556 A * 11/1967 Chaney ...................... 455/560
3,678,391 A *  7/1972 Gough ....................... 370/313
3,979,733 A     9/1976 Fraser
4,276,643 A *  6/1981 Laprie et al. ............... 370/351

(List continued on next page.)

FOREIGN PATENT DOCUMENTS

| EP | 0 255 767 A2 | 2/1988 |
| FR | 2513472 A | 3/1983 |
| GB | 2 189 112 A | 10/1987 |

OTHER PUBLICATIONS

Estrin, Deborah, "Interconnection Protocols for Interorganization Networks," Reprinted from IEEE J. Selected Areas Commun., vol. SAC–5, No. 9, pp. 1480–1491, Dec. 1987.

(List continued on next page.)

Primary Examiner—Hanh Nguyen
(74) Attorney, Agent, or Firm—Marc A. Hubbard; Munsch Hardt Kopf & Harr PC

(57) ABSTRACT

To provide fast access times with very large key fields, an associative memory utilizes a location addressable memory and lookup table to generate from a key the address in memory storing an associated record. The lookup tables, stored in memory, are constructed with the aid of arithmetic data compression methods to create a near perfect hashing of the keys. For encoding into the lookup table, keys are divided into a string of symbols. Each valid and invalid symbol is assigned an index value, such that the sum of valid index values for symbols of a particular key is a unique value that is used as an address to the memory storing the record associated with that key, and the sum of keys containing invalid index values point to a location in memory containing similar data. Utilizing the lookup tables set and relational operations maybe carried out that provide a user with a maximum number of key records resulting from a sequence of intersection, union and mask operations.

17 Claims, 32 Drawing Sheets

U.S. PATENT DOCUMENTS

| | | | |
|---|---|---|---|
| 4,494,230 A | | 1/1985 | Turner |
| 4,597,078 A | | 6/1986 | Kempf |
| 4,603,416 A | | 7/1986 | Servel et al. |
| 4,606,002 A | | 8/1986 | Waisman et al. |
| 4,644,351 A | * | 2/1987 | Zabarsky et al. ...... 340/825.44 |
| 4,661,951 A | | 4/1987 | Segarra |
| 4,706,081 A | | 11/1987 | Hart et al. |
| 4,742,511 A | | 5/1988 | Johnson |
| 4,797,881 A | | 1/1989 | Ben-Artzi |
| 4,812,843 A | * | 3/1989 | Champion, III et al. .... 340/905 |
| 4,833,701 A | * | 5/1989 | Comroe ...................... 455/509 |
| 4,843,622 A | * | 6/1989 | Yotsutani et al. ........... 455/456 |
| 4,866,431 A | * | 9/1989 | Andros et al. ......... 340/825.02 |
| 4,875,208 A | | 10/1989 | Furuhashi et al. |
| 4,887,265 A | | 12/1989 | Felix |
| 4,896,319 A | | 1/1990 | Lidinsky et al. |
| 4,912,756 A | | 3/1990 | Hop |
| 4,916,691 A | * | 4/1990 | Goodman ................... 370/389 |
| 4,922,503 A | | 5/1990 | Leone |
| 4,953,162 A | * | 8/1990 | Lyons et al. ................ 370/245 |
| 4,989,204 A | * | 1/1991 | Shimizu et al. ............. 370/328 |
| 5,095,480 A | * | 3/1992 | Fenner ...................... 370/94.1 |
| 5,168,498 A | * | 12/1992 | Adams et al. .............. 370/397 |
| 5,365,520 A | * | 11/1994 | Wang et al. ................ 370/217 |
| 5,490,258 A | | 2/1996 | Fenner |
| 5,842,224 A | * | 11/1998 | Fenner ....................... 370/396 |
| 5,860,136 A | * | 1/1999 | Fenner ....................... 370/396 |

OTHER PUBLICATIONS

Tsudik, Gene, "Implications of Fragmentation and Dynamic Routing for Internet Datagram Authentication," Networks and Distributed Systems Laboratory, Computer Science Department, University of Southern California and IBM Los Angeles Scientific Center, pp 22–30.

Tsuchiya, Paul F, "The Landmark Hierarchy: A New Hierarchy for Routing in Very Large Networks," The Mitre Corporation, pp. 35–42, 1988 ACM.

Shoch, John F., "Inter–Network Naming, Addressing, and Routing," Reprinted from IEEE Proc. COMPCON, pp. 72–79, 1978.

Deering, Stephen E., "Multicast Routing in Internetworks and Extended LANs," pp. 55–64, 1988 ACM.

Sunshine, Carl A., "Addressing Problems in Multi–Network Systems," Reprinted from IEEE Proc. INFOCOM, pp. 12–18, 1982.

Kleinrock, Leonard et al., "Hierarchical Routing for Large Networks, Performance Evaluation and Optimization," Reprinted from Computer Networks, vol. 1, pp. 155–174, Jan. 1977.

Elden, Walter L. et al., "LAN Interoperability Study of Protocols Needed for Distributed Command and Control," Final Technical Report, Mar. 1985.

Bartee, T.C. et al., "C31 Information Systems Internetwork Study," Institute for Defense Analyses, Apr. 1984.

G. Parr, "Address Resolution for an Intelligent Filtering Bridge Running on a Subnetted Ethernet System," Institute of Informatics, Computer Science Dept., 1987, pp. 48–70, Univ. of Ulster at Coleraine, County Londonderry, N. Ireland.

Wai Sum Lai, "Packet Forwarding," IEEE Communications Magazine, Jul. 12, 1988, pp. 8–17, vol. 26, No. 7.

G. Parr, "A More Fault Tolerant Approach to Address Resolution for a Multi–Lan System of Ethernets," Network Working Group, Request for Comments: 1029, May 12, 1988, pp. 1–16, University of Ulster.

* cited by examiner

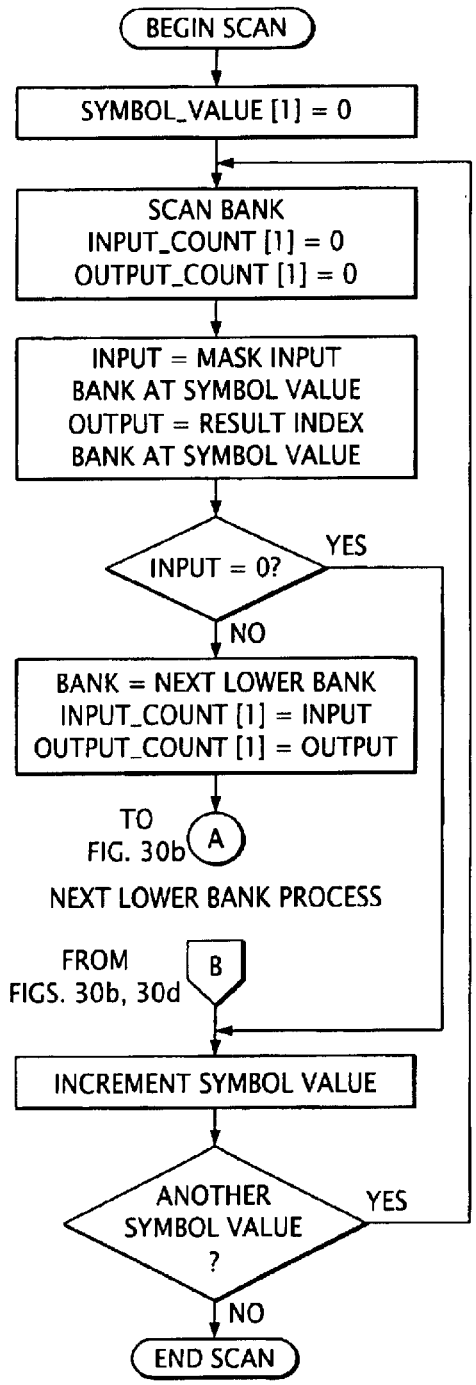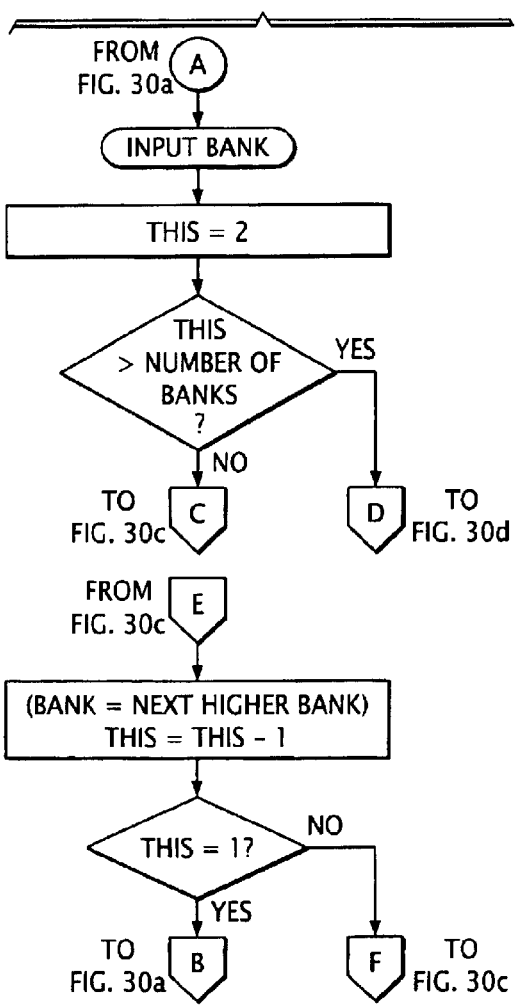

DATA PACKET ROUTING FOR MOBILE NETWORKS

RELATED APPLICATION

This application is a continuation of U.S. application Ser. No. 08/174,361, filed Dec. 28, 1993 now U.S. Pat. No. 5,860,136, which is a continuation-in-part of U.S. application Ser. No 07/952,988, filed on Sep. 29, 1992, now U.S. Pat. No. 5,490,258, which is a continuation-in-part of U.S. application Ser. No. 07/737,147, filed Jul. 29, 1991, now abandoned, which is a continuation-in-part of U.S. application Ser. No. 07/367,012, filed Jun. 16, 1989 now U.S. Pat. No. 5,095,480.

THE FIELD OF THE INVENTION

The present invention relates to associative memory systems, and more particularly to associative memory systems for handling large key set and spaces.

BACKGROUND OF THE INVENTION

Data communication between computers has become a standard part of worldwide networks in many areas of endeavors. These individual networks gather data about diverse subjects and exchange information of common interest among various media groups. Most of these networks are independent communication entities that are established to serve the needs of a particular group. Some use high speed connections while others use slow speed networks. Some use one type of protocol while others use a different type of protocol. Other well-known differences between networks also exist. There has been considerable effort expended in an attempt to make it possible to interconnect disparate physical networks and make them function as a coordinated unit.

Whether they provide connections between one computer and another or between terminals and computers, communication networks are divided basically into circuit-switched or packet-switched types. Circuit-switched networks operate by forming a dedicated connection between two points. Such a dedicated circuit could be represented by a telephone connected through a circuit from the originating phone to a local switching office, across trunk lines to a remote switching office and finally to the destination telephone. When that circuit is complete, no other communications can travel over the wires that form the circuit. The advantage of such circuit lies in the fact that once it is established, no other network activity will decrease the capacity of the circuit. The disadvantage is that concurrent communication cannot take place on the line or circuit.

Packet-switched networks take an entirely different approach. In such system, traffic on the network is divided into small segments of information called packets that are multiplexed on high capacity intermachine connections. Each packet carries identification that enables other units on the network to know whether they are to receive the data or are to transmit it to another destination. The chief advantage of packet-switching is that multiple communications among information sources such as computers can proceed concurrently with connections between machines being shared by all machines that are communicating. The disadvantage is that as activity increases, a given pair of communicating devices can use less of the network capacity.

A new technology has been developed that is called Internet and it accommodates information or communication networks having multiple, diverse underlying hardware technologies, or physical media protocols, by adding both physical connections and a new set of conventions. One of the problems with the use of Internet is that addresses refer to connections and not to the device itself that is sending the information. Thus, if a communication source, such as an aircraft for example, moves from one communication network to another, its Internet address must change. Specifically, if an aircraft is transmitting a particular location address code in one communication network in the Internet system and it moves to another, its Internet address must change. It is similar to a traveler who has a personal computer operating with a first communication network. If the computer is taken on a trip and connected into the information system after reaching the new destination, a new location address for the computer must be obtained for the new destination. It is also similar to moving a telephone from one location to another. A new telephone number must be assigned to the telephone at the new location. The telephone cannot be reached at the new location with the old number. Further, when routing a signal from one station to another through a plurality of nodes forming multipath connections, the message format contains a destination location address that is used to make the routing decisions. When the system has multiple addresses, the route taken by the packets traveling to a particular station address depends upon the location code embedded in the station address.

Thus, two problems occur in such message communication networks. The first is the requirement to change the address code of the communication source when it is at different locations in the network and the second is routing the message to the receiver if the address has changed. It can be seen, then, that with the presently existing system, if host A transmits a message to host B with a specific location code, by the time the message arrives at that location, host B may have moved to a new information processing network and changed its location code to conform to the new system and thus could not receive the message transmitted by host A. Host A must know that host B has entered the new information processing system and then must change the format of the new location address in order to contact host B.

The present system overcomes the disadvantages of the prior art by simply assigning a fixed, unique and unchanging identification code to both host A and host B. As host B enters into a new network access system, it transmits its identification code to the nearest node and all of the nodes interconnecting all of the disparate networks each store, with the unique identification code of host B, the address of those nodes which can communicate with host B so that a path can be completed through the nodes between host A and host B.

In the prior art, hierarchical logical routing is used to address highly mobile end-systems (computers on ships and aircraft, etc.) that are simultaneously connected to multiple communication paths and employ multicast message traffic. Hierarchical routing schemes have great difficulty solving this combined set of problems and a new approach must be used to overcome the difficulties in using hierarchical routing to meet the user's diverse requirements.

Further, in the prior art, a logical network address of larger than 32 bits was too large to be used as a directory access method to locate a receiver at a location address specified in the message format. Specialized hierarchical address structures which embed network location information have been employed to reduce the size of the access index to the routing table and also to reduce the size of the routing table. This approach couples the address structure to the Internet routing software design.

There are various "hidden assumptions" of hierarchical addressing. These "hidden assumptions" are (1) the processing load of the router CPU increases as the size of the routing table increases and (2) computer memory is a scarce and expensive resource. The present invention overcomes the first of these problems while computer memory technology has addressed the second problem by making very large memories cost effective.

Traditional approaches for designing a network address structure have either been intimately entwined in the design of efficient routing look-up tables or assigned by a central authority such as ARPANET. Neither of these approaches gives much if any thought to the needs, desires or ease of use of the group which must make operational use of the system. In an age of fourth generation database languages and high level compilers, network addresses are basically hand-coded in low level language. Addresses and address structures are difficult to change as a mobile end-unit moves from one communication network to another. Experts are often required to ensure that operational equipment is properly integrated into the system. ISO (International Standards Organization) addressing provides a basis for a much better approach but the overall design and administration of a network addressing structure must be elevated to an easily supported, user friendly, distributed architecture to effectively support the user's long-term needs.

Traditional directory access methods, whether for Internet routing, databases or compiler symbol tables, fall into three basic categories:

(1) Sorted Tables.

The keys are sorted by some rule which allows a particular search strategy (e.g., binary search) to locate the key. Associated with the key location is a pointer to the data. (2) Tree Structures.

Parts of the key field are used to traverse a tree data structure to a leaf node which holds the data or a pointer to the data.

(3) Hashing.

Some arithmetic function is applied to the key which compresses the key field into a chosen integer range which is the initial directory size. This integer is the index into the directory which usually contains a pointer to the data.

Each of these techniques has advantages and disadvantages when applied to the Internet routing table access design. Sorted tables provide the potentially most compact storage utilization at the cost of having access computations which grow with the number of addresses (keys) active in the system. Computations for sorted tables grow proportional to the log of the number of keys plus one. Using sorted tables, the router processing will slow down as the number of active addresses increases. But the desirable result is to make computation independent of the number of active addresses. It has been theorized, without providing a method, that a scheme to access sorted tables could exist which always allows access in two probes. To date, no methods have been proposed which approaches this theoretical result.

Tree data structures have been widely employed for directories, particularly for file systems, such as the UNIX file system where larger amounts of auxiliary disc storage is being managed. Trees offer access times that are proportional to the length of the address (key). Trees trade off memory space for processing load. More branches at each level decreases the processing but uses much more memory. For example, a binary tree uses two locations at each level for each bit in the address field for which there is an active address. The binary tree processing of an eight bit octet requires eight memory accesses as well as unpacking the bits from the octet. On the other hand, processing a 256 way tree takes one memory access using the address octet as an index at each level. A 256 way tree requires 256 locations at the next level for every different octet active (a valid value) at the current level. An address of six octets with ten valid octet values in each octet position would require $256 \times 10^6$ (256 million) locations, rapidly reaching an unrealizable size on current computer equipment. With current realizable computer memory sizes, pure tree structures do not appear to offer a viable structure for real time, address independent directory access method.

Hashing has often been used over the last several decades to create directories where fast access is desired. One system uses a multi-level hashing scheme as the file system directory structure. The Total database system is based on hashed key access. Many language compilers use hash tables to store symbols. Hash table schemes have good average access costs—often a single access, but can degrade drastically when the table becomes too full or the hashing function does not perform a good job of evenly distributing the keys across the table. Some techniques called "linear hashing" and "dynamic hashing" have provided the method of expanding the hash table when a particular bucket becomes too full instead of using the traditional linked list overflow methods. These techniques generally require about 40% more space than the number of active addresses (keys) to achieve single access speed without employing overflow methods.

All general hashing techniques use a variation of several common randomizing functions (such as dividing the key by a prime number and using the remainder) to "compress" the key field into a much smaller integer index into the hash table. Hashing functions have traditionally been viewed as one-way, randomized mapping of the key set into the hash space. The index computed by the hashing function could not be used to reconstruct the key. If for a particular hash function there exists a reciprocal function which maps the index to the unique key which generated the index, then the compressed keys could be stored in the directory.

The present invention overcomes the disadvantages of the prior art by considering a flat, as opposed to hierarchical, logical routing address space with unique identifiers assigned to each transmitter and receiver to vastly simplify the modern communication problems of addressing highly mobile end-systems which are simultaneously connected to multiple communication paths and employ multicast message traffic.

Further, the present invention employs a reversible arithmetic code compression technique to reduce the logical network address of up to 128 bits to a unique integer value which preserves any hierarchical ordering of the network address.

Also, the present invention employs dynamic hashing and memory allocation techniques to automatically adjust the size of the routing table directory and routing records to accommodate the number of end-system addresses currently active in the communication system. These techniques provide a selection of approaches to allow graceful degradation of the routing efficiency when the memory available for routing tables is full.

Finally, the system improves over the prior art by using a message format that is structure independent of the location of the destination of the message receiver.

Arithmetic coding, when applied to addresses as known length keys, provides several advantages for table look-up when the addresses are known or can be learned in advance as they are in communications applications. The proposed arithmetic coding routing table design provides direct support for mobile, multi-homed, shared network end-systems employing multicast and unicast messaging while minimizing the effects of the "hidden assumptions" that have lead to reducing the routing table size by embracing hierarchical routing schemes.

First, the identification encoding parameter tables are easily constructed by counting the occurrence of a particular symbol value and the accumulative distribution over all octet occurrences. That is, the tables are scaled to the statistical occurrence of each octet value. When a "bucket" overflows, dynamic hashing approaches can be used to expand the directory or parameter tables.

Secondly, arithmetic coding can be constructed to operate on each symbol position in the address field as it arrives, allowing processing to begin as soon as the first address symbol arrives.

Thirdly, arithmetic coding preserves the hierarchical (left to right precedence) of the ISO addresses being encoded. This is desirable if an Internet router only has knowledge of the network address but the Internet header carries the full destination address of a succeeding system node.

Finally, a constant known set of computations is required for each symbol of the address field independent of the number of address symbols or the number of active Internet addresses.

These features make the arithmetic coding used herein an ideal candidate for the routing table directory structure that is independent of a location address in a router, gate way or end-system.

The present invention provides a very fast, automatically expandable, source filtered Internet routing scheme totally independent of the internal logical or physical structure of the network addresses in the message format that it is routing. Addresses are just unique identification numbers represented by a string of symbols of known length. Each Internet router learns the location of these numbers within the network from the Internet protocol traffic, from the source addresses of the packets it receives, and from a network management protocol.

Address independent routing tables provides the following direct benefits:

They provide a very fast routing table access scheme that is capable of supporting fast packet switch designs for very high speed media such as FDDI (i.e., routers which begin the outbound transmission of the packet as soon as possible after receiving the Internet header and before the whole packet has been received).

They allow source address filtering for efficient multicast operation and security partitioning of the network.

They allow independent automatic generation of network addresses from a user name space by a network name service. This facilitates using the same Internet software in disconnected networks with different addressing authorities and different address structures.

They allow for orderly expansion, restructuring and redesign of the user name space without changing the Internet code or table structure.

They reduce initial system procurement and logistic support costs because no special coding is needed for different networks.

They reduce life cycle system costs because the Internet routers automatically adapt to network changes and they can be expanded without routing table modification.

The present invention combines arithmetic coding with dynamic hashing to provide a very high speed method and system for detecting the 48 bit physical addresses in a Media Access Controller (MAC). The present system guarantees the acceptance or rejection of a frame. This technique always performs address detection functions within the transmission time of the address field plus a small fixed number of octet clocks depending on the logic implementation chosen. Specifically, the present system provides the following features: (1) variable length addresses with no known internal structure and processed with a number of memory accesses and a processing time proportional to the number of octets in the address field; (2) the size of the routing tables is directly proportional to the number of active addresses known to the router and within the practical limits of currently available microprocessing systems; (3) and the computational operations required to access the routing table for any address is linearly proportional to the length of the address field and these computations are reasonably performed by currently available microprocessor systems.

SUMMARY OF THE INVENTION

Thus the present invention relates to a system for routing a message between a source and a destination and which utilizes a message format that is structure-independent of the location of the message destination, said system comprising at least a first signal transceiver device having only a first fixed unique identification code wherever the transceiver device may be located; at least a second signal transceiver device for communicating with the first transceiver device and having only a second fixed unique identification code wherever the second transceiver device may be located; and routing nodes for coupling a transmitted signal from the first transceiver device to the second transceiver device at an unknown physical location within the system using a routing message format containing only the first and second transceiver fixed unique identification codes and addresses of the routing nodes with a message format that is structure-independent of any transceiver location code.

Another aspect of the invention is an apparatus and method for implementing a routing table directory to provide for fast access times to look up routing information. This apparatus is an application of a novel associative memory utilizing arithmetic coding to associate a key presented to the memory with a record stored in the memory, but has a very-wide range of application in many different types of data processing systems. The associative memory includes an index table stored in memory and a record memory for storing the records of data. The index table is constructed such that each symbol of a key, a key being divided into a string of symbols and each symbol being defined by its position within the key and its value, addresses an index value in the index table memory. These index values are assigned such that the sum of index values for a given key is a unique value that is used to address the record memory. Several methods and apparatus are disclosed the permit random assignment of index values to new keys as they are presented, as well as for keys that are presented in sorted order for addition to the memory.

Another aspect of the invention provides a method and apparatus for utilizing use-count tables created by the arithmetic coding process to determine the maximum number of key sets resulting from the set operations union and intersection, used to combine two or more different key sets. The intersection of the key for two or more relational database tables is essentially the relational join operations. This method can perform the relational join operations in a much faster and efficient method than presently utilized joined operations.

BRIEF DESCRIPTION OF THE DRAWINGS

The present invention will be more fully understood in connection with the accompanying drawings in which:

FIGS. 30A thru 30D are flow diagrams of the highest thru lowest order bank functions.

DETAILED DESCRIPTION OF THE DRAWINGS

Figure 1:
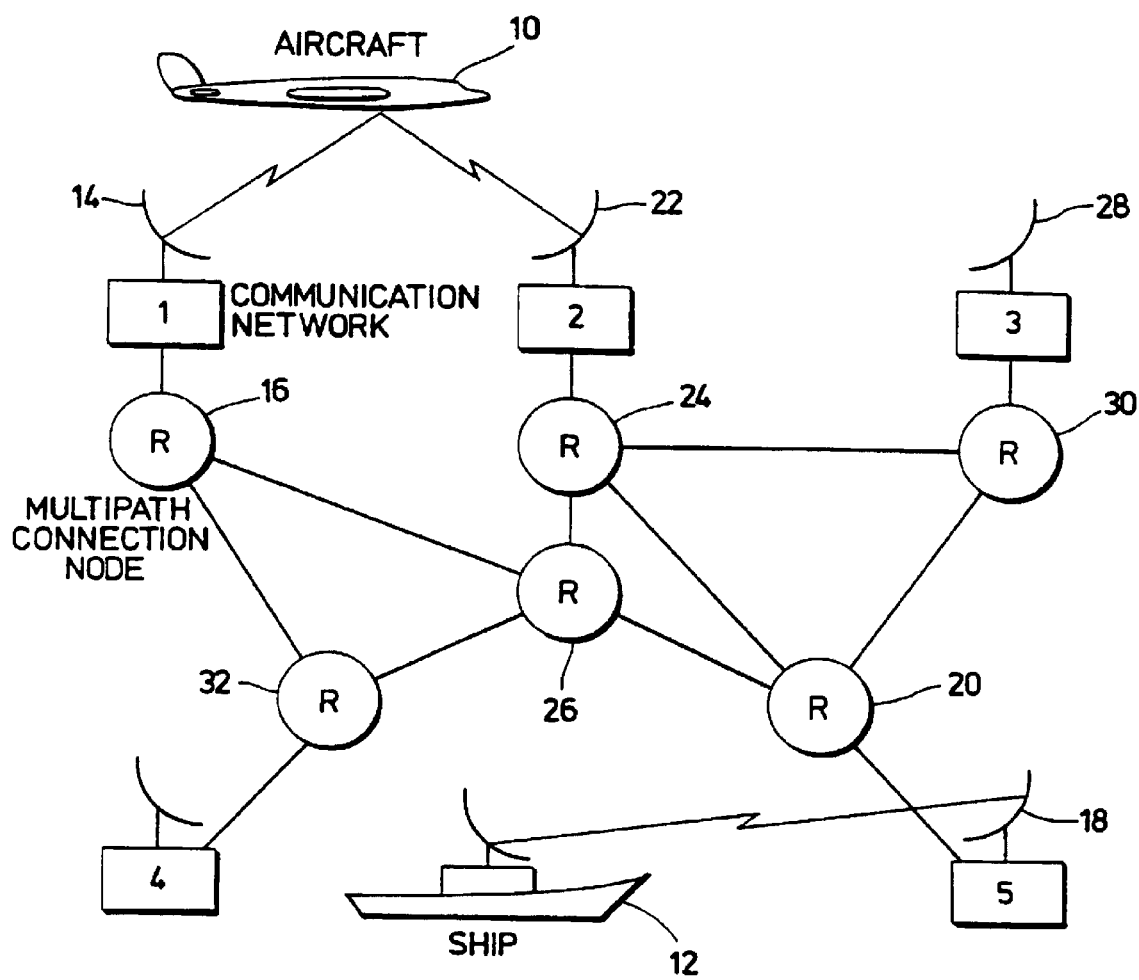
FIG. 1 is a general diagrammatic representation of an Internet communication system that, as used in the prior art, uses information handling nodes and network addresses for each host that must be changed as the host moves from one communication network to another thereby requiring a complex and cumbersome system to enable data communication from a message transmitting host to a system receiving host; when modified by the present invention, the system of FIG. 1 enables a message routing system using a message format having an internal logical or physical structure that is totally independent of the message receiving host location address.

There are many communication networks existing today which are independent entities with respect to each other such as shown in FIG. 1. Each system 1–5 uses a particular hardware technology appropriate for its own communication problems; some use high speed networks; others use slower speed networks to interconnect machines. There are long haul networks and local area networks (LANS). There are shared media networks such as ETHERNET, TOKEN RING, TOKEN BUS, FDDI and the like, each of which has a different physical media protocol. Each of these network information systems may have its own protocol for handling information within the system.

When electrical wires or cables are used to couple shared media networks, the size of the net is limited by signal attenuation to a few hundred meters; thus, the name Local Area Networks. There is no reason to limit the area of coverage other than the restrictions of the media itself. With the increased use of fiber optics, the span of these shared media networks is expanding to several kilometers and eventually will be able to span the entire continent.

In the prior art, when an external device or host such as an aircraft 10, ship 12 or other receiver/transmitter (transceiver) station is communicating with anyone of these systems 1–5, it must have an identification of its own which is recognized by the protocol of the system with which it is communicating. In such systems, if aircraft 10 wishes to communicate with ship 12, aircraft 10 must transmit into the system, among other things, a fixed address of the message receiving ship 12. The protocol of the system can then use the address information to route the message through the system to the ship 12 at the address indicated.

However, when a host passes from one communication system to another, the address code of that host must be changed to be conformed with or admitted to the new communication system. Thus, if a host passes from an FDDI to an ETHERNET system, the address code of the host must be changed in order to enable the new system to accommodate it. This change may require a great deal of manipulation of data within the system and require expensive additional equipment to enable the appropriate changes to be made. Further, by the time one host (ship 12) sends a message to the last known address of the moving host (aircraft 10), the moving host may have entered the range of a new communication network and have a different address code thereby causing a problem in receiving the message sent with a network dependent address from the message sending host.

The present invention modifies the system of FIG. 1 to overcome the disadvantages of the prior art by allowing each host to have a fixed unique identification code instead of an address code which changes to identify itself with whatever communication network it may operating. With the present invention, if host A passes from a first communication network system to a second network system (as for instance aircraft 10 flying from communication network 1 to network 2) host A may be located by host B (ship 12) who simply transmits into the communication routing system the unique identification code of the host A with which it desires to communicate. It does not know where in the system, or in a plurality of interconnected communication systems, the host A is located.

The interconnecting systems shown in FIG. 1 include a plurality of nodes 16, 20, 24, 26, 30 and 32 forming multipath connections between the plurality of network communication systems 1–5. The nodes can interface with each other even though they are in different communication systems simply by using protocols and procedures that are well-known in the art.

If aircraft 10 desires to contact ship 12, it simply transmits a message format including its own unique code and the unique identification code for ship 12 to the nearest system 14. The receiving system 14 sends the message to node 18 which checks its memory tables to determine if it has stored the address of the last node (26 or 32) communicating with ship 12. If not, it stores the unique identification code of aircraft 10. It also forwards to all interconnecting nodes, except the one from which the message was received, 26 and 32 in this case, the message including the identification code of ship 12 as well as the identification code of aircraft 10. In like manner, each of the interconnecting nodes 26 and 32 checks its memory storage tables to see if it has received and stored the identification code for either aircraft 10 or ship 12. If not stored, it stores the unique identification code of aircraft 10 and the address of the forwarding node, and forwards that information to the succeeding nodes. Thus node 26 forwards that information to nodes 20 and 24 but would not forward it to node 32 since node 32 is also coupled to node 16 which has that information. Node 20 will be updated by node 26 since it is the closest node. Eventually, ship 12 will contact its nearest node 20 coupled to communication network system 5 through radio receiver 18 to identify itself. Source node 20 has the unique identification code for aircraft 10 stored in its memory table and will store the identification code and received route for ship 12 in its memory table. Node 20 will now contact the nearest node 26 from which it received the identification code for aircraft 10 and couple ship 12 to that node. Node 26 again will check its memory bank and find the nearest node from which it had received the identification code for aircraft 10 (node 16). A communication path is thus completed between aircraft 10 and ship 12 and they can communicate with each other even though initially one did not know the location of the other in the system. It will be noted that in this case there were no specific address locations of either aircraft 10 or ship 12 in any of the message formats that were transmitted or received.

They simply contained the identification code of the message source and message receiver that was stored by the nodes and the addresses of each node in the path having that information, and the information was recalled as necessary to establish communication paths between aircraft 10 and ship 12.

If ship 12 is moving and passes from the control of a first network communication system 4 to a second network communication system 5, the nearest node 32 in the first communication system 4, after a predetermined period of time, drops from its memory bank the identification code and routing information of ship 12. However, the transmission by ship 12 of its identification code to the nearest node 20 in the second communication system 5 is recorded by that node and transmitted to the other nodes throughout the interconnected system so that each node now knows the updated location of node 20 that is nearest to ship 12. In that manner, either aircraft 10 or ship 12, even though either or both are moving, can continually communicate with each other through an interconnected system of communication networks without having the specific system address of the other.

Since any given node may receive information from one or more nodes, standard protocol is used to determine the node from which the given node first received the information. That would be the closest node. If, in the event of a transmission back along that path, it was found that the closest node was for some reason out of the system, it could then pick one of the other possible routes and send the information to a different node along one of those routes.

Further, each of the nodes must be able to recognize when a message is for a single node (unicast), a group of nodes (multicast) or all nodes (broadcast). Such requirements can be accomplished by systems that are already well-known in the art.

Further, each node is an information source to some nodes and an information destination for other nodes. Thus, each node has to keep a source index table and a destination index table. See FIG. 2. When aircraft 10 attempts to contact ship 12, aircraft 10 transmits into the nearest node its own identification code as well as the identification code of ship 12. The nearest node stores the source (aircraft 10) identification code in a source index table and in a destination index table. If a node has the destination identification code stored, it also has stored the address of the node from which it received that information in both its source protection record and destination route record. Of course, it may have received that information from several nodes and the addresses of all of those nodes are stored as sources and destinations. The source protection record, when combined with the destination route record, eliminates the routes to all of the other nodes except the nearest route through the use of a buffered routing logic circuit. Thus a path is connected between the two closest nodes for carrying the packet of information from aircraft 10 to the next nearest node. This process repeats in each node until the information packet arrives at ship 12.

Referring again to FIG. 1, as aircraft 10 is detected by receiver 14, the identification code information transmitted by aircraft 10 is fed into a communication network or system 1 and node or router 16 notifies the other nodes or routers in the system of the identification code. In like manner, as receiver 18 detects ship or vessel 12, communication network or system 5 updates node or router 20 with the ship 12 identification code. It, in turn, notifies the other nodes or routers within the complex communication network or system. As receiver 22 detects the movement of aircraft 10 into its area, communication network or system 2 updates node or router 24 which then updates the other nodes or routers within the system. Node 16 no longer receives information from system 1 but now updates its information from system 2 through nodes or routers 24 and 26. As aircraft 10 continues to move, receiver 28 will detect aircraft 10 and notify router 30 through system 3. Again, router 30 notifies the other nodes or routers within the system. Node or router 24 will no longer receive its information from network 2 but will be updated through router 30 as to the identification code of aircraft 10.

The problem with such vehicle movement with the prior art system, as stated, is that each of the communication systems 1–5 are different networks and may use different types of media access protocols for operation which require the network address of the moving vehicle to be changed. Thus many communication networks service their stationary and mobile users with a wide variety of media ranging from satellite links, high frequency radio, local area networks (LANS) and dedicated point to point circuits as illustrated in FIG. 1. Shipboard LANS, including SAFENET I (IEEE 802.5 Token Ring) and SAFENET II (ANSI X.3-139FDDI), are used to support command, control, communications and intelligence in certain systems. The use of standard ISO (International Standards Organization) Internet protocols and the development of very high performance, low latency packet-switched gate ways between these networks is critical to reliable communications between mobile vehicles.

As stated, in the prior art, the aircraft 10 must have assigned to it a code representing its physical address with respect to communication system 1. Physical addresses are associated with interface hardware. Thus, moving the hardware interface to a new machine or replacing a hardware interface that has failed changes the physical address of a particular host. In like manner, as the aircraft moves from system 1 to system 2 in FIG. 1, because system 2 may operate with a different media access protocol, the coding of the physical address of aircraft 10 must be changed to meet the standards of system 2. This means that if ship 12 attempts to communicate with aircraft 10 using the physical address at the last known address location in system 1, it cannot locate aircraft 10 without a new location code because aircraft 10 has moved into a new communication system network and has changed its physical address code.

The novel system of the present invention modifies FIG. 1 to provide an Internet routing table that uses a flat logical address structure to provide fast and efficient route processing of both multicast and unicast message traffic. In the present system, the physical address structure is removed from the design and operation of the Internet routing by treating the message addresses as a symbol string without predetermined internal structure and processing them as if they are a unique identification code representing the host. This approach is made possible by employing an arithmetic code compression technique as a hashing function for the routing table access method. By managing and manipulating logical network addresses within the system, mobile end-systems can keep the same network identification code (not physical address) as they move from communication network to communication network. similarly, group or multicast addresses may be allocated without regard to their physical network connection. Thus, considering the use of the present system with the networks of FIG. 1, aircraft 10 and ship 12 maintain the same identification code even though they move from one of the networks 1–5 to another. When aircraft 10 is in communication with network 1, node 16 notifies all of the other nodes 20, 24, 26, 30 and 32 in the system that node 16 is in contact with aircraft 10. In a like manner, when ship 12 is in communication with node 20 through network system 5, node 20 notifies the other nodes in the system that it is in communication with ship 12. If aircraft 10 moves to network system 2, node 24 updates all of the other nodes in the system and their data is changed to identify node 24 as the new node in contact with aircraft 10. This system then enables each node to store data representing the address of the last node communicating with a particular mobile vehicle and not the physical address of the vehicle. This allows communication from aircraft 10 to ship 12 throughout the various communication systems without either aircraft 10 or ship 12 being required to change network addresses as they move from access point to access point and without knowing the specific network location of the other.

Each of the nodes 16, 20, 24, 26, 30 and 32, may utilize any well-known means in the art for providing point-to-point and demand assignment access protocol message transmissions to communicate with each other. There are various systems well-known in the art which allow communication network systems using one protocol to communicate with another system using a second protocol and they will not be described here.

The present system may be utilized as a Media Access Controller (MAC) multi-way switch in each node as an electronic module which detects the physical layer node address fields of the data packets arriving from one node and uses those addresses to route (switch or bridge) the packet to another node which is a path to the physical station with a particular node destination address. The MAC level multi-way switch examines the bits which constitute the node destination address field to identify which, if any, of the nodes connected to the switch should be presented the message packet for transmission. This operation is often called "destination address filtering."

A number of shared media networks previously mentioned have been standardized for common use and inter-operation of different vendor equipment. The most common of the LAN standards are ETHERNET, TOKEN BUS, TOKEN RING AND FDDI. Each of these shared media networks sends information as a variable length sequence of bits called a packet. Each packet has a fixed number of the initial bits transmitted which are dedicated both in position and size to a packet header. This header contains a destination address field and a source address field along with other housekeeping information bits. All four of the LAN standards listed above employ the same number of bits with the same meaning for both the source and destination address fields, although the housekeeping fields are different for each.

Shared media networks operate basically in the same way. The media is shared so only one node or station (one MAC) may transmit at a time and all of the other nodes or stations listen. In order to identify the recipient of the message, a destination node address is located in a specific location at the beginning of each information frame. Each listening station examines these destination node address bits to determine if the packet is for it. The receiving station (the destination node) needs to know where to send a response to the received packet and thus the packet has source node address bits at a specific location (usually just after the destination node address). The major differences in the various LAN standards are transmission speed and the scheme each uses to guarantee that only one station at a time is allowed to transmit on the media.

The Media Access Controller (MAC) is the defined entity in each of the above-listed LAN standards which connects the computer side logical level interface to the physical media. MAC isolates the logical data stream from the physical media so the circuitry on the computer side of the MAC only deals with the header and information bits.

Thus, the MAC-level switch or bridge is an electronic module which connects similar or dissimilar physical shared media networks each of which employ identical addressing field definitions. The switch transfers information packets originating from stations or nodes on one network to destination stations or nodes on another network. If station A on a shared media network desires to send a packet to station F, then station A places codes representing "F" in the destination node address field and "A" in the source node address field of the packet header of the packet being transmitted. When the MAC of station A gains access to the shared media, it transmits the packet along with other packets it may have queued for transmission. Other connected MACs all receive the packet header and examine the destination node address field. Station F recognizes the address as his own and receives the remainder of the packet. All of the other stations on the network see that the packet is not for them and disregard the rest of the packet. Neither the source node address nor the destination node address are changed in any way.

All of the standard LANS listed above have a group addressing scheme where one station may send one packet simultaneously to many other stations belonging to the group. This feature is called multicast and takes advantage of the shared media to send the packet just once rather than having to send an individual packet to each station in the group. Suppose station A wishes to send a packet to all stations in a group identified as 110 which includes stations identified as F, G and N. Station A would then put the group "110" in the destination node address field and "A" in the source node address field. When MAC A gains access to the first network, it transmit the packet. Stations F, G and N would then detect their group address and accept the packet. Other MACs would not.

Figure 2:
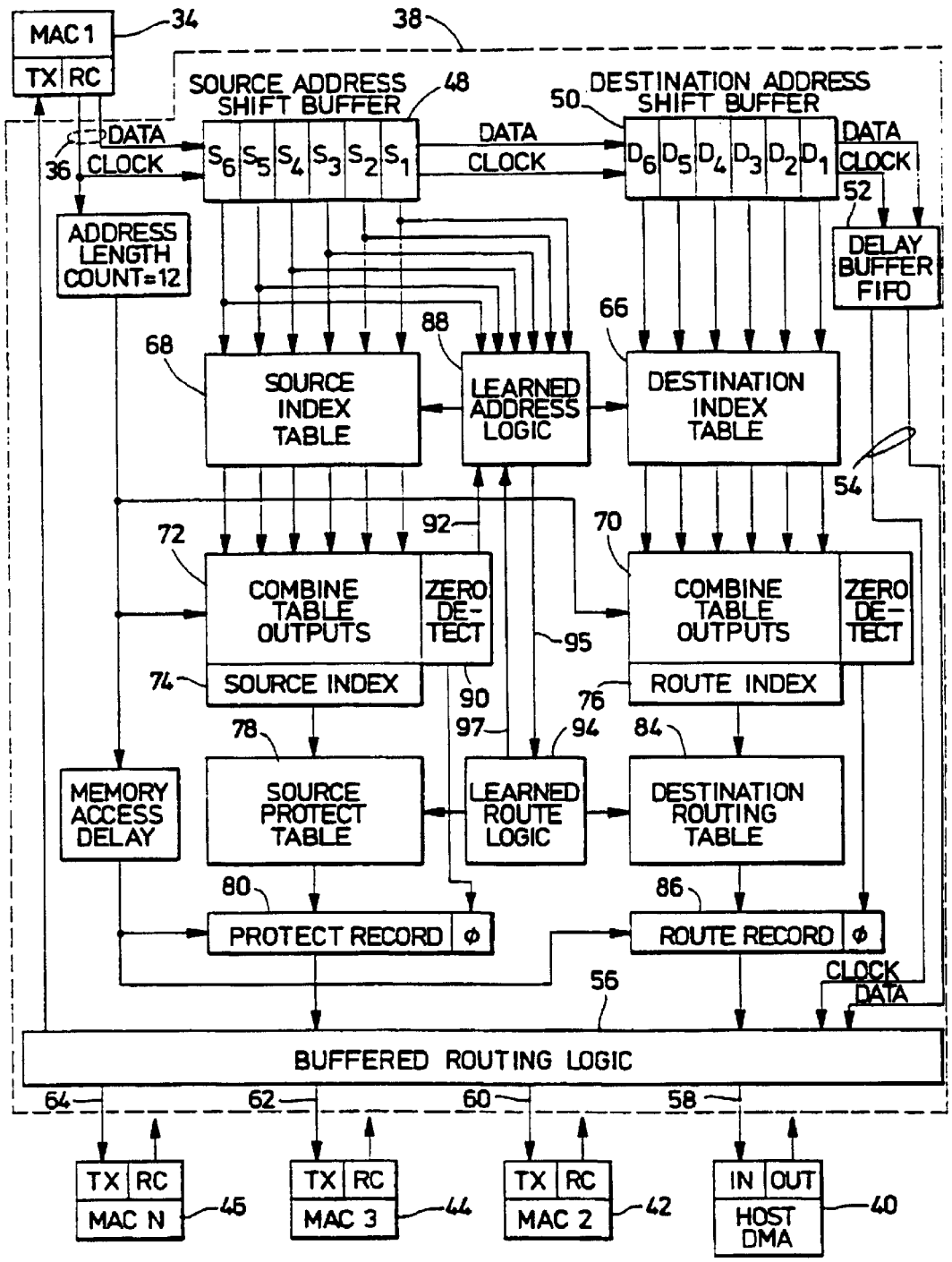
FIG. 2 is a schematic representation of the circuitry in an individual system node using parallel processing to detect the address of the next node or nodes in the system that are to receive a packet of information.

FIG. 2 is a schematic diagram of a MAC switch 38 which couples a Media Access Controller 34 at one node level to desired Media Access Controllers 40, 42, 44 and 46 at other levels.

The MAC level switch 38 shown in FIG. 2 examines the source node address field of the incoming information to determine if any or all of the other connected nodes are protected from receiving the information from the incoming source. This operation is often called "source address filtering."

Thus in FIG. 2, MAC 34 may transmit data and clock information on lines 36 to switch 38 which determines which of the destination MACs 40, 42, 44 and 46 are to receive the information. In switch 38, the data and clock signals on line 36 are serially coupled to a source address shift buffer 48 and then to destination address shift buffer 50. The data is then transferred from destination shift buffer 50 to delay buffer 52 which is a first-in, first-out device. The output of delay buffer 52 on line 54 is coupled to the buffer routing logic 56 which generates an output on lines 58, 60, 62 and 64 depending upon the destination address filtering operation performed by the switch 38.

The Media Access Controller switch 38 transmits or forwards data it receives, and accepts data for transmission as eight parallel data bits called a data octet. It processes address symbols which are a fixed number of consecutive bits from the address bit string and may be from two to any number of bits in length. One size symbol is the "eight" bit octet which is the symbol size used in the address routing table circuits presented in FIGS. 2 and 3. The number of symbols in the maximum address length to be processed for a particular implementation is a design and management decision. The examples presented in FIGS. 2 and 3 use six octets as the maximum address length, since this is the length of the IEEE standard physical layer (MAC level) address used by Ethernet, Token Ring, and FDDI. The International Standards Organization (ISO) network layer (IP.ISO 124) employs a variable length, up to 20 octets, for the source and destination address 128 and 126, as shown in FIG. 4. The designs shown in FIG. 2 and FIG. 3 would be able to process IP.ISO 124 addresses 126, 128 up to "six" octets in length. MAC 38 is responsible for aligning the data properly on the octet boundaries such that the destination and source addresses start and end on octet boundaries. Furthermore, in the LAN standards listed above, the source address field always immediately follows the destination address field and the two are always the same size. A common size for the address fields is 48 bits or 6 octets each. The address detection logic examines both the destination and source address fields represented by the octets shifted into buffer 48 and buffer 50. Six octets are in each buffer. When the twelve octets are all stored, each octet is used as an address into a 256 element index table for that address octet position. This requires six destination index tables 66 and six source index tables 68. The output of these tables (the contents of the location addressed by each octet) is then arithmetically combined in combiners 70 and 72. One method of arithmetically combining these outputs adds the six outputs of the source index table 68 to compute the source index 74. It also adds the six destination table 66 outputs to compute the route index 76. The source index 74 is used as the address into the source protect table 78 and the output of that location is the source protection record 80 which is coupled to the routing logic 82. Similarly, the route index 76 is used as the address of a location in the destination routing table 84 and the contents of that location is coupled to route record 86. The outputs of the protect record 80 and route record 86 are used by the routing logic 56 in a well-known manner to determine which destination MAC is to receive the message.

FIG. 2 may also operate as an internet level switch (router) 38, operating on IP.ISO header 124 destination 126 and source addresses 128 by shifting in the IP destination and source addresses. When aircraft 10 in FIG. 1 transmits a packet with its unique internet source identification code to one of the nodes in a network, the source address of aircraft 10 is shifted from source address buffer 48 (FIG. 2) into learned address logic 88. If that source address is a new address not stored in source index table as indicated by a zero detect, it is stored in both the source and destination index tables 66 and 68. If, after a predetermined amount of time, that information is not confirmed by a subsequent transmission, the learned route logic 94 generates an output 97 to the learned address logic 88 telling it to delete the address from the both source and destination index tables 66 and 68. This means that the aircraft 10 has moved to a different network and may be updating a new node in the new network. Subsequently, the new network node then sends a message to switch 38 in the old node and stores the source address of the new node in the route record 86 associated with the unique source address for aircraft 10. By keeping track of the source addresses of the various nodes that are transmitting information concerning a particular identification code, learned route logic 94 causes the destination routing table 84 to delete old source nodes as destinations for particular incoming data packets and add the addresses of new nodes as the destination. The source protect table 78 in each node stores the source protect record 80 (also called the MultiCast Record List 134 in FIG. 4), which has information defining a shortest path from a particular source to that node. This shortest path information is computed from the messages received from forwarding nodes using a shortest path spanning tree algorithm well known in the art. The source protect record 80 may be modified by management decision to prevent messages from a particular source identification code from being forwarded on particular paths to other nodes.

The destination routing table 84 (also called the Outbound Record Linked List 132 in FIG. 4) contains the shortest path information from this node to the current connected nodes for each unique identification code currently stored in the source and destination index tables. The current route record 86 is this shortest path information for the destination address currently in buffer 50. This information is computed from the messages received from forwarding nodes using a shortest path spanning tree algorithm well known in the art. Thus, in FIG. 1, if node 26 has received information from source nodes 16, 24 and 32, and it receives a data packet for node 20, the protect record 80 from the source protect table 78 and the route record 86 in FIG. 2, when processed by the buffered routing logic 56, will prevent node 26 from transmitting the information back to nodes 16, 24 and 32 but allow it to be transmitted to the destination node 20. Thus, the information from an incoming node or MAC 34 to a particular switch 38 may be transferred to the desired destination MAC 40, 42, 44 or 46 by the buffered routing logic 56 in the manner explained.

In FIG. 2, the address detection logic employs separate tables and arithmetic processing elements for both the source and destination address detection. While this approach allows the arithmetic processing and record table access to be relatively slow the slower elements are not sufficiently economical in price to be cost effective. Neither does the circuit of FIG. 2 utilize the fact that because the data octets arrive sequentially, they could be processed through the index look-up table and partial arithmetic computed each octet time.

Figure 3:
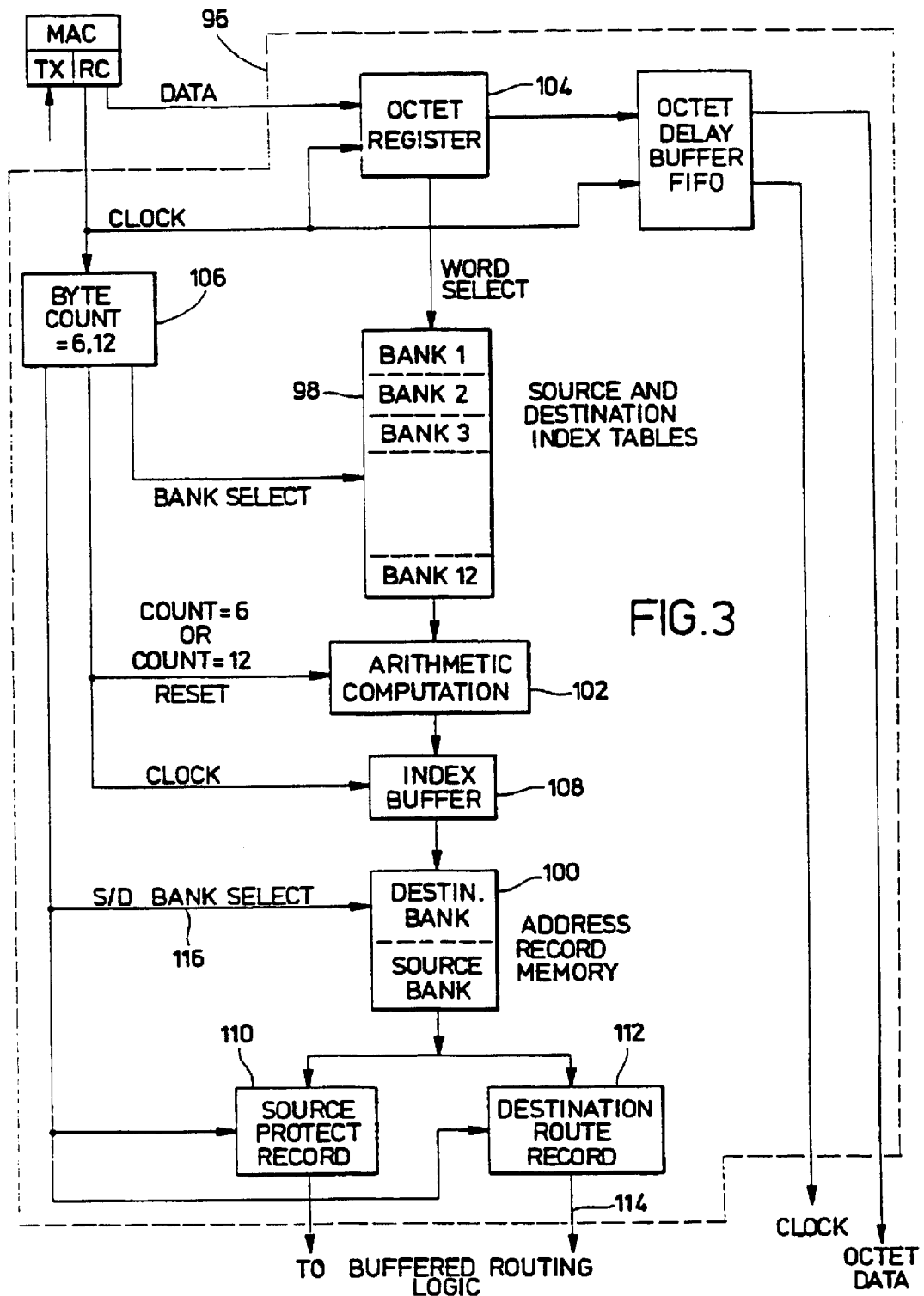
FIG. 3 is a schematic representation of an alternate circuit using serial processing at any particular node in the system to determine the address of any other node or nodes that are to receive the data packet.
Figure 4:
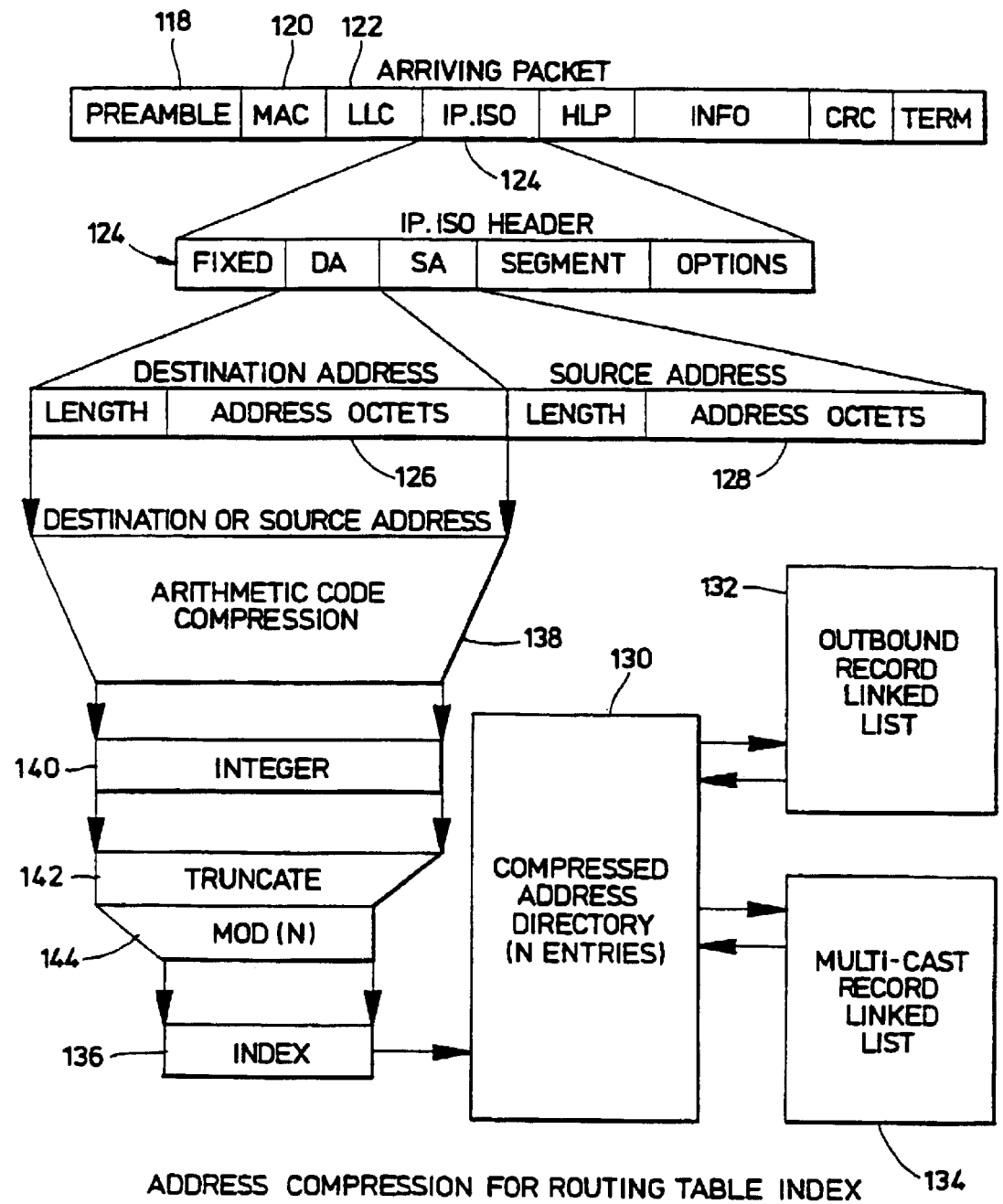
FIG. 4 is a diagrammatic representation of the circuitry for enabling the message format used by the routing system to be totally independent of the internal logical or physical structure of the address of the receiving host to whom the message format is being routed and further illustrates the manner in which a destination address or source address can be compressed to provide a usable index for accessing the address directory.

FIG. 3 is a circuit diagram of an alternate logic layout for serial processing of the incoming data by a switch 96 which is similar to switch 34. The data octets arrive sequentially and FIG. 3 discloses a logic layout which uses one bank of index table memory 98, one bank of address record memory 100 and one arithmetic computation unit 102 to accomplish both source and destination address detection. In this approach, the octet data bits are coupled serially into octet register 104 and are used as the low order address bits into the index table 98. A byte counter 106 which counts the address octets from one to twelve as they arrive in the octet register 104 is used as the high order address bits into the index table 98. From byte count one to six, the arithmetic unit 102 partially computes the final index with each output from the index table. After byte count six, the computation for the destination address mask index is complete and transferred to the index buffer 108. The arithmetic unit 102 is then reset and the six octets of source address are computed. By the time the source protection record index 110 has been computed, the data in destination route record 112 has been loaded into its output buffer on line 114. The source protect record 110 is then accessed from a second bank of the mask memory 100 using the count twelve signal on line 116 as the high order address bit. This sequential detection approach shown in FIG. 3 places special performance requirements on the index table memory and each reiteration of the arithmetic computation. That is, the access to the index table 98 and the partial computation with the table output each must be complete in less than one octet time. However, the computation is delayed one octet clock time behind the table access. Each of these timing requirements is within the available speeds of commercially available VLSI computer memory and arithmetic components. Current DRAM memories regularly run at less than 300 nanosecond access times making all but the FDDI real-time address routing practical with DRAM parts. Static RAM memories are currently available with 50 nanosecond and faster access times which makes even FDDI routing realizable. The address record memory 100 is only required to be ⅙ the speed of the index memory 98 since there are six octets between completion of the first and second record indexes. The source protect record 110 and the destination route record 112 feed into the buffered routing logic 56 of FIG. 2 to select the outbound path (MAC) for the message.

The record memory indexes may be computed by adding and accumulating the succession of six index table values to compute the mask memory index. Integer add/accumulator devices of 16 to 32 bit precision are currently available which execute a single add function in less than 80 nanoseconds. Many 16 and 32 bit microprocessors have integer add/accumulate times under 500 nanoseconds.

The address directory access circuit overview is shown schematically in FIG. 4. The arriving data packet contains a preamble 118, the first protocol layer 120 which is the Media Access Control protocol header containing the physical media destination address of the MAC receiving the packet, the second protocol layer 122 which is the logical link control and the third protocol layer 124 which is the IP.ISO Internet layer. The remainder of the packet contains the message data and housekeeping information. The third protocol layer 124 contains the unique code identifier of the receiver as the destination address data 126 and the unique code identifier of the transmitter as the source address data 128. The physical link data 120 is the actual communication channel hardware with its associated coding and modulation techniques. Physical link 120 is separated from the Internet data 124 by a combination of computer interface hardware and software called the logical link control entity data 122. Besides logically isolating the Internet layer 124 from the physical layer 120, the logical link control 122 provides a capability to multiplex packets from various higher level protocols such as TCP/IP, DECNET, and ISO/OSI over the same physical link. Each different protocol is assigned a different logical service access point (LSAP). Each LSAP is serviced by a separate set of software providing processing for each protocol as is well known with prior art. It is thus possible that one physical Internet router might be required to route packets of different protocols and therefore require two or more Internet software processes. This prospect is likely in an environment where existing networks using the TCP/IP protocols are phased over to the ISO/OSI protocols.

This invention allows the same routing table access method to be employed by multiple protocols.

The IP/ISO Internet protocol data 124 provides a connectionless or datagram service between nodes on a network. Data to be sent from one node to another is encapsulated in an Internet datagram with an IP header specifying the unique global network addresses of the destination and source node. This IP datagram is then encapsulated in the logical link control 122 and physical layer protocol headers 120 and sent to a router or node. The router strips off the incoming physical header 120 and the LLC header 122. It looks up the destination and source addresses 126 and 128 in its routing table 130, selects the appropriate outbound link, or a plurality of outbound links in the case of a multicast group destination address from table 132 and reduces the plurality of outbound links using restrictions from table 134 in the case of a multicast transmission and passes the IP datagram packet to those selected channels for LLC encapsulation and transmission. With multicast datagrams, the router must determine which outbound links represent the shortest path from the multicast source to the destinations which are members of this particular group. Without this source filtering, well-known in the art, a destination station within a group might receive many copies of the datagram transported over different paths. Such multicast "flooding" wastes networks bandwidth and causes unnecessary congestion on busy segments of the network.

The ISO Internet Protocol (IP) header 124 has a number of fields. From the IP header format 124 it is apparent that the starting position and length of both the destination and source address fields are known or can be determined from the information within the IP header. The proposed routing table directory structure 130 needs only to know the length and values of the address octets to locate a unique table entry for that address. This novel directory access technique does not rely on any known structure of the address field other than knowing that it is a sequence containing a known number of symbols.

It can be seen from the discussion of FIG. 4 that the circuit therein could be used in an alphanumeric system such as, for example only, a library wherein an author and/or book name could be used to access a data table storing all books by author and title. In that case, destination address 126 in FIG. 4 would be an alphanumeric string of data representing the author's name and/or book titles. The arithmetic compression techniques illustrated by blocks 138, 142, and 144 could be used to compress the alphanumeric string as needed to obtain an index 136 which would select the appropriate address in table 130 which would contain all of the library material by author and book title. The selected information could then be obtained through routing tables 132 and 134.

Since the destination and source address are from the same network address space, they have an identical form and can use the same directory. Source addresses must be individual nodes and cannot be group addresses. To constrain the Internet overhead, the initial versions of the ISO Internet have been restricted to 16 octets maximum. This is a huge number of possible addresses on the order of $10^{36}$ and should be more than adequate for many years of global Internet operation.

Routing is accomplished by maintaining a routing table directory 130 at each node in the network as is well-known in the art. These tables are indexed by the destination and source address and contain information indicating which outbound communication links reach the destination node or nodes in the case of a multicast group address. The Internet routing task or program accesses the table 130, gets the outbound route information, analyzes the route information and queues the packet for transmission on one or more of the outbound ports stored in tables 132 and constrained by the records in 134. For all addresses, the Internet task also accesses the source address table which contains information defining which outbound ports should not be used for a multicast transmission to this group (destination address) from a particular source and other source filtered information.

Efficient multicast transmission requires some evaluation of the shortest route to all members of the group from the source location. The present system utilizes the directory 130 and routing table structure 132 and 134 for the already existing Link-state approach. Other existing methods have similar needs and could be incorporated into the design if another routing method is employed by a network.

The novel Internet routing task set forth herein is self learning. No information about any existing addresses or their routes need be stored in the task prior to start up. The routing information is entered into the routing table 130 as a result of the Internet routing protocol activity or network management protocols. When a router starts up, it sends out "I am here" messages using the Internet routing protocol. All of the adjacent routers or nodes send back IP routing protocol packets which, when combined with the input bound channel, contain the information necessary to fill in the routing tables for all active Internet addresses.

The novel system uses arithmetic coding of the directory index 130 as shown by the diagrammatic illustration in FIG. 4. Arithmetic coding is a powerful technique for obtaining the near minimum entropy compression of a sequence of data bits. Since a network address is just a sequence of binary data bits of known length, the minimum entropy compression of all the combinations of bit strings represented by all of the active network addresses should produce the shortest number of bits which would uniquely identify all of the addresses. This encoding could then be used as an index 136 into the routing directory 130. Essentially arithmetic coding uses the distribution statistics of the symbols (in this case octet values) to divide a unit space into a unique fraction based on the sequence of symbols (octets) presented. As each symbol (octet) is presented, the unit space is subdivided into a smaller range. Symbols (Octets) with higher probability of occurrence reduce the range less than those with small probability, causing fewer bits to be used in encoding the higher probability octets. A detailed discussion of such method including program fragments and examples is disclosed in a paper published by Witten, Neal, and Cleary, *Communications of the ACM*, June, 1987. This paper is oriented to adaptive encoding and decoding of data streams and does not deal with the specific application of address detection. However, the method disclosed in that paper can be used for that purpose. Thus in FIG. 4, the destination address 126 is compressed by the arithmetic code process 138 to obtain an integer 140 which represents the address. If further compression is needed, the integer can be compressed through truncation 142 by methods well-known in the art and further compressed if needed by hashing 144, a technique also well-known in the art. The resulting index 136 is then used to find the unique address in the compressed address directory 130. The routing switch designs 38 and 96 shown in FIGS. 2 and 3 are specific implementations of the novel arithmetic compression process employed by this invention.

After all the address octets have been processed, the last value is then the compressed value of the input address octet string. It is sufficiently compressed to be useful as a routing table index.

The novel index table construction and address compression processing of this invention takes place as follows: Addresses can be fixed and variable length bit strings embedded in the Media Access Control (MAC) 120 and Internet protocol (IP.ISO) 124 headers of the received communication packet. The maximum size (Address_length) of an address which can be compressed is set by a management decision and the physical design of a particular implementation of the process.

Symbols are consecutive sets of adjacent bits taken in sequence from the address bit string. Successive symbols may have a fixed overlap incorporating a fraction (Overlap fraction) of the same bits from the address bit string in an adjacent symbol. All the valid bits in the address string must be included in symbols processed. For a particular implementation of the process the symbols are a fixed number of bits in length (Symbol_size) which can vary from 2 bits to any number of bits. In the embodiments presented in FIGS. 2 and 3, a symbol is an "eight" bit octet. The number of symbol positions in an address string (Num_symbol_positions) is the length of the address string in bits divided by the symbol size minus the product of the symbol size and the overlap fraction. Thus, $$\text{Divisor} = \text{Symbol\_size} - (\text{Symbol\_size} \times \text{Overlap\_fraction}) \text{Num\_symbol\_positions} = \text{Address\_length}/\text{Divisor}$$

An address index table (66, 68 and 98 in FIGS. 2 and 3) has a number of banks equal to the number of symbol positions in the address string. Each bank of memory in the address index table has a number of memory locations (Bank_size) equal to "two" to the power of the symbol size. Sub-index values are stored in the non-zero locations of each bank. Thus, $$\text{Bank\_size} = 2 \text{ raised to the Symbol\_size power.}$$

The address index table size (AI_table_size) is the product of the bank size (Bank_size) and the maximum number of symbol positions (Num_symbol_positions) being processed.

The maximum number of non-zero entries, called the allowed maximum count (Allowed_max_count), in each bank of an address index table is set by a management decision. Addresses may be encoded into the address index table until the number of non-zero entries reaches the allowed maximum count for any symbol position. If the encoding of any address value into the address index table results in the number of non-zero entries in one of the symbol positions exceeding the maximum allowed number of entries, then the address cannot be encoded into the table until another entry in this symbol position is removed, that location made zero, and the current count decremented by one. Alternately, the allowed maximum count may be increased by a management decision and all the existing address bit strings must be recoded into the address index table using the new maximum non-zero entry values.

The address index tables (66, 68 or 98) are then incrementally filled in with sub-index values as particular address bit strings are encoded into the address tables. This processing takes the following steps.

Initially the table (66, 68, and 198 in FIGS. 2 and 3) is entirely filled with zero entries and the value of all locations in the table is set to zero.

(1) A counter (Current_count) is established by the learned address logic 88 for each symbol position to keep track of the number of non-zero entries in this bank of the address index table and these counters are initially set to zero. In order to keep track of the number of addresses using a particular non-zero location in the address index table, a use counter is established in the learned address logic 88 for each non-zero location in each bank of the address index table.

(2) The allowed maximum non-zero entries value for each symbol position is obtained from a management decision.

(3) A range value (Range) is computed for each symbol position. The first range value is computed by setting the range for some symbol position to the allowed maximum count for that symbol position. The range value for the next symbol position is the range value for the previous symbol position times the allowed maximum count for this symbol position. The range value for each symbol position is the product of the range value of the next previously computed symbol position and the allowed maximum count for this symbol position. The order of the symbol positions used to compute the range values is only important in that the decoding operation used to recover the original address before encoding to an integer value must use the same symbol order as that used to compute the range values. The sequence of range value computations from the last address symbol to the first address symbol must be used to preserve hierarchical structure of the structure of the original address being encoded.

$$\text{Range }(I) = \text{Range }(I+1) \text{ times Allowed\_max\_count }(I)$$

Each symbol from an address bit string to be encoded into the address index table is processed in the same sequence as that used to process the address symbols during receipt of the packets from a transmitter for routing table access.

(1) Use the numeric value of the symbol as the address of the location in this symbol's bank of the address index table (66, 68 and 98).

(a) If the existing entry in this location of this bank of the address index table is not zero, then increment the use count for this location and no further processing of this symbol is required and the next symbol may begin processing.

(b) If the existing entry at this location in this bank of address index table is zero, then non-zero entry value is computed by (1) incrementing the current count for this symbol position, (2) checking to be sure the incremented current count is less than or equal to the allowed maximum count for this symbol position, and (3) (if the count is not greater than the maximum) computing the value of the incremented current count multiplied by the range value for this octet position and divided by the allowed maximum count for this position and storing this value in this location in the address index table and setting the use count for this location to "one". If the incremented current count is greater than the allowed maximum count for this symbol position, then this address cannot be encoded into the address index table and the management entity is notified that the address index table has overflowed unless another address is removed from the table making a use count go to "zero" and reducing the current count for this symbol position.

(2) Continue processing address bit string symbols until the entire address has been encoded into the address index table by having for each symbol in the address a non-zero value for that symbol value location in every symbol position bank of the address index table.

Address bit strings embedded in the incoming packets are compressed in the combine table outputs 70 and 72 in FIG. 2 and in arithmetic computation 102 of FIG. 3 to an integer value by adding together the stored values from the address index table bank for each symbol position where the symbol value is used as a location address into the bank for that symbol in the address index table. If any index table value accessed is zero, the processing stops and the zero detect 90 is activated. This zero indicates the address has not been encoded into the address index table.

If the number of significant bits in the encoded integer are larger than the size of the compressed address directory 130, then truncation 142 (removing some low order bits) and Modulo N hashing 144 (removing some of the high order bits) may be used to reduce the size of the encoded address integer to the number of locations in the compressed address directory 130.

To decode the original address from the encoded integer and to remove the encoded address from the address index table, the decoding process starts with the symbol position for which the Range value was set to the allowed maximum count and proceeds in the same symbol sequence as the Range values were computed.

(a) Starting with the first range symbol position (the position that was set to the allowed maximum count), the encoded integer—before truncation or hashing—is searched in the low order bits for a value between 1 and the allowed maximum count for the symbol position. The result of this operation is the value obtained from the address index table for this symbol position and that table sub-index value was added to the integer value to create the final integer number.

(b) The location for this remainder value in this symbol position bank of the address index table is found, the use count for this location is decremented by "one", and the position of this location in the bank is the original symbol value for this symbol position. If the decremented use count is zero, then the current count is also decremented by one. If the current count reaches zero, then no addresses are encoded into this position in the address index table.

(c) To decode the second symbol in the sequence of symbol positions used to compute the range values, the value from the previous operation is subtracted from the integer value. The resulting integer value is then searched for the low order bits for a sub-index value between the previous range value and this range value. This sub-index value is the value obtained from the address index table for this symbol position which was added to the integer value to create the final integer number. The location for this sub-index value in this bank of the address index table is found, the use count for this location is decremented by "one", and the position of this location in the bank is the original symbol value for this symbol position. If the decremented use count is zero, then the current count is also decremented by one. If the current count reaches zero, then no addresses are encoded into this position in the address index table.

(d) To decode each successive symbol in the sequence of symbol positions used to compute the range values, the sub-index value from the previous operation is subtracted from the integer value used in the previous operation. The resulting integer value is then searched in the low order bits for a sub-index value between the previous range and the current range for this symbol position. The resulting sub-index obtained with this operation is the value obtained from the address index table for this symbol position which was added to the integer value to create the final integer number. The location for this sub-index value in this bank of the address index table is found, the use count for this location is decremented by "one", and the position of this location in the bank is the original symbol value for this symbol position. If the decremented use count is zero, then the current count is also decremented by one. If the current count reaches zero, then no addresses are encoded into this position in the address index table. This process is repeated until the integer value is reduced to zero.

The sequence of symbol values produced are the symbol values used to encode the integer from the original address bit string. From these symbol values the original address bit string can be reconstructed by placing the symbol values in their symbol positions in the original bit string.

Thus there has been disclosed a data communication system which uses a routing table access method that treats network addresses as variable length symbol strings without internal structure—i.e., as flat addresses—to simplify the handling of mobile end-systems simultaneously connected to multiple access points. The system utilizes high speed, Media Access Control and Internet processes which handle multicast messages to multiple, mobile hosts. The technique is also applicable to real time database applications such as a network name service which relates a logical name (alphanumeric name) to its universal identification code. For example, an automatic telephone directory service could use this system to enable entry of a particular name and receive the telephone number of that name. Thus, the novel system allows one entity having a universal identification number to communicate with any other entity in the system having a universal identification number but whose physical location is unknown. Because the Internet router system is based on a flat logical address space, it provides efficient routing of both multicast and unicast packets independent of the internal network address format or structure.

Further, reversible arithmetic code compression techniques are used to reduce the size of the network address index and dynamic hashing is used to reduce the size of the routing table directory. Importantly, a message address is used that is structure-independent of the location or network attachment of the message receiver.

Referring now to FIGS. 5–9, two additional methods of constructing index tables are disclosed.

The routing table access method and apparatus described in connection with FIGS. 2–4 has, as already discussed, real time data base applications other than the date communications network of FIG. 1. Those of ordinary skill in the art will readily recognize that the routing table access method and apparatus of FIGS. 2–4 describe an associative memory employed in context of a communications switching application. The possible applications of this same associative memory scheme are numerous and diverse; it is not confined to communications switching systems. For example, it has application in such diverse systems as those for on-line telephone directories, radar target tracking, and sonar signal classification—almost any system or application requiring or using high speed access to real-time databases where information is accessed with key values without knowledge of precisely where it is stored within a memory system. It is especially useful for systems utilizing very large key-spaces, when the number of keys that are actually used to access data records stored in memory constitute a fraction of the total number of possible keys. For these reasons, the two additional methods of constructing the index table will be described with reference to a generic application in a host system.

Figure 5:
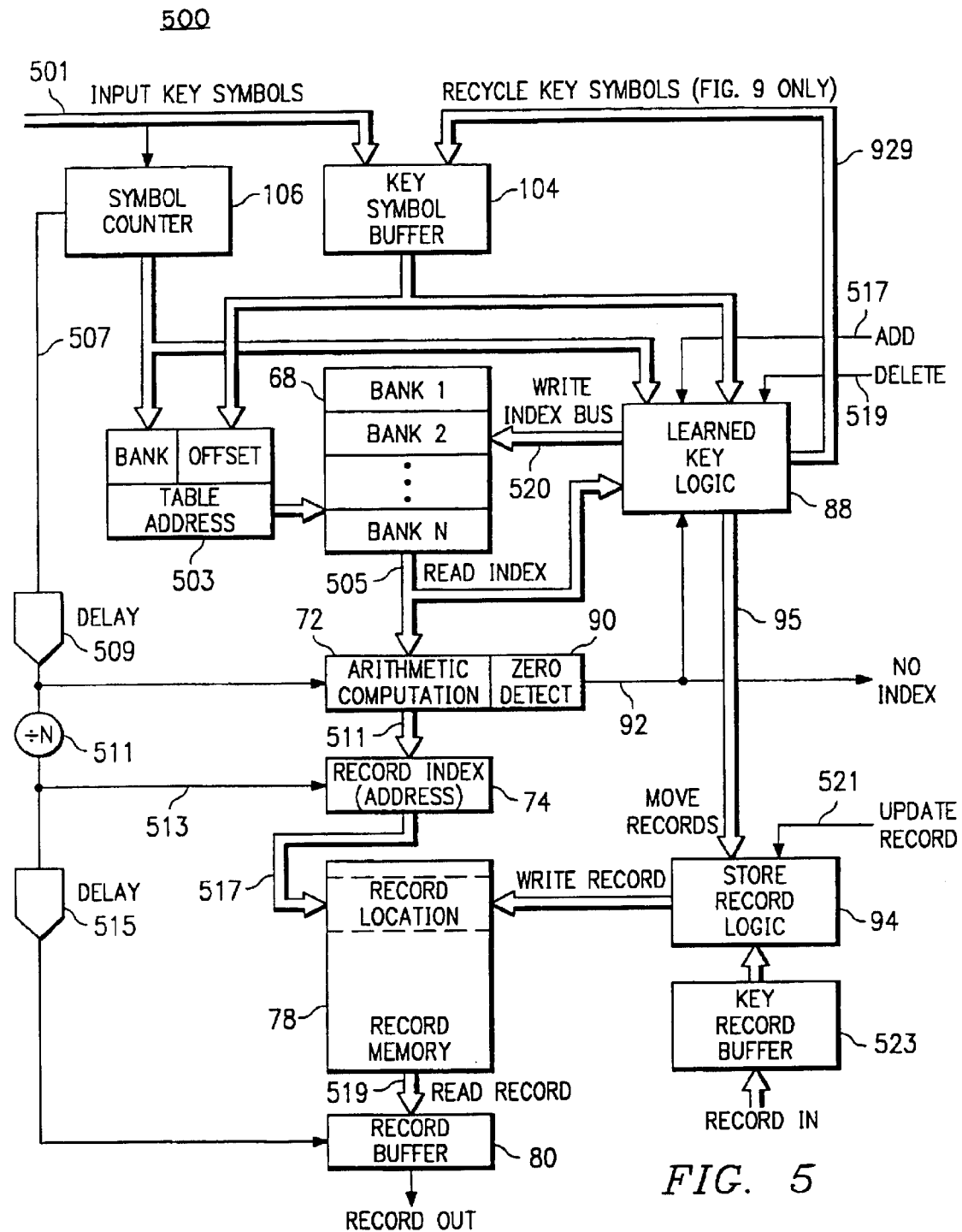
FIG. 5 is a schematic representation of components of an associative memory module.

Referring now to FIG. 5, this figure essentially illustrates the associative memory of FIG. 3, shown with the addition of learned logic 88 and 94 of FIG. 2. The only difference between FIGS. 2 and 3 are the manner is which symbols comprising the addresses are processed: in parallel in FIG. 2; and in serial in FIG. 3. The purpose of FIG. 5 is to introduce generic terminology for the associative memory of FIGS. 2–4. For example, the addresses, both destination and source, of FIGS. 2–4 are simply types of "keys". A key is a unique string of bits that will be used to look up or access a "record" or a "key record". The routing information or "address record" of FIGS. 2–4 is simply a type of "record". A record is another, typically much longer and not necessarily unique, string of bits that the system in which the associative memory is located is trying to store, access, update or delete. In most applications, at least part of the key is found in the record. The key has a maximum predetermined length or number of bits, as previously explained, which are divided into "symbols" of predetermined length and positions. These symbols may or may not represent alphanumeric characters, as those of the ASCII code, or any other type of characters. The key, for example, may be part of a digitized waveform stored as a record. The symbols may also be overlapping—that is, share bits. There is no limitation on what the record and the key represent. They need only be a string of data values.

An associative memory module 500, a preferred embodiment of invention, is used with a host system. One such host system, embodying an associative memory module, is the communications switching apparatus of FIGS. 1–4. The associative memory module receives from the host system a key on input line 501 in a sequence of key symbols, Symbol[i], where i=1 to N and where N is the number of symbols in a key. Associative memory 500 processes one key symbol at a time. Associative memory module 500 may also be reconfigured to process all the symbols of the key at the same time, in parallel, as shown in FIG. 2.

A key symbol, when received, is stored in key symbol buffer 104. Symbol counter 106 counts the symbols as they are received so that the position where the current symbol is stored in the key symbol buffer 104 is always known. The value of the symbol counter is the current symbol position "i". As represented by block 503, an address for index table 68 is generated from the position "i" and the value of the key symbol stored in the buffer 104. The position of the symbol within the key taken from the symbol counter 106 selects a bank, Bank[i], in key index table memory 68, and the value of the key symbol taken from buffer 104, Symbol[i], is the offset address within the bank.

Key index table memory 68 basically stores a table of values, called key index values. The memory storing this key index table must then be divided, either physically or logically, into banks 1 to N, as shown. Each bank is, in turn, divided, either physically or logically, into offset addresses that a predetermined number of bits that store a key index value. The size or number of bits addressed by the offset must be large enough to accommodate the size of index values stored therein, and the number of offset addresses depends on the size of the key symbols. The number and size of offset addresses depends entirely on the application.

The index table memory 68 is any type of memory capable of, at minimum, storing a table of values: for example, a random access memory (RAM) or a read only memories (ROM). There is no inherent limitation of the storage media, whether it is electronic, magnetic, optical or some other type. Nor is there any limitation on the hardware configuration of the memory. The only limitation is that it can be addressed as just described, while, preferably, meeting desired performance criteria. Generally, a very fast memory is preferable so that keys are processed as rapidly as is necessary for the application. For example, where k number of bits are required for storing an index value, a single k-wide memory chip is likely to be the simplest and quickest way of implementing the index table memory, presuming the chip is large enough. Minimal address decode circuitry is required. On the other extreme, use extensive address decoding circuitry may slow performance. Cost, size, and durability constraints, restrictions posed by operating environment and many other design criteria associated with a particular application will determine what type of memory is best suited for implementing the index table. For example, where, as in several of the embodiments of the invention, data is written to the index table memory during processing of a key, the memory must be randomly accessed. Where index table memory is not updated, Read-Only random access memory may be used.

The data value or index that is addressed is read onto line 505 to arithmetic computation logic circuitry 72. Arithmetic computation logic is primarily comprised of a Modulo (P) adder, where P is approximately the number of logically addressable memory locations in key record memory 78. In the preferred embodiment, P is chosen to be a prime number. Arithmetic computation logic circuitry 72 is initialized or set to zero before receipt of the first symbol in a key is presented on line 501. As the index value is read onto bus 505 from the index table memory, symbol counter 106 provides an enabling or clock signal on line 507. The enabling or clock signal from the symbol counter is delayed by delay device 509 by a time greater than the access time required for the index table memory 68 but less than the period between symbols presented on input bus 501. When enabled, the arithmetic computation logic circuitry adds an index value on line 505 to a previously computed sum, in effect keeping running total. When the running total exceeds P, P is subtracted from the running total. The arithmetic computation logic circuitry thus performs a Modulo (P) addition of the index values stored in the index table memory for each symbol in the key to create a final sum called a record index. The record index is a data value that will be used as a logical address to the place within key record memory 78 in which the record corresponding to the key presented on input lines 501 is stored.

Arithmetic computation logic circuitry also includes zero detect circuitry 90 for indicating that an index value received on line 505 from the index table memory 68 is zero. By definition, a zero value stored in an entry the index table for a symbol, as defined by its position within the key and its value, indicates that the symbol value has not been encoded into the index table and therefore no key record is stored in the key record memory 78 associated with the key that has been presented. The zero detect or "No Index" signal is provided on line 92 to the host system.

The choice of zero as the value which indicates an index has not been assigned to that location in 68 is not critical to correct operation. Any bit pattern may be selected to indicate "no index" has been assigned. The index tables 68 are then initialized with that bit pattern and "zero detect" is changed to detect that pattern. Using bit patterns of all "zero" or all "ones" are convenient choices.

Once the last symbol of the key is processed, the final sum or record index in the arithmetic computation logic circuit 72 is read to the record index buffer 74, also called a key record memory address buffer. This value is the key record memory address that is presented on address lines 517 to key record memory 78 in order to access the record associated with that key. An enabling or clocking signal on line 513 causes the record index buffer 74 to store the record index and provide it on address lines 517 to the key record memory 517. To generate the enabling or clocking signal on line 513, the enabling signal provided to arithmetic computation logic circuit is divided by N, the number of symbols in the key, by divider circuitry 515.

Record memory 78 stores records of data that are accessed by presenting a key to the associative memory module 500 and decoding it into a record memory address as described above. Upon presentation to the record memory, the record memory address enables access of a record associated with the key and, with an appropriate read command (not shown) reads it onto output lines 519 to be stored by key record buffer 80 when enabled by a signal from delay element 515 (the delay element providing sufficient time for accessing the memory and reading out the record of data onto lines 519).

In essence, therefore, a record of data desired by a host system using the associative memory module 500 is accessed by presenting a key associated with that data and generating an address where the record is stored in a memory from a specially encoded index table 68. The key is uniquely associated with that record of data, though the record of data is not necessarily uniquely associated with that key.

How the record memory address is physically and logically constructed, as well as the form of the record memory address presented to the memory for access, are innumerable. The record memory address need only access the record of data associated with the key; how it does so depends on the memory chosen and the application. For example, the record memory address can be the actual physical address of the record where the memory bandwidth is equal to the largest size of any of the records stored. Where memory bandwidth is too small, the key memory address may be comprised of block-frame address, with a block-offset address being generated by separate circuitry (for example, a counter that would be included with the record memory 78) that strobes block-offset address lines to read out the record of data. On the other hand, the record memory 78 may be constructed as a virtual memory of some type, where the record memory address is mapped to the actual location. The mapping circuitry is included within record memory 78. A virtual memory implementation is generally not preferred, as this simply adds a second layer of mapping that slows access times. However, as the associative memory module 500 is designed to handle large numbers of keys, it may be desirable possibly to use it with some types of virtual memory.

It should be further noted that the amount of memory space allocated for a record of data is usually fixed (though, if desired, it can be variable). If the record is too large, a pointer is stored in the record space pointing to the location of part or all of the actual record of data.

No limitation is placed, as with like the index table memory 68, on the actual hardware configuration or hardware of the key record memory 78. Again, any media may be employed, preferably of a random access variety so that key records may be updated, added and deleted. However, some applications will need only ROM, which is generally faster. For reasons of speed, the type of memory should be chosen to have access times suitable to meet the particular application, subject to the limitations of space, cost, power consumption, heat dissipation, and durability.

Where adding, deleting and updating records of data are desired, as with the communications system of FIGS. 1–4, several additional logic circuits are incorporated in the associative memory module 500. These logic circuits may be dedicated circuits or programmable devices which implement the logical functions of the circuits. The host system for the associative memory module may also augment or be used in place of some or all of these devices to handle some or all of the processing that is carried out by this circuitry.

To update a record already stored by record memory 78, an "UPDATE" command on line 521 is presented to store record logic at the same time the record's associated key is placed on input key bus 501. Store record logic 94 then writes the updated record stored by the host system in key record buffer 525 into record memory 78 at the record memory address generated from the key.

Adding records and their keys requires that its key be "learned". The key for the record to be added is presented to the associative memory module on input lines 501; the record to be added is placed in key record buffer 523; and an "ADD RECORD" command is given on line 517. Each symbol of the key is processed as previously described. Frequently, at least one, and sometimes all but one, of the symbols in the key has already been encoded. If a symbol (as defined by its value and position within the key) has been encoded, learned key logic performs no function, and the key index values are read into arithmetic computation logic circuitry 72. However, when zero detect circuitry 90 reads a zero on line 505 from the key index memory 68, a zero detect signal is provided on line 92 to learned key logic 88, as well as to the host system as a "No Index" signal. This "no index" or zero detect signal means that the table entry—the symbol position and value—contains a zero. At this point, learned key logic circuitry 88 generates a new key index value and provides it to key index table 68 on write index bus 520. The index table memory then stores it in the entry of the key index table memory indicated by table address 503. As will be discussed in connection with the remaining Figures, learned key logic circuitry 88 requires, in order to generate the new index value for the key symbol, the key symbol value and position, and index values on read index line 505. Therefore, learned key logic is coupled to the key symbol buffer 104, the symbol position counter 106, and read index bus 505.

Processing the key symbols presented on lines 501 then continues as before, with learned key logic generating new key indexes as necessary. When all of the symbols of the key have been processed, and their corresponding key index values added to a record index value 74 by the arithmetic computation circuitry 72, the record in buffer 523 is stored in the key record memory 78 at the location indicated by the record index.

To delete records, the host system presents a "DELETE RECORD" command on line 519. To perform the delete function, the key must be presented on input key bus 501. Learned key logic 88 then deletes any key index value that is being used only by the key associated with that record by writing a zero into the table entry with write index bus 520. Deleting any unused index values permits them to be reused for the un-encoded key symbols that may be subsequently presented, thereby providing more efficient use of the record memory 78. The "deleted" record is simply overwritten with a new record when one is presented.

Please note that where an ability to add, delete and update records is not desired, learned key logic circuitry is not necessary. All that is required is an encoded index table memory 68, arithmetic computation circuitry 72, key record memory 78 written with all of the records and suitable timing circuits and buffers. The index values that are stored in the index table memory 68 may be generated separately on a general purpose digital computer, from a known set of keys, and then stored in the memory. One of these methods for doing so has already been described in connection with FIGS. 2–4. Other methods will be described in connection with the remaining figures. If the index table memory is a ROM, for example, the index values are stored in the manner provided by the ROM device.

Figure 6:
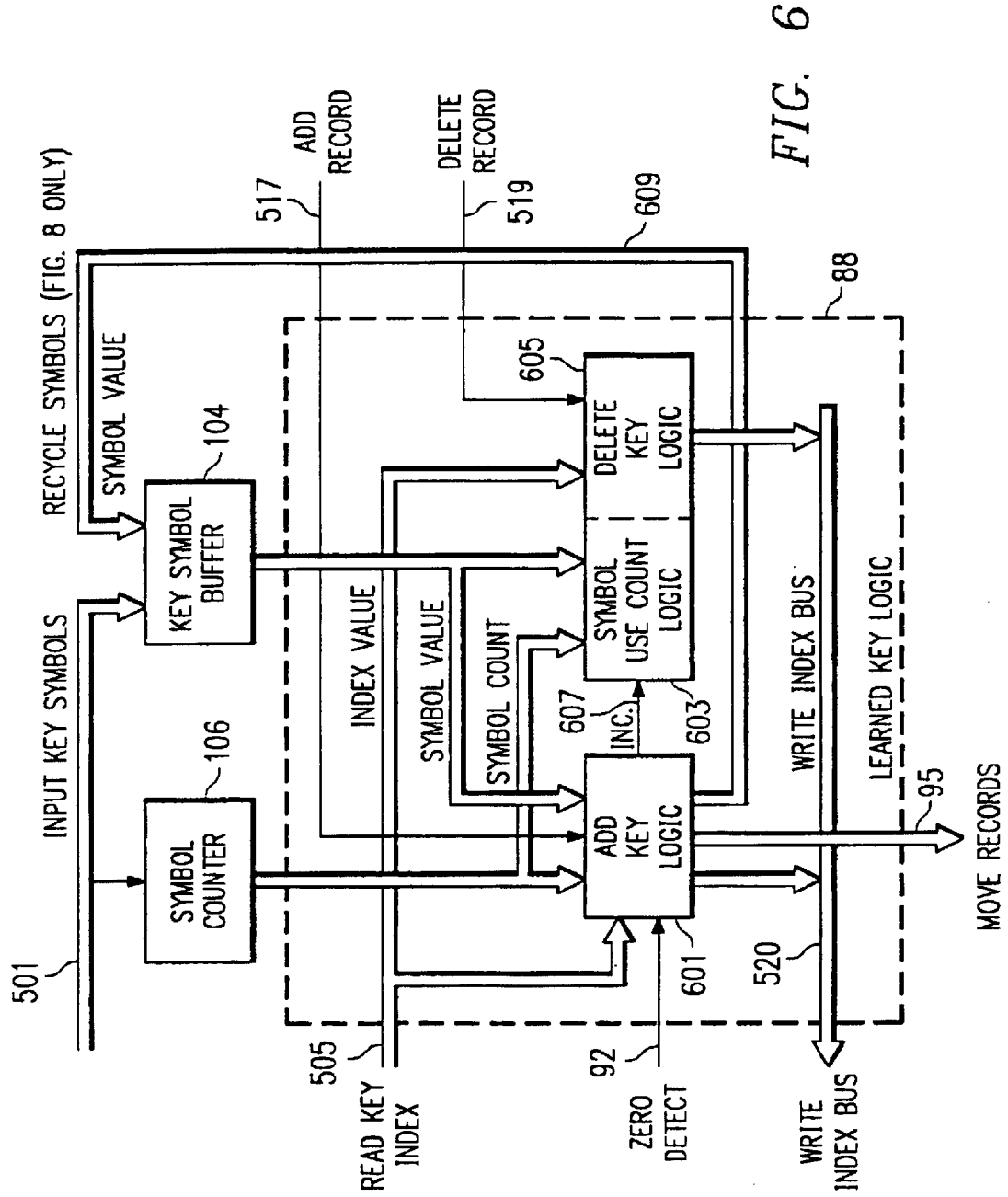
FIG. 6 is schematic representation of a circuit for learned key logic for the associative memory of FIG. 5.

Referring now to FIG. 6, learned key logic circuitry 88 includes three main components: add key logic circuitry 601; symbol use count logic circuitry 603 and delete key logic circuitry 605.

The function of add key logic circuitry is to generate new keys that are provided to write index bus 520 for storing in the key index table memory 68 (FIG. 5). In one embodiment, add key logic recycles key symbols to key symbol buffer 104 with bus 609. Add key logic is coupled to symbol counter 106, key symbol buffer 104, read key index bus 505, zero detect line 92 and "ADD RECORD" command line 517 so that it receives the current key symbol position or count, key symbol value and key index in addition to the zero detect and add command. Add key logic provides an increment (INC) command on line 607 to symbol use count logic 603 for each key symbol presented on line 501 during an add key operation.

Symbol use count logic 603 tracks for each key symbol value and position, or entry in the key index table memory 68, the number of different keys that share that particular symbol value and position. Symbol use count logic receives the symbol value and symbol position from key symbol buffer 104 and symbol counter 106, and the increment command signal from add key logic on line 607. A key index value for a particular symbol that is shared by more than one key cannot be deleted. If symbol use count logic circuitry indicates that a particular symbol has been encoded into the index table for only one key, then delete key logic circuitry 605 writes a zero to the write index bus 520.

Figure 7:
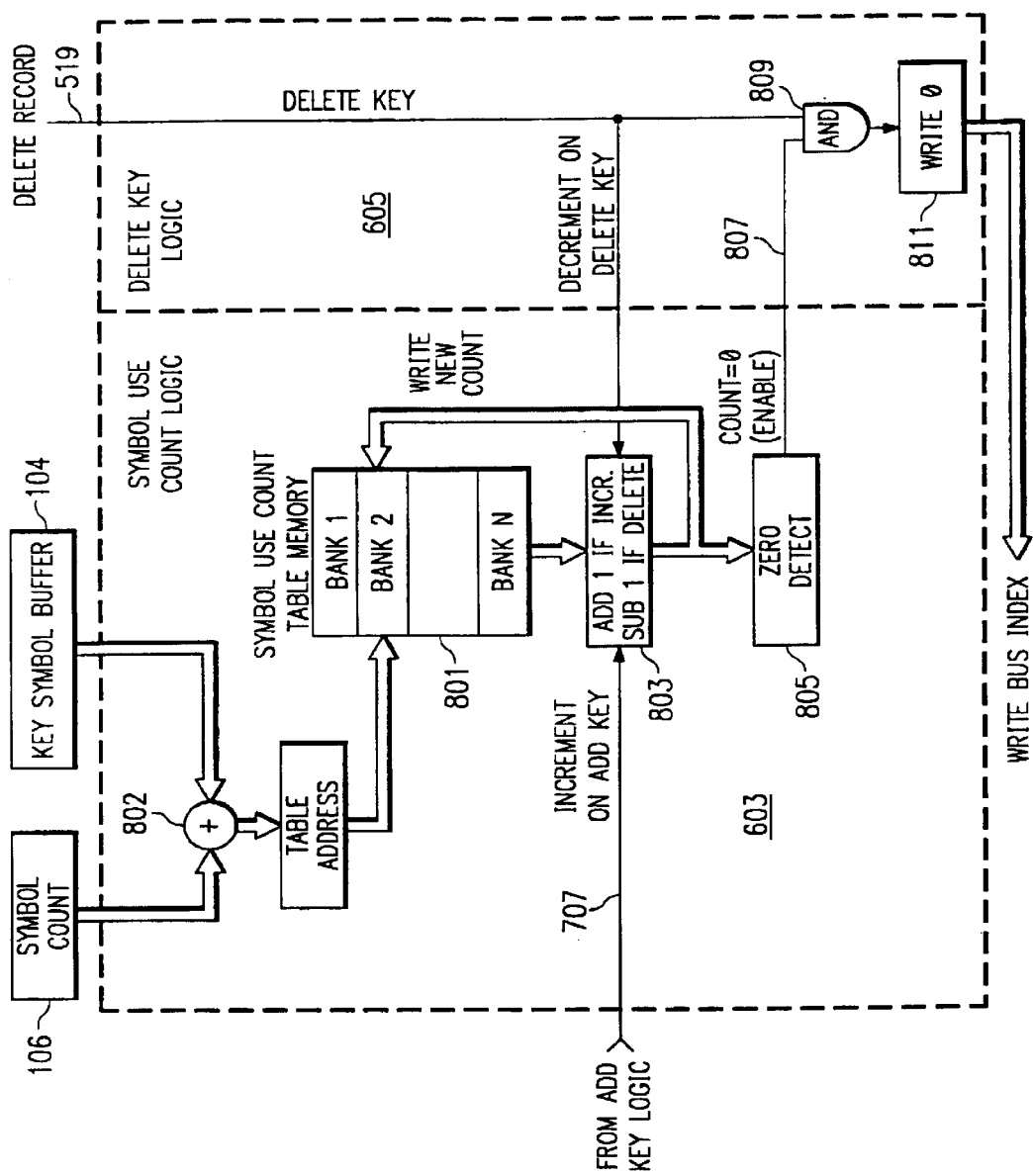
FIG. 7 is a schematic representation of a circuit implementing symbol use count logic and delete key logic for the learned key logic circuit of FIG. 6.

Referring now to FIG. 7, symbol use count logic circuit 603 tracks the number of times a particular symbol, Symbol [i] in a particular symbol position or bank i, is used by different keys. The key index value assigned to Symbol[i], INDEX[i,Symbol[i], can be deleted when it is no longer being used by any key. Essentially, it uses a symbol use count table memory 801 that is constructed and addressed like the key index table memory 68 (FIG. 5). As indicated by summer 802, values in symbol counter 106 and key symbol buffer 104 are used as bank and offset addresses, respectively, to a particular table entry for the key currently being processed. The data value stored in each entry is the number of keys that are currently encoded that share or use the value Symbol[i] in position i.

When the table memory 803 is addressed, the use count for Symbol[i] is read into counter 803. When a key is being added, the value in counter 803 is then incremented by one with an INC command signal on line 707 from an add key logic circuit. In essence, this counts the number of times a particular symbol[i] has been presented to the associative memory as part of a key that is being added. When a record is being deleted, counter 803 is decremented by one with the delete record command on line 519.

After expiration of a period of time allowed for the step of incrementing or decrementing, the value in the counter 803 is written back into the table memory 801 at the same table address. It is, further, read by zero detect circuit 805. If a zero count is detected during a delete record operation, a logic signal on line 807 goes high. This signal and the delete record command on line 509, also a logic high signal, are provided to AND gate 809, which is part of delete key logic circuit 605. Both signals going high causes a zero to be written on to write index bus 520 by circuit 811.

Referring now to FIGS. 8 to 13, these figures disclose a third method (in addition to the methods previously described in connection with FIGS. 2–4) of adding keys (the actual records may be stored later) using a different add key logic circuit. Basically, this method or process assigns key index values for key symbols when keys are presented in a monotonically sorted or lexigraphical order (either ascending or descending) for entry into the associative memory. The sorted order of the keys helps to eliminate "holes" for possible combinations of key symbols which are not presented in a sorted order or sequences, creating a near "perfect hashing" or "perfect packing". Should a key be presented whose sum of key index values is the same as the sum of key index values for a previously entered key, current or previous key index value assignments are changes, and any previously stored key records are moved in memory to create a "hole" for the new key. The adding process is completed when the highest or last record memory location is filled.

Figure 8:
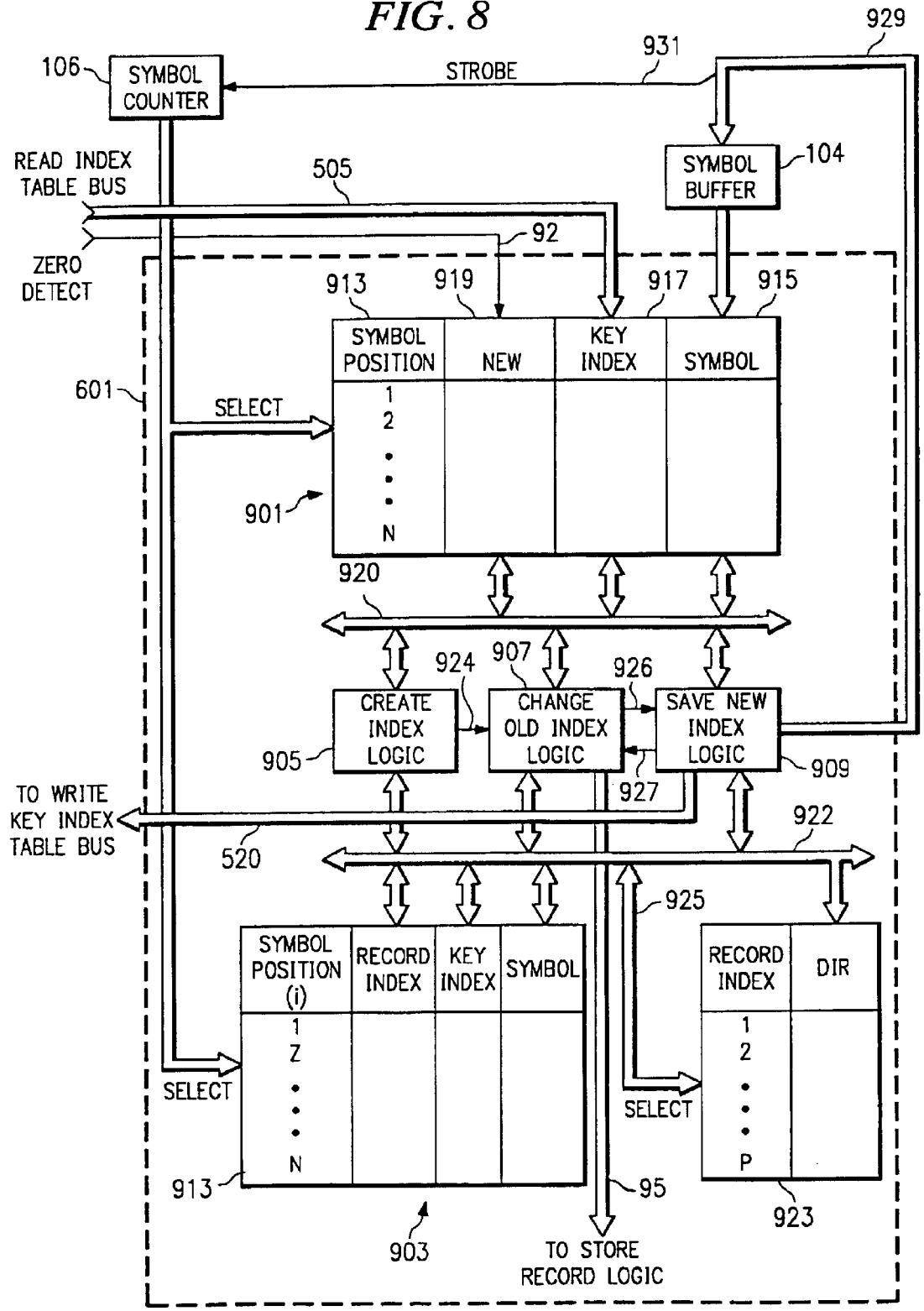
FIG. 8 is a schematic representation of a circuit embodying a second method of implementing a method for adding keys to the associative memory of FIG. 5, comprising add key logic component of the learned key logic of FIG. 6.

Referring now to FIG. 8 only, showing in schematic representation a dedicated circuit embodiment utilizing this method, add key logic circuitry 601 includes as major components: save table 901; change table 903; create index values logic circuit 905; change old value logic circuit 907; save new index logic circuit 909; and a directory table 911. The save table 901, change table 903 and directory table 909 are data structures stored in a random access memory. The logic circuits 905, 907 and 909 are shown to be dedicated circuits (possibly LSI or VLSI devices), but may implemented with programmed logic devices, general purpose computers, a microprocessor, or a combination of these performing the steps of the method.

Both the save table and the change table have one row of values for each symbol position i in a key, i=1 to N, as shown by symbol position columns 913 in each table. Symbol counter 106 is therefore used to select a row in the save table, identified as Save[i], and in the change table, identified as Change[i]. Each table has three additional columns for storing values associated with Save[i] and Change[i]. The save table keeps values of the symbols for the current key being added.

In the save table 901, column 915 stores a value Save[i].symbol. This value is set equal to the symbol value, Symbol[i], from symbol buffer 104. Thus, Save[i].symbol= Symbol[i]. Column 917 receives from the key index table on read key index bus 505 an index value for Symbol[i], Index[i,Symbol[i]], and stores it. The column 919 receives the zero detect logic signal on line 92 and stores a value for a variable Save[i].new. This value is "new" (actually a data value arbitrarily chosen to represent "new") when a zero detect signal is received, indicating that the value for Save [i].index is new and that Symbol[i] had not been previously encoded into the key index table memory. Thus, Save[i].new=new. Otherwise, a data value representing "old" is stored: Save[i].new.=old.

Symbol position counter 106 selects a row of the Save table corresponding to the key symbol position currently being processed. Selection enables the values in each column of the selected row to be accessed (read and written to) with bus 920.

The change table 903 keeps information on the last index values assigned for each symbol position to allow "holes" to be made for new keys and to move any records if required.

The change table 903 stores the previous symbol, record index and key index values for each symbol position [i] that are need to generate the next key index values for the next new key presented to the associative memory. Change table 903 therefore has three columns, one for the last assigned values of the following variables or data elements: for the record index value, Change[i].record; for the key index value, Change[i].index; and for the symbol value, Change[i].symbol. Like the Save table, the symbol position counter selects the row in the table, enabling entries on that row to be accessed (for reading and writing) by bus 922.

A directory table 923 is also kept. A row of the table is selected with a data value generated by create index values logic 905 and save new index logic 909. This value is notated simply as "sum", as it is a sum of all of the key index values for a key that is being processed. The number of rows in the table equals the number of record locations in record memory 78. The value "sum" is in fact equivalent to the record index value for the key being processed. Each row of the table has one entry, Change[sum].dir, for each record location in the record memory, sum=1 to P. This entry has one of two values; one representing the location is "assigned" and the other indicating the location is "unassigned". This data structure may be set up in any memory element in the associative memory or host system. It can even be made part of the record memory 78 (FIG. 5).

Coupled between buses 920 and 922 are create index logic 905, change old index logic 907 and save new index logic 909 which permit the logic elements to read and write values to the respective tables. Please note, however, the buses 920 and 922 are merely a functional representation, intended to simplify presentation. The actual data exchange structures between the different elements of add key logic 601 may differ substantially depending on the memory and logic elements selected to implement the data structures of the tables and the logic. For example, when implemented on a specially programmed general purpose digital computer, the data exchange structures will be those of the particular computer chosen.

Save new index logic 909 is further coupled to the write key index table bus 520 so that new index values can be stored in the key index table memory 68, as well as to key symbol buffer for recycling key symbol values.

Figure 9:
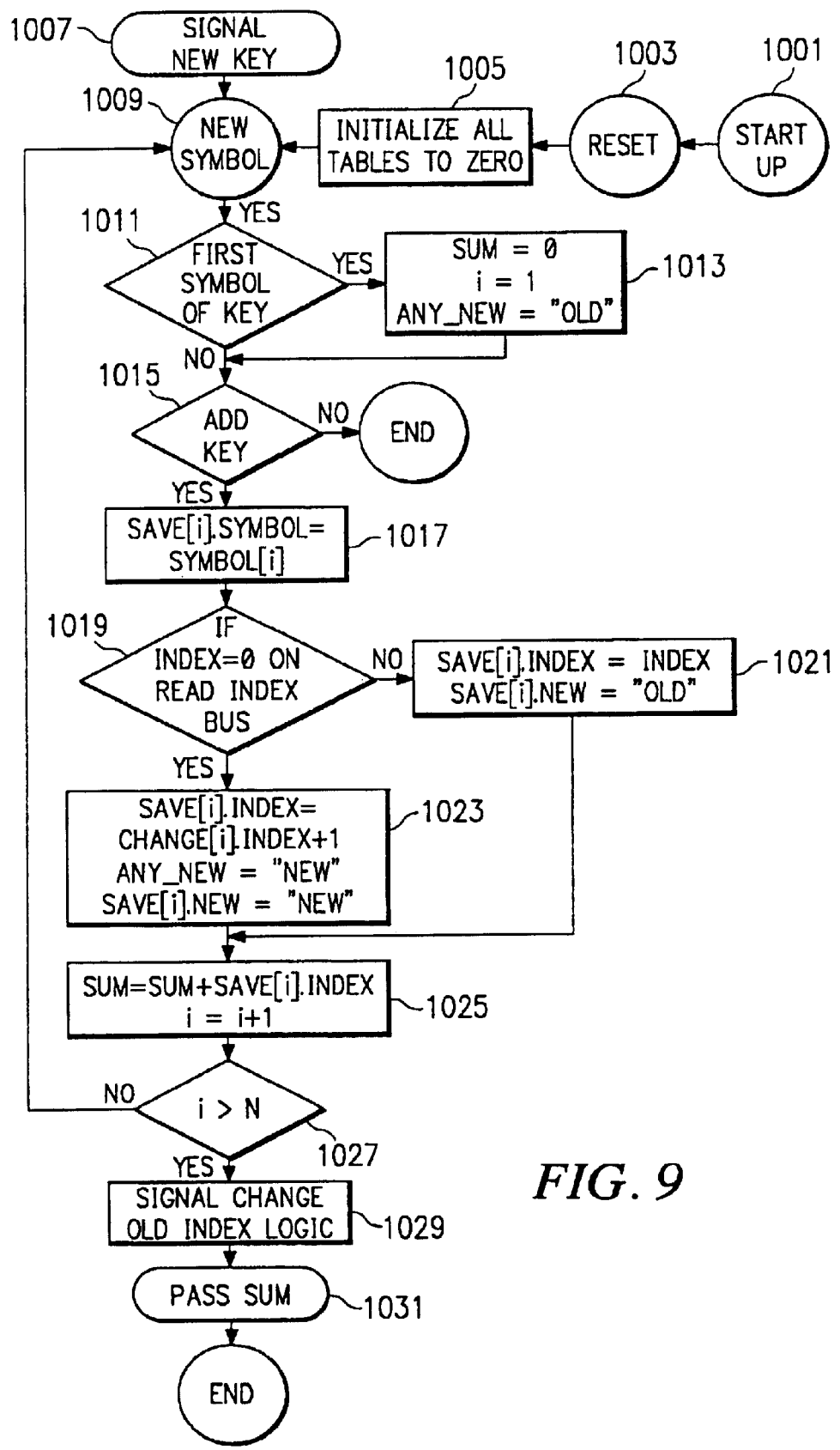
FIG. 9 is a flow diagram describing the operation of a create new index logic component for the add key logic circuit of FIG. 8.

Referring now to FIGS. 8 and 9, illustrated is a flow diagram describing the operation of create index value logic 905. Create index values logic 905 may be implemented with either dedicated circuitry or programmable logic circuitry, possibly shared with the other logic circuits in the associative memory module, or some combination of the two. In the latter case, the steps of the flow diagram would be implemented with programmed instructions.

At start-up of the associative memory, as indicated by circle 1001, all logic components are reset at step 1003, and all tables initialized to zero (written with all zero values) at step 1005. Step 1005 includes setting Index[i,Symbol[i]] to zero, for all i and Symbol[i]. When the host system presents a new key for addition or encoding into key index table memory 68 (FIG. 5), it signals at step 1007 that a new key is being presented on key symbol bus 501 (FIG. 5) and the create new index value process begins. Step 1009, (FIG. 8) indicates when each symbol within the key is presented for processing as indicated by the symbol count being greater than zero. When a symbol is presented, the create new index value process continues to decision step 1011. If the new symbol is the first symbol of the key, then Sum is set equal to zero and i equals one. Further, a variable Any_New is set equal to "old". Any_New is subsequently set to "new" if any Save[i].new="new" from i=1 to N. In other words, "new" is entered in the new column 919 for any symbol position in the Save table; otherwise it is "old". Any_New is a flag which indicates that one or more of the Save [i].new values is set to "new".

At decision block 1015, if the key being presented to the associative memory is to be added, as indicated by the Add command signal on line 517 (FIG. 6) being turned on, create index logic performs the steps outlined in block 1017. If the key is not being added, the created index value process ends. The process steps of block 1017 involve setting the Save table entry Save[i].symbol equal to the symbol value Symbol[i] from the key symbol buffer 104 (FIG. 6).

Create index value logic next reads, as indicated by decision block 1019, the index value, Index[i.Symbol[i]], from the read index bus 505 (FIG. 5), and if it is equal to zero, proceeds to the process steps of block 1023. These steps include setting Save[i].index=Change[i].index+1; Any_New="new"; and Save[i].new="new". Otherwise, the steps of block 1021 are undertaken: setting Save[i].index=Index[i,Symbol[i]]; and Save[i].new="old".

After either the steps of block 1019 or block 1021 are performed, as the case may, the value assigned to the variable Sum is updated to Sum=Sum+Save[i].index at block 1025, and i is incremented by one, i=i+1. If i is less the N, the number of symbols in a key, then the steps indicated by blocks 1011 to 1025 are repeated. Once i=N, then create index value logic signals change old index logic 907 (FIG. 8) and passes the current value for Sum, as represented by blocks 1029 and 1031. The process of create index value logic then ends until a new key is presented.

Figure 11:
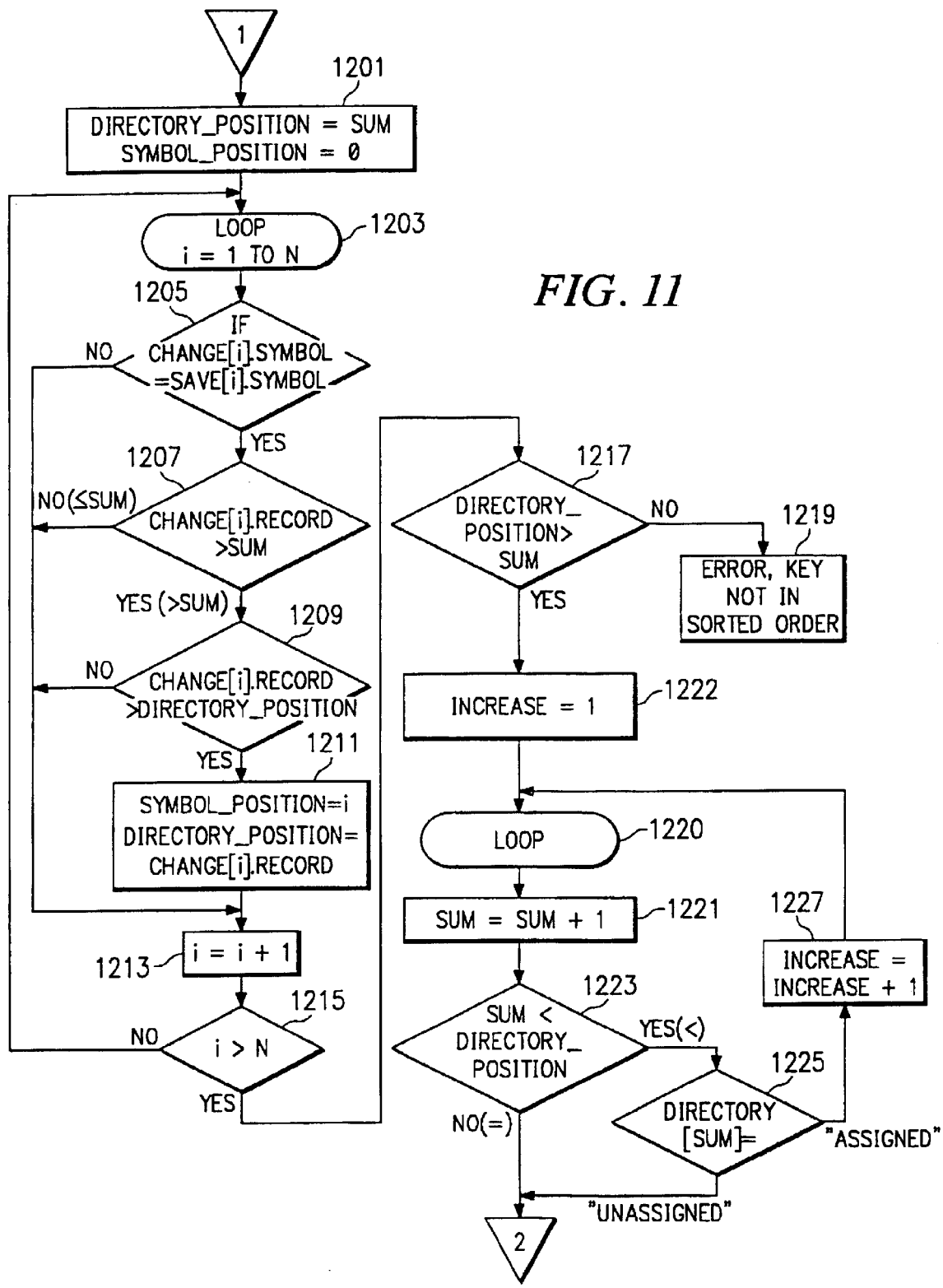
FIG. 11 is a continuation of the flow diagram of FIG. 10 describing the operation of add the change old index value component.

Referring now to FIGS. 9 and 11, if the sum of the record index values is a record index value addressing a location in record memory 78 (FIG. 5) already having a key assigned to it, then this new key cannot be entered until either the previous key is moved to a new location or the new key's sum is increased until an unassigned location is found. Either of these moves are accomplished by increasing the value of an index value assigned to some previous key and also used by the new key being processed or increasing the value of an index newly assigned to this key.

First, change old index logic 907 checks to see if the sum of the Index values for the new key, the sum of Index[i, Symbol[i]] from i=1 to N has been assigned. To do this, change old index value logic gets the value for Sum for create index logic 905 on bus 922. As indicated by decision block 1103, change old index value logic selects from the directory table 923 using the select line 925 the value for Directory[sum], which then reads this value out onto bus 922 for retrieval by change old index logic. If Directory [sum] equals "unassigned", this indicates that the index values for the new key sum to a record index that has not previously been assigned to a key. Change old index logic then determines whether Any_New="new", as indicated by decision block 1105. If Any_New="old", the process ends. If Any_New="new", then save new key logic 909 is signalled to begin and the value for the variable Sum passed to it, as indicated by blocks 1107 and 1109, and the process carried out by change old index logic ends.

If, on the other hand, Directory[sum] is assigned, the process of change old index logic continues at decision block 1111. If Any_New="old", a previously assigned index value must be increased to make a "hole" for the new key. The process proceeds to the steps shown in FIG. 11, which are discussed in connection with that figure.

Otherwise, if Any_New="new", indicating that one of the index values for the current key was newly assigned or created by create index value, this new index value is incremented by one, thereby incrementing Sum until an "unassigned" location in the Directory table, Directory [sum]="unassigned", is found. An "unassigned" value indicates that the that a record memory location addressed by the a record index value equaling Sum has not been assigned to a key and is available for storing a record associated with the new key.

The steps for increasing the newly assigned index value are carried out by a loop shown between blocks 1113 to 1121, the loop being repeated for each symbol position i from i=1 to N, as indicated by block 1113. First, the value of Save[i].new is tested for whether it is "new" or "old", as shown by block 1115. If it is "old", the process moves to the step of block 1117, where i is incremented by 1 or, if i=N, is set equal to 1, and the loop restarts by returning to block 1113. If Save[i].new="new", the process moves to steps shown by block 1119. There, Save[i].index and Sum are incremented by one, and i is also incremented by 1 unless i=N, then it is set equal to 1. The incremented Sum value must be tested to see if it has been assigned; as shown in block 1121, whether Directory[Sum]="assigned". If it has been "assigned", the loop must continue at block 1113. If unassigned, the new index value is saved by signalling save new index value logic 909 and passing the Sum value on line 926, as indicated by blocks 1123 and 1125.

Figure 10:
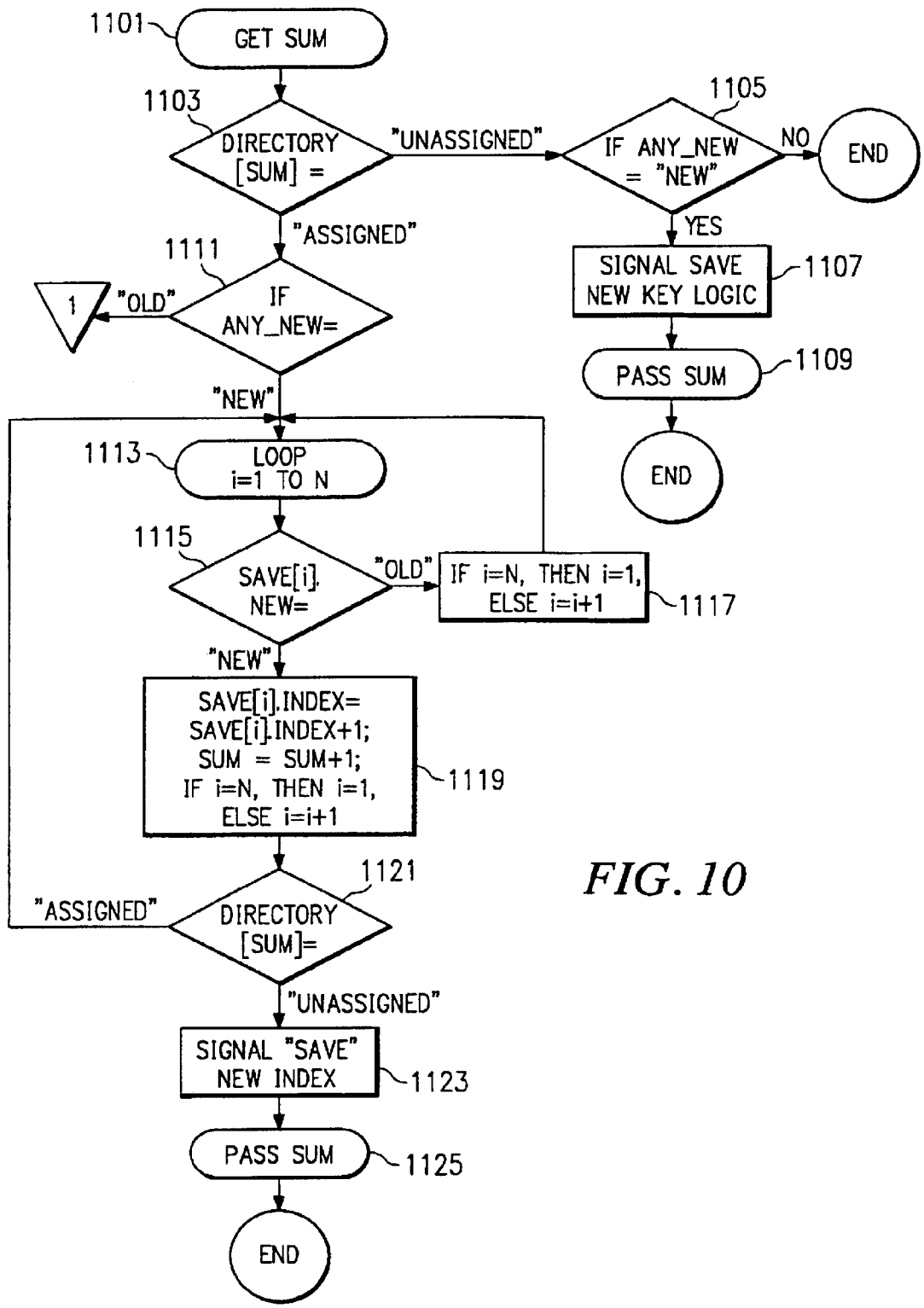
FIG. 10 is a flow diagram describing the operation of a change old index value component of the add key logic of FIG. 8.

Referring now to FIGS. 8 and 10, where Directory[Sum]= "assigned" and Any_New="old" at steps 1103 and 1111 in FIG. 10, the processes of change old index logic 907 carry on by increasing a previously assigned index value in order to make a "hole" in the record memory for the record associated with the new key. Three additional variables are required to continue the change old index value process. Directory_Position is a pointer to the Directory table 923 that will point to the record memory location at which the hole is made. Symbol_Position keeps track of the symbol position of the index value which will be increased to make a hole. As indicated by block 1201, Directory_Position is initially set equal to Sum, and Symbol_Position is set equal to 0.

Starting with block 1203, a loop begins that is designed to find an index value in the change table 903 that was previously assigned to one of the symbols of the key currently being processed. To do this, the loop begins at i=1 and compares Change[i].Symbol in the change table and Save[i].symbol in the save table to see if Change[i].Symbol= Save[i].Symbol, as shown in block 1205. Where Change[i] .Symbol=Save[i].Symbol, two other conditions are tested. First, Change[i].record, the record index value or Sum at the time the Symbol[i] was assigned, is compared against the current Sum, as shown in block 1207. Second, it is compared with Directory_Position, as shown by block 1209. If Change[i].Symbol is greater than both, then: in block 1211, Symbol_Position is set equal to i and Directory_Position is set equal to Change[i].Record; and, in block 1213 and decision block 1215, i is incremented by one and the loop repeated until i=N. Otherwise, the steps of block 1211 are not performed and the loop repeated for i=i+1 until i=N. In effect, this loop is not only trying to find an index value in the save table having a symbol shared by the current or new key, it also finds, where there is more than one such symbol, the index value that, when assigned, had the largest record index value. The Directory_Position variable keeps track of the largest record index value found as the loop is performed.

At the termination of this loop, change old index logic tests, at decision block 1217, whether the final value for Directory_Position is greater than Sum. If not, then this new key was not in a sorted order with respect to previously presented keys and an error message is flashed to the host system, as indicated by block 1219. Otherwise, it continues to another loop, starting with by block 1220.

Before beginning this loop, a variable Increase is set equal to 1, as shown in block 1222. The value of increase is the number by which the records in the record memory must be moved to create the "hole". The first step in the loop is to increase Sum by one, as shown in block 1221. Next, at block 1223, Sum is compared against Directory_Position. If it is less than Directory_Position, Directory[Sum] is looked up in the Directory table 923 to see if that record index has been assigned, as indicated by decision block 1225. If it is assigned, one is added to the value of Increase, as shown in block 1227. The loop repeated until Sum is either equal to Directory_Position or Directory[Sum] is "unassigned".

Figure 12:
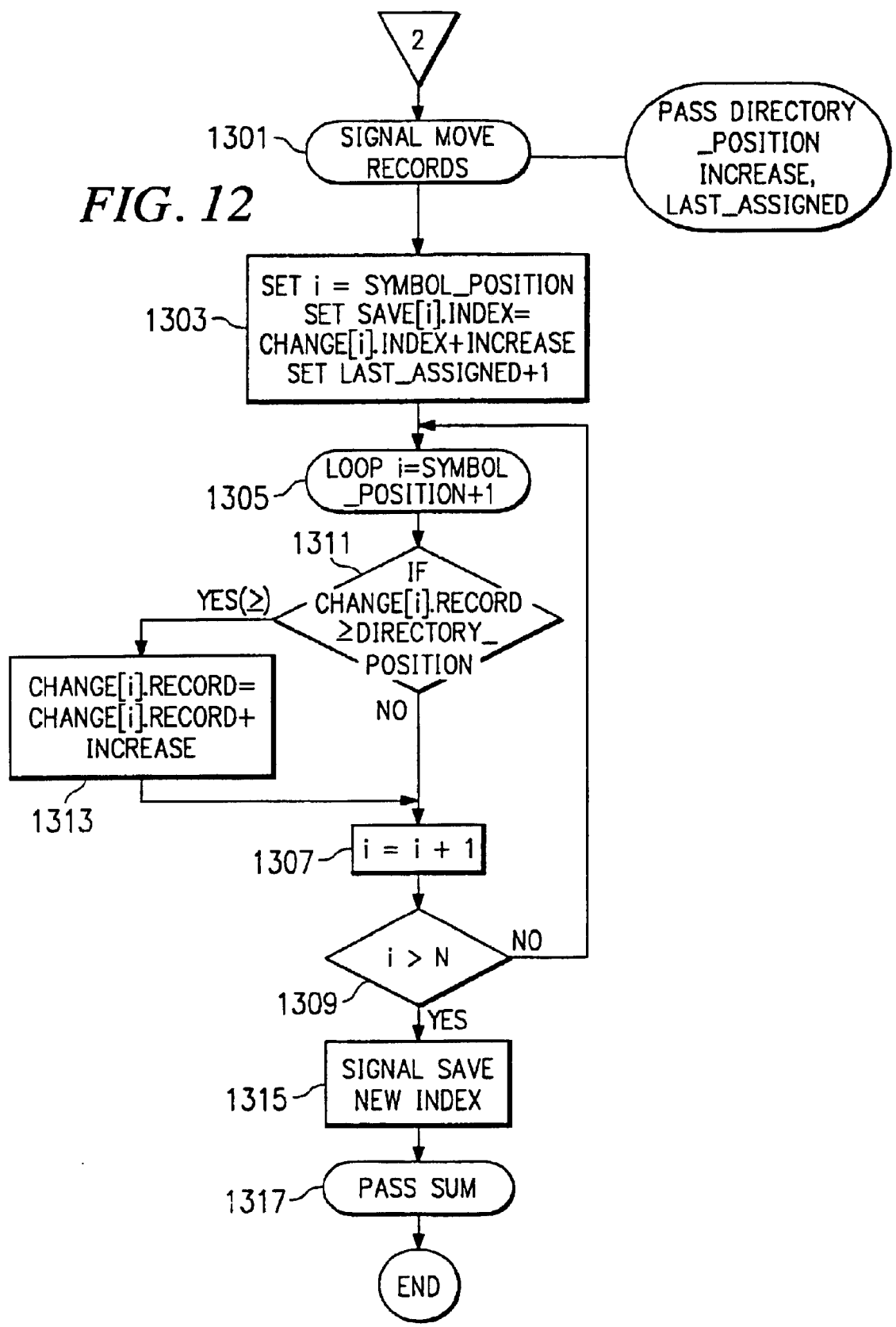
FIG. 12 is a continuation of the flow diagram of FIG. 11.
Figure 13:
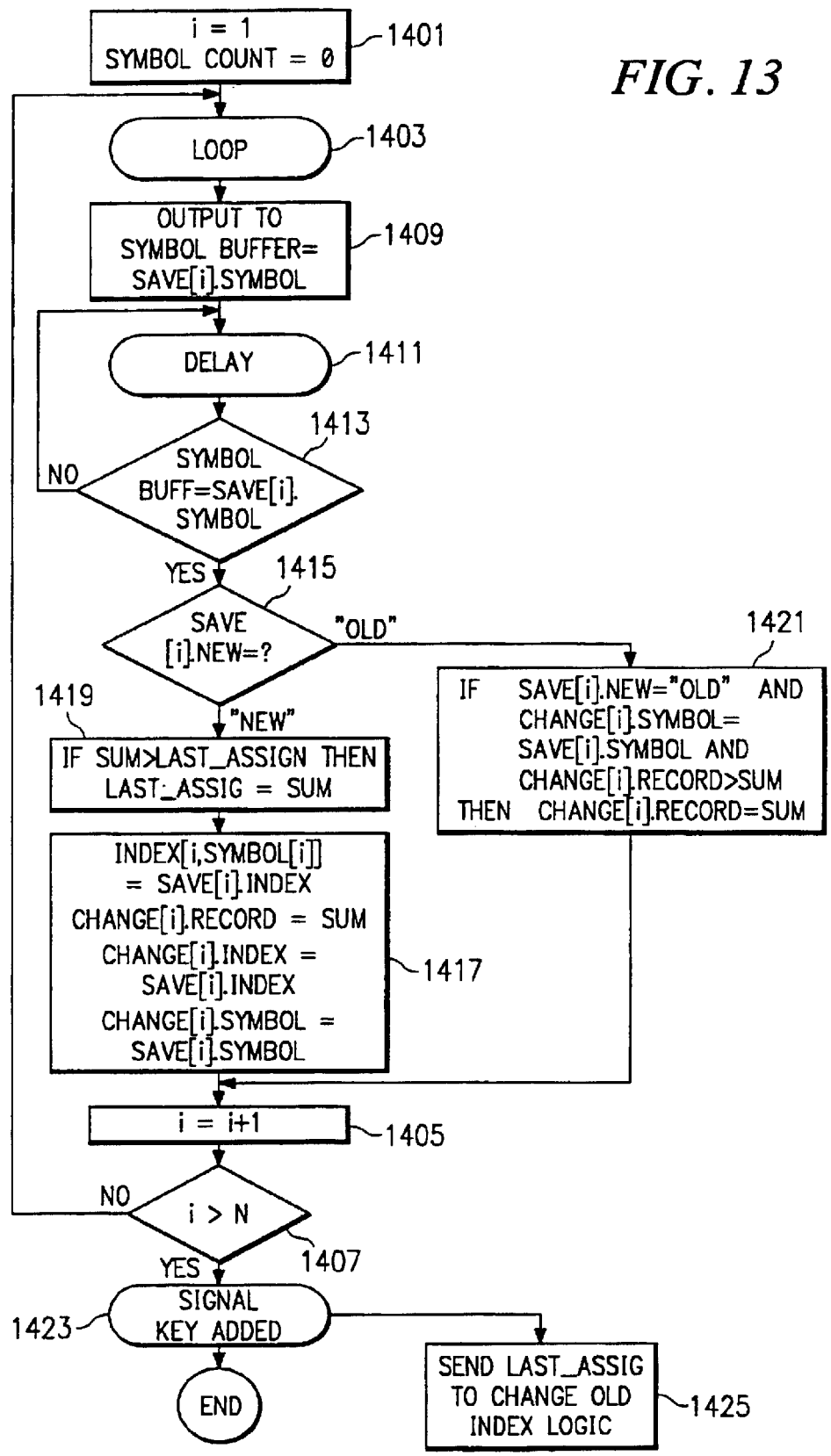
FIG. 13 is flow diagram describing the operation of a save new index logic component of the add key logic of FIG. 8.

Referring now to FIG, 12, once the processes of FIG. 12 are complete, change old index logic then signals store record logic 94 (FIG. 5), as indicated by block 1301, and passes to stored record logic the values for Directory_ Position, Increase and Last Assigned (a value is assigned to this variable by save new index logic as shown in FIG. 13). Store index logic utilizes these values to move a block of records within the record memory 78 (FIG. 5) addressed by record index values between Directory_Position and Last_ Assigned to new a new block of locations addressed by record index values from Directory_Position+Increase to Last_Assign+Increase, thereby making the "hole" in the record memory for storing the record associated with the new key.

Change old index value logic then updates the Save table and the Last_Assigned variable. "i" is set equal to Symbol_ Position, and Save[i].Index=Change[i].Index+Increase, Save[i].New="new", and Last_Assigned=Last_Assigned+ Increase, all as shown in block 1303. Then, as indicated by blocks 1305, 1307, and 1309, a loop is performed for each i beginning with i=Symbol_Position+1 and continuing to i>N to update the Change table to reflect the movement of the records in the record memory by store record logic, particularly Change[i].Record. To do this, the loop tests Change[i].Record, as shown in block 1311, to see if it is greater or equal to Directory_Position. If so, the step of block 1313 is performed, setting Change[i].Record=Change [i].Record+Increase.

After completion of the loop at block 1309, change old index value logic signals save new index value logic on line 926 and passes Sum, as shown by blocks 1315 and 1317.

Referring now to FIGS. 8 and 13, processes of save new index logic 909 begin with block 1401, in which i=1 and Symbol Count=0. The remaining process steps are part of a loop that is set up by steps shown in blocks 1403, 1405 and 1407 and repeated for each i, from i=1 to N. The loop therefore essentially sequences through each symbol position in the Save table 901. For each symbol position, it reads the symbol value, Save[i].Symbol, from the Save table and writes it to symbol buffer 104 using bus 929, as described in block 1409. Writing the symbol value to the symbol buffer 104 also strobes the symbol counter 104, as indicated by line 931. After a delay, indicated by block 1411, the value in symbol buffer 104 is tested against the value of Save[i] .Symbol to ensure that the value of Save[i].Symbol has been placed in the symbol buffer, as shown in block 1413.

If, as indicated by decision block 1415, the symbol position i has a new index value, Save[i].new="new", then the new index value is stored in the index memory 68 (FIG. 5) by simply writing it write index bus 520 (the symbol counter and symbol buffer already are set to select the correct symbol position and value entry). The new index value is also stored in the Change table 903. Save new index logic further stores the symbol value and Sum, the sum of the index values, in the change table. These steps are shown in block 1417, and described as: Index[i,Symbol[i]]=Save [i].Index; Change[i].Record=Sum; Change[i].Index=Save[i] .Index; and Change[i].Symbol=Save[i].Symbol. The variable Last_Assign is also set equal to Sum, as indicated in block 1419, but only if Sum is greater than Last_Assign. Otherwise, it remains unchanged.

If Save[i].new="old", then the steps of block 1417 are not performed, as there are no new index values that need to be updated. As shown in step 1421, only Change[i].Record needs to be updated by setting it equal to Sum, but only if Change[i].Symbol=Save[i].Symbol and Change[i].Record>Sum.

When i>N, the processes of save new index logic 909 exit the loop and signal the host system that the new key has been added, as indicated by block 1423. The value of variable Last_Assigned is passed to change old index logic 907 on line 927, as indicated by block 1425. This then completes the processes for adding a key according to a third method for keys presented in sorted order to the associative memory module 500 for adding. Further keys are added in the same manner.

Figure 14A:
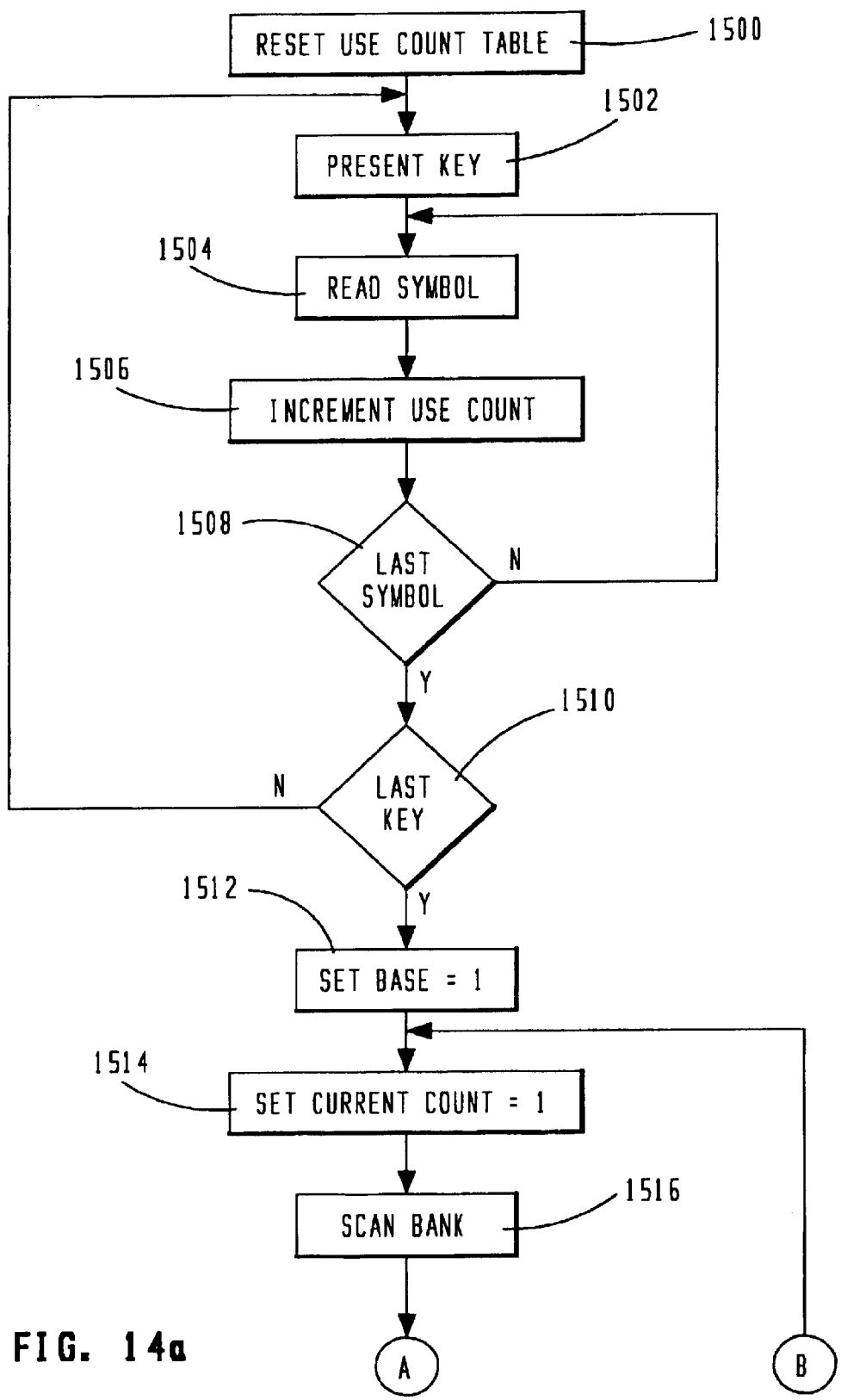
FIGS. 14A and 14B are a flow diagram describing a method for assigning index values to an entire key set.
Figure 14B:
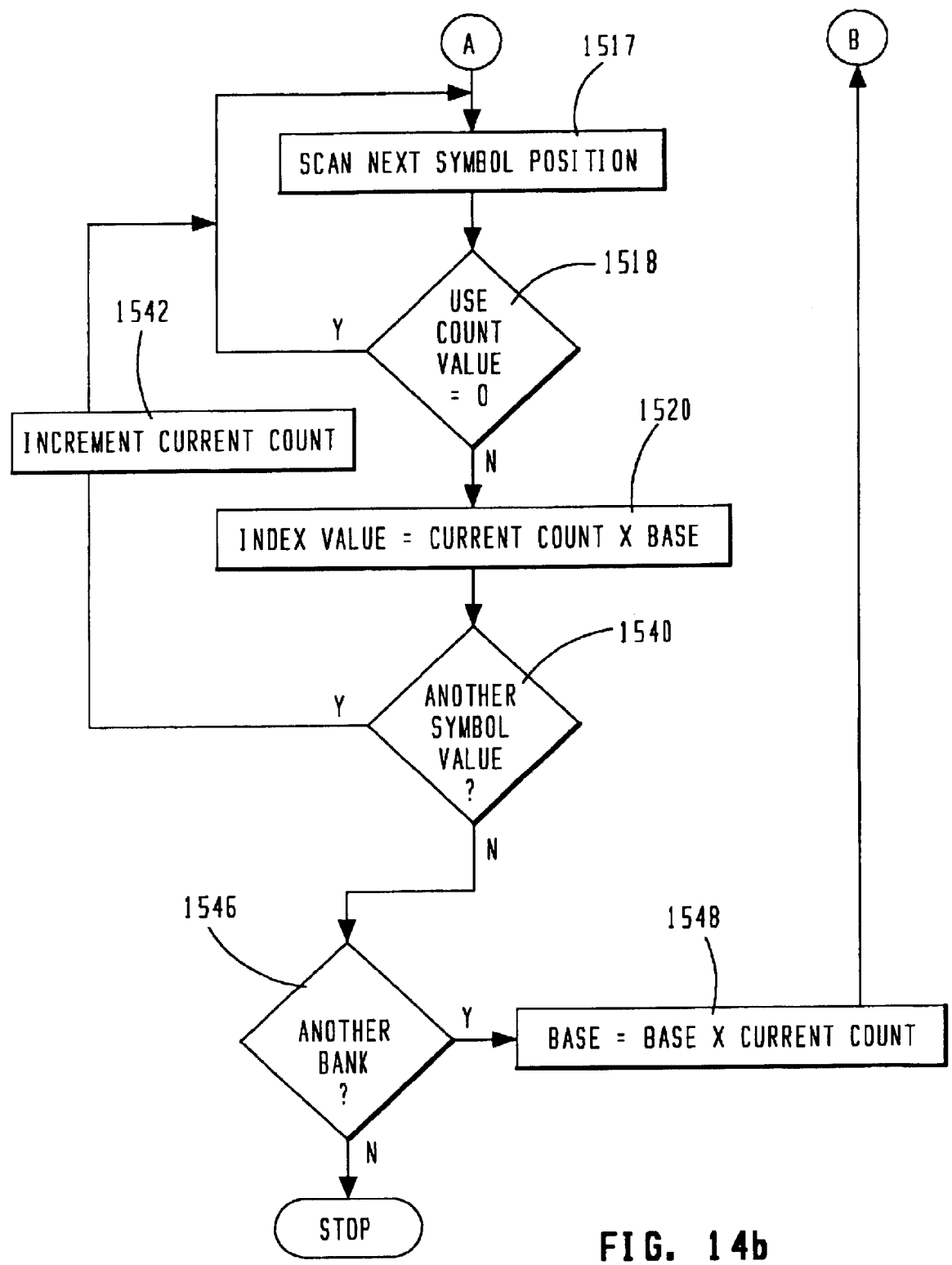

Referring now to FIGS. 3, 7 and 14, there is illustrated the hardware and a flow diagram required for the assigning of index values to an entire key-set group using an alternative method for assigning index values. The use-count table (801 of FIG. 7) is updated as a set of keys are presented to the system. Before the process of updating the use-count table begins, all positions within the use-count table are reset to zero or a null value at step 1500. The first key is then presented at step 1502 to the system logic and the first symbol of the key is read at step 1504.

At step 1506, the USE COUNT for the symbol value in the present symbol position is incremented by one to indicate a use of the symbol value. Next, a determination is made at step 1508 as to whether the final symbol has been presented for a key. If the last symbol has not been presented, control passes to step 1504 and the next symbol is read. If the last symbol for the key has been presented, step 1510 determines if another key is to be presented to the control logic. If another key is to be presented, control passes back to step 1502. Otherwise, control will pass to step 1512.

At step 1512, the BASE value for the least significant symbol position is set equal to one. For each subsequent symbol position or bank, the base value will equal the maximum index value for the previous symbol position. The CURRENT COUNT for the symbol position is then set equal to one at step 1514. The control logic scans at step 1516 the least significant bank values of the use count table. The first symbol value entry for the bank is read at step 1517. A determination is made at step 1518 if the initial use count table entry is greater than zero. If the entry is not greater than zero control passes back to step 1517 and the next symbol position for the present bank in the use-count table is read. If the value is greater than zero, an index value is assigned to the symbol at step 1520 and placed in the corresponding bank and position in the index table 98 of FIG. 3.

An inquiry at step 1540 determines if another symbol value exists for the present symbol position. If so, the CURRENT COUNT is incremented by one at step 1542 and control returns to step 1517. When no further symbol values exists in the current bank, the control logic looks for the next bank at step 1546. If another bank exists, the BASE value is set equal to the present BASE value times current count at step 1548 and control returns to step 1514. Otherwise, all index values for the keys have been assigned and the process is complete.

Figure 15A:
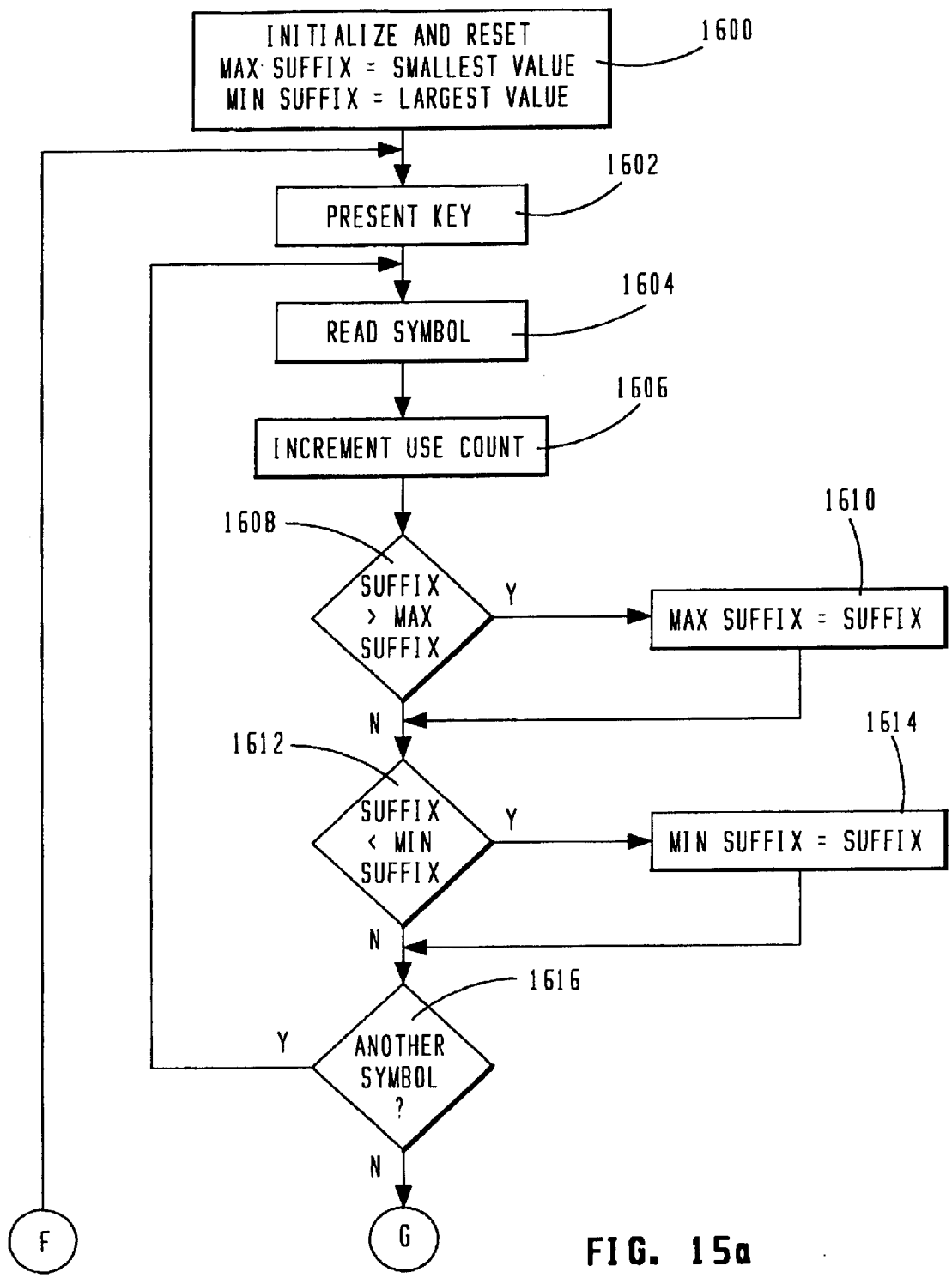
FIGS. 15A, 15B and 15C are a flow diagram describing another method for assigning index values to an entire key set.
Figure 15B:
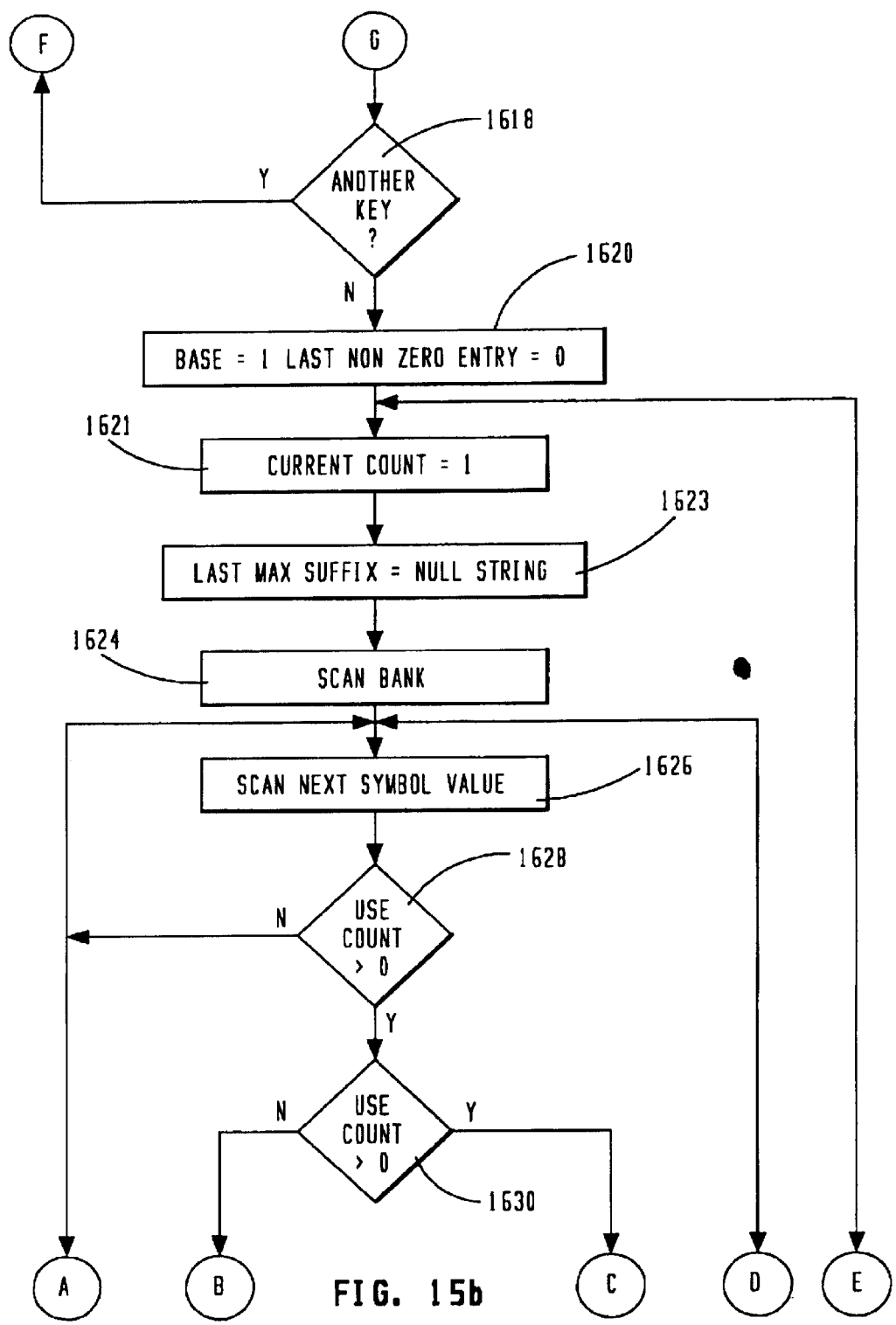
Figure 15C:
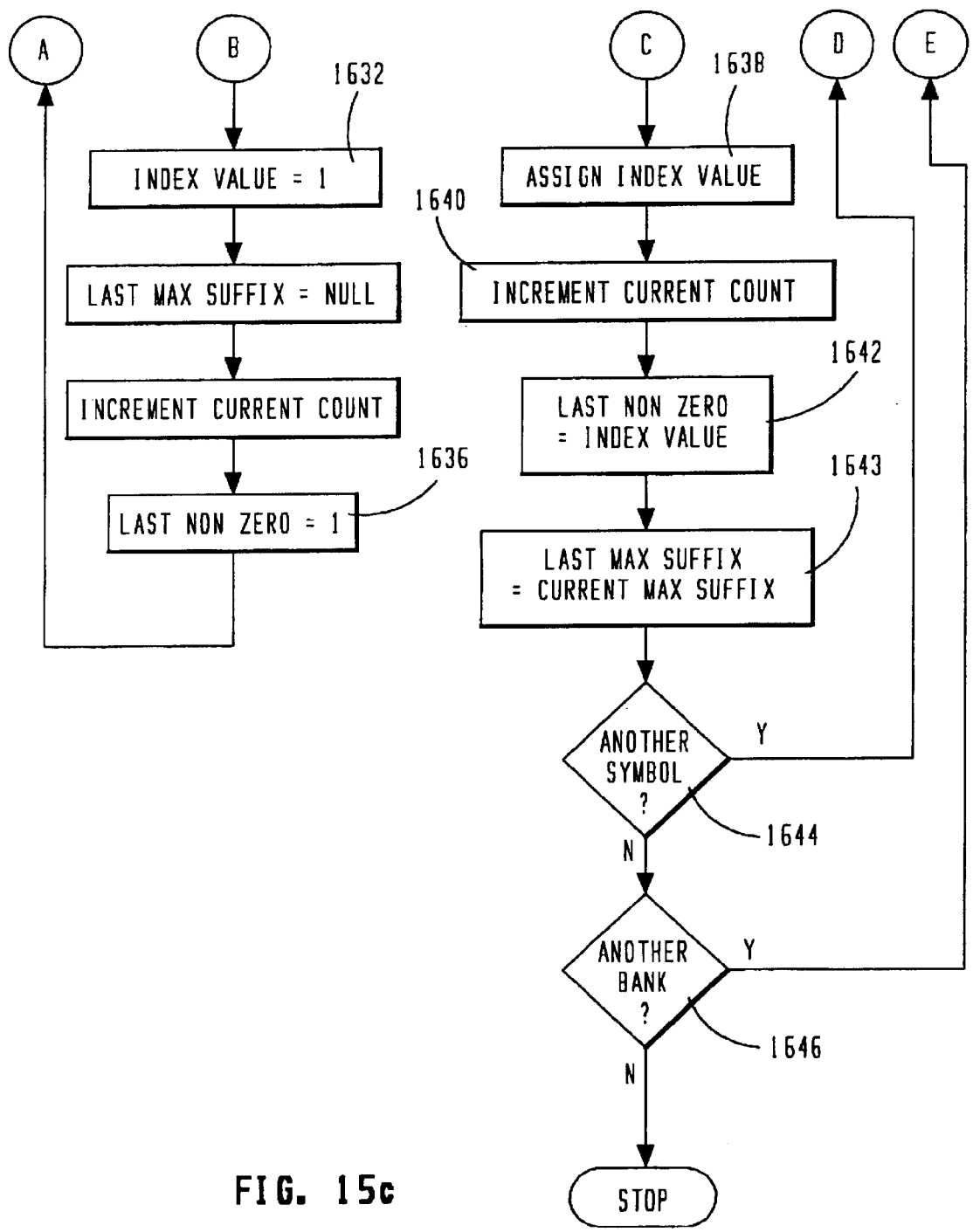
Figure 17:
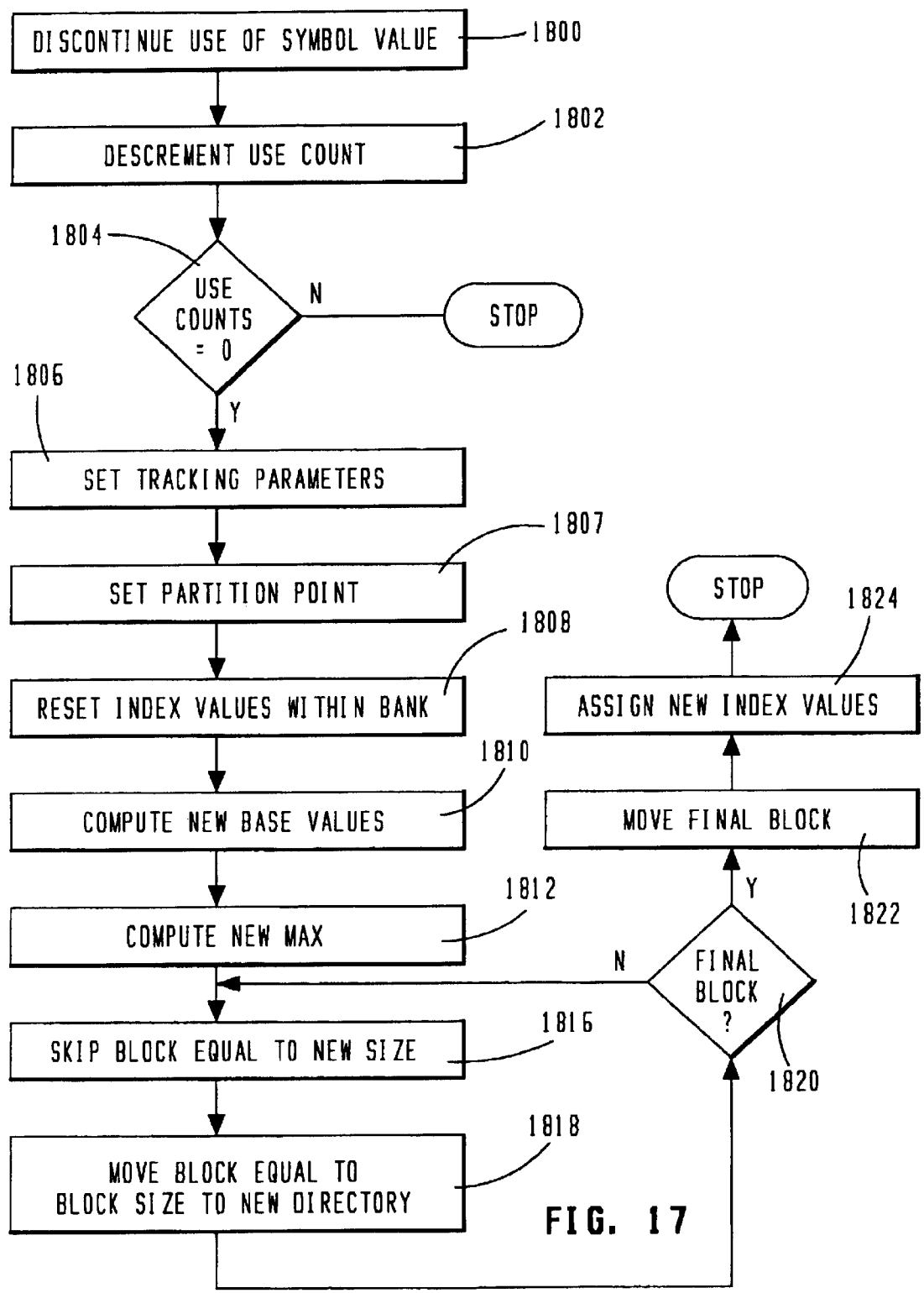
FIG. 17 is a flow diagram describing a method for removing an index value and contracting the directory to accommodate the removed index value.

Referring now to FIGS. 7, 15 and 17 another process is illustrated for assigning index values to symbols for an entire key set. Initially all index-value tables and use-count values are reset to zero or a null value at step 1600. This includes initializing values in the maximum suffix table 1910 to the minimum suffix symbol string and initializing the minimum suffix table 1920 values to the maximum suffix string. Next, a key is presented at step 1602 to the control logic and the first symbol of the key is read at step 1604. The use count for the read symbol value at the present symbol position is incremented at step 1606 to indicate a use of the symbol value at the symbol position.

An inquiry is made at step 1608 to determine if the suffix of the present symbol is greater in the collating order than the stored MAX SUFFIX. The suffix of a symbol in a key is the key ordered sequence of all the symbols of lower collating value than the current symbol. For example, the suffix of 3 in the key 12345 is 45 and the suffix of B in key ABCDE is CDE. The suffix relative size determination is based on the collating order of symbol in the suffix and not the index value. If the current suffix exceeds the previously stored MAX SUFFIX in collating order, the MAX SUFFIX is set equal to the present suffix at step 1610 and stored in the max suffix table 1910 (FIG. 18).

Should the suffix be less than MAX SUFFIX in collating order or after MAX SUFFIX is set equal to the present suffix, control passes to step 1612 where an inquiry is made to determine if the present suffix is less than the previously stored MIN SUFFIX symbol string. If so, at step 1614 the MIN SUFFIX is set equal to the present suffix symbol string and stored in the min suffix table 1920 (FIG. 18). Otherwise, step 1616 determines if another symbol value exists within the present key. If another symbol exists, the next symbol is presented to the control logic at step 1604; if not, step 1618 determines if another key must be presented to the control logic. Additional keys return control to step 1602.

Figure 18:
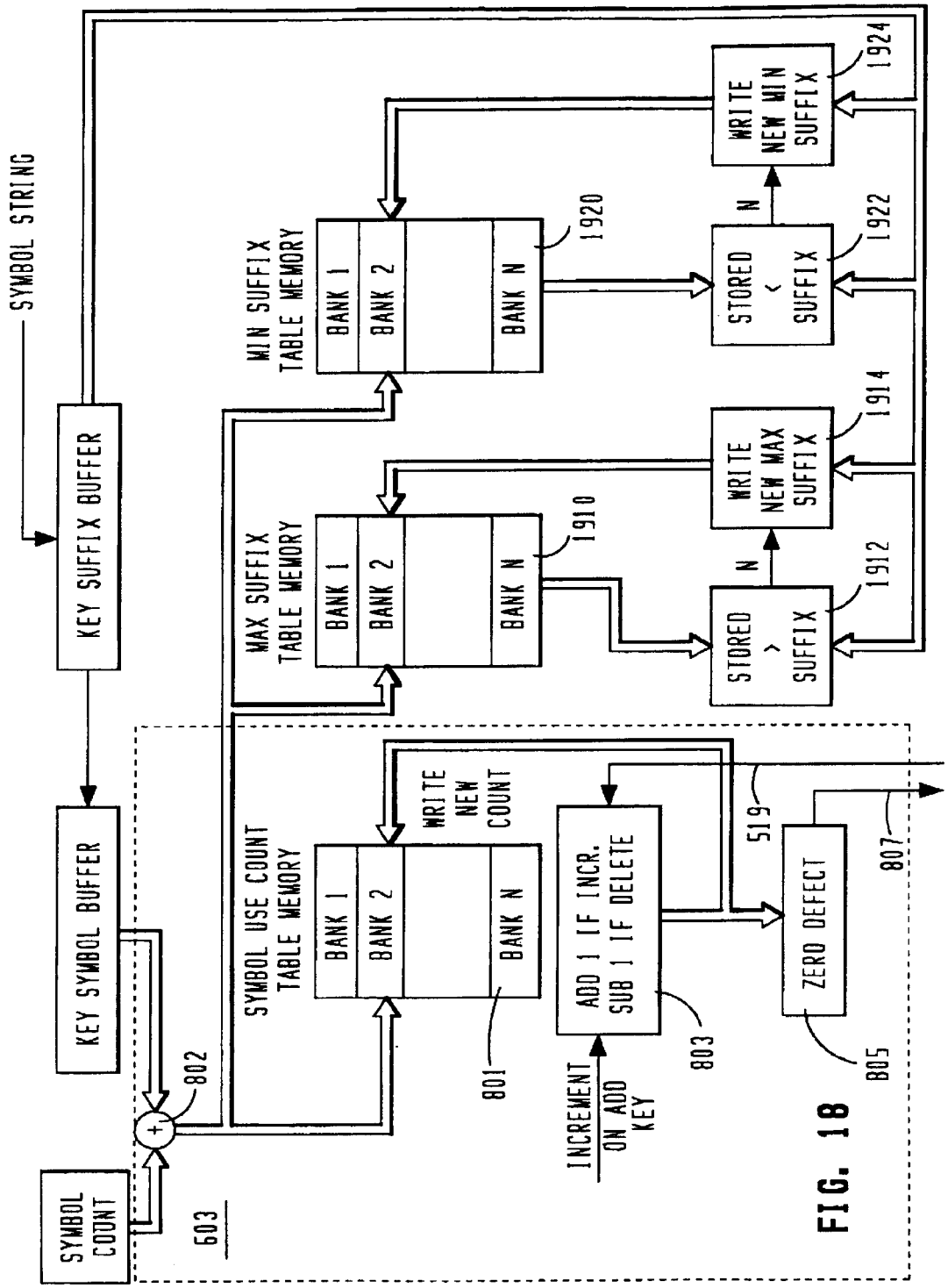
FIG. 18 is a schematic representation of a circuit implementing symbol use count logic, maximum suffix logic, minimum suffix logic and delete key logic for the method of FIG. 15.

Once all keys have been presented to the use count table 801 of 8 and 18, max suffix table 1910 of FIG. 18, and min suffix table 1920 of FIG. 17, control passes to step 1620 to begin the process of assigning index values to the key symbols. The use count table 801 of FIG. 7 and FIG. 18 stores integer count values. The max 1910 and min 1920 suffix table memories store symbol sequences. At step 1620, the base value for the least significant symbol position is set equal to one and the value for LAST NON-ZERO ENTRY is set equal to zero. Next at step 1622, the value for CURRENT COUNT is set equal to one. The least significant bank in the use-count table is scanned at step 1624. The initial symbol value in the bank is read at step 1626 and an inquiry is made at step 1628 to determine if the first symbol value use-count number is greater than zero. If not, control returns to step 1626 and the next symbol value in the bank is scanned. Otherwise, an inquiry is made at step 1630 to determine if the LAST NON-ZERO ENTRY value is greater than zero. If not, the symbol value is assigned an index value of one at step 1632, LAST MAX SUFFIX is set at step 1633 equal to a null string, the CURRENT COUNT is incremented at step 1634 and the LAST NON-ZERO ENTRY value is set equal to one at step 1636. Control then passes back to step 1626 and the USE COUNT value of the next symbol value in the use-count table is read.

If inquiry step 1630 determines the last non-zero value is greater than zero, the symbol position is assigned at step 1632 an index value according to the following equation:

Index value=last non-zero index value+max suffix index value for the last non-zero index value−min suffix index value for the present symbol value.

The max suffix and min suffix index values are equal to the sum of the index values of the key symbols comprising the suffix. The CURRENT COUNT is incremented and the LAST NON-ZERO ENTRY value is set equal to the present index value at step 1634. At 1643, the last max-suffix value is set equal to the max-suffix value for the current position. The max and min suffix values for the least significant symbol position or bank are both zero.

Inquiry step 1636 determines if the last symbol value for the bank has been scanned. If not, control returns to step 1626 and the next symbol value is read. If the last symbol value has been read, step 1638 determines if another symbol position exists in the use-count table and if so returns control to step 1622; otherwise, the procedure is completed and all the symbol values have been assigned an index value.

Figure 16:
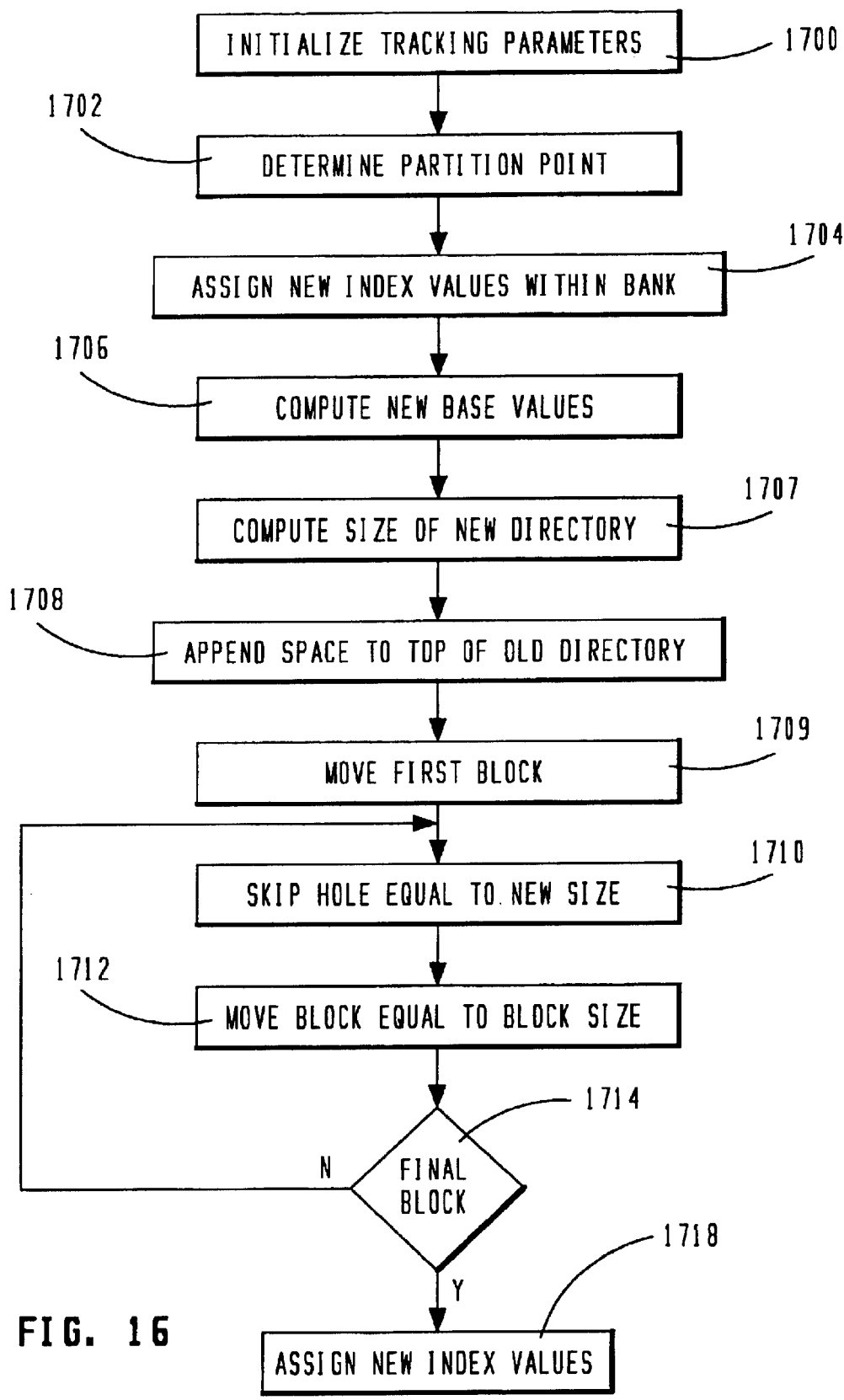
FIG. 16 is a flow diagram describing a method for assigning an index value and expanding the directory to accommodate the new index value.
Figure 19:
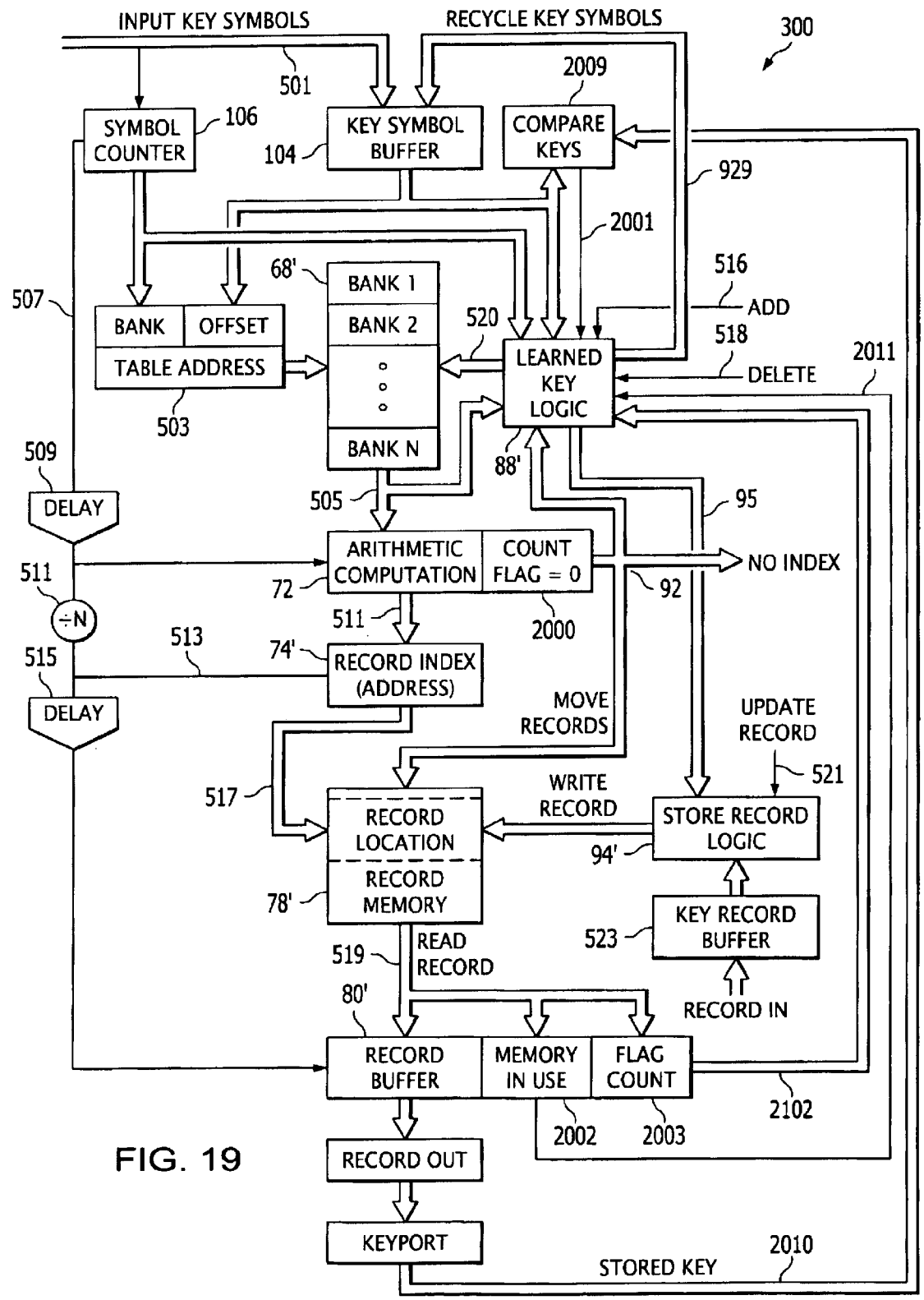
FIG. 19 is a schematic representation of an alternative embodiment of an associative memory module.

Referring now to FIGS. 7, 16 and 19 there is described a method for incrementally updating the index tables and directory table of the present invention. This dynamic directory sizing process allows the number of non-zero entries in the index value tables to expand and contract as new keys are added or deleted and to minimize the size of the directory. This method expands the ADD KEY and DELETE KEY logic (601 and 605 of 88 in FIG. 6) processes earlier described. The USE-COUNT logic (603 in FIGS. 6 and 7) remains the same. As before, the ADD-KEY logic will only operate when the ZERO DETECT (92 of FIG. 6) indicates that a symbol value location in a bank of the index value table has no index value assigned or the compare keys (2009 of FIG. 19) indicates a key mismatch. When the ZERO DETECT or key mismatch is indicated, the ADD KEY logic 601 activates the ADD-NEW-SYMBOL process. The ADD-NEW-SYMBOL process produces a non-zero index value for a symbol value which previously had a zero or null index value or in which the count flag was zero. In addition, the ADD-NEW-SYMBOL process increases the higher order index values above the new index value.

The ADD-NEW-SYMBOL process operates as illustrated in FIG. 17. First, several parameters are initialized at step 1700 to track the symbol positions within the index value table and directory table. The size of the spaces to be left to accommodate the new symbol value is calculated and set equal to NEW SIZE. NEW SIZE equals the base value of the bank where the partition point will occur. The size of the directory block to be moved, BLOCK SIZE, is set equal to the maximum index value in the bank were the partition point will occur before the index values are changed. The number of BLOCK SIZE directory blocks to be moved is calculated by dividing the size of the old directory by BLOCK SIZE. This value is set equal to NUMBER OF BLOCKS.

Next, the partition point within the bank where the new symbol value will be added is determined at step 1702. When count flags are used, the compare keys logic 2009 of FIG. 19 compares the new key with the stored key and provides the learned key logic 88 with the symbol positions and symbol values that are different between the two keys. One of the symbol positions is selected and the symbol value having a count flag equal to zero has its count flag set to one. At least one of the two symbol values must have its count flag set to zero or the symbols would not have the same index value.

The partition point is the point at which any pre-existing index values will be lower in symbol value than the new symbol to be added. The partition point is determined by counting the number the of non zero count flags or non-zero index values from the beginning of a bank to the new symbol value including the new symbol value. When non-zero index values are counted, this count value is multiplied by the base of the present bank. The product is the index value for the new symbol. When count flags are used, the index value is already assigned to the partition point location in the index table. The new index value(s) within a bank is assigned at step 1704 by increasing each non-zero index value located higher in the bank by the base value for the bank. The symbol value of the partition point is saved in a register PARTITION SYMBOL and the index value for the partition point is saved in PARTITION INDEX.

At step 1706 new base values for banks above the partition point in the collating sequence are computed based upon the added symbol value where a present base value equals the previous base value times the number of non-zero index values in the present bank. Then the size of the new directory is computed at step 1707 as the new base value for the most significant symbol position times the number of non-zero index values in that bank or symbol position. This is the same as the largest new index value in that bank.

Next, memory space is appended to the top of the old directory at step 1708 to accommodate the new symbol value within the new directory. The amount of memory appended equals the new directory size minus the old directory size. First, the block between the top of the old directory and the index value of the next non-zero count flag above the partition point are moved at step 1709 from the old directory location to the end of the new directory location. The size of the first block equals the number of non-zero count flags or index values above the partition point to the end of the bank multiplied by the base value for the bank. The result is saved as ABOVE COUNT.

At step 1710, the key values in each of the NEW SIZE locations just below the block in the old directory moved at either step 1709 or 1712 are examined to determine if the symbol value at the partition point is greater than the PARTITION SYMBOL value. If the stored key symbol has a symbol value greater than PARTITION SYMBOL, the record associated with the key symbol is moved up from its current location in the old directory to the corresponding point in the NEW SIZE hole below the block just moved at either step 1709 or 1712. If the symbol value is equal to or less than PARTITION SYMBOL the record is left in its present position in the old directory. This process creates a hole below the previously moved block with selected records moved into the hole in the new directory table at step 1710. The hole size is equal to NEW SIZE. This hole accommodates entries using the new symbol value, including those which already used that value if count flags are used. At the end of the hole, another block of directory locations are added to the new directory at step 1712. The size of this block equals BLOCK SIZE. This next block to be moved starts at the next location below the last location of the previous block moved from the old directory to the new directory by either step 1709 or 1712.

The elements of each block moved are selected in descending order between partition points in the old directory. An inquiry step 1714 determines if the final old directory block has been reached. The final block is already stored at the correct location in the new directory if the same memory location is used for both the new and old directory. If not the final block, the next new index value space of block size is skipped at step 1710. The size of the final directory block equals BLOCK SIZE minus the size of the first block. This process of moving directory records from the old directory to the new directory allows the new directory to be built on top of the old directory location.

Finally, at step 1718 the new index values for the symbol positions in the banks following the partition point are calculated using the new base values. The new index values are assigned by assigning the base value to each location in the bank from the first location up to and including the first location having a non-zero count flag or a non-zero index value. After each non-zero count flag or non-zero index value location, the index value assigned is increased by adding one more base value to the previous value until all previous non-zero index value or non-zero count flag entries in the bank have been assigned.

When a key symbol is removed from the index table, the REMOVE KEY LOGIC executes a compact process. The compact process is the reverse of the expand process and removes the index value of the symbol from its bank of the index value table and adjusts the value of the remaining symbol value indexes to compact the directory to a minimal size.

Referring now to FIG. 17, once a use of a symbol value discontinues at step 1800, the use count for that symbol value is decremented by one at step 1802. A determination is then made at step 1804 to determine if the use count for the symbol value equals zero. If not, the process stops and no further action is taken. Should the use count equal zero, then all the other use counts using this index value must also be zero, before the index value may be removed. In other words, all symbol values with the same index values must all have zero use counts before the REMOVE KEY LOGIC begins a compact process to decrease the size of the directory table and reassign index values in the index-value table.

First, tracking parameters are set at step 1806. These parameters include determining NEW SIZE, BLOCK SIZE, and NUMBER OF BLOCKS. These values are calculated is the same manner as described earlier for the ADD NEW SYMBOL process. The partition point of the bank where the symbol is to be removed is set equal to the index value of the removed symbol at step 1807 and the index values within the bank are reset by subtracting the base value from every non-zero index larger than the partition point in the bank at step 1808. Next, the new base values for the index value table are computed at step 1810. Then the size of the new directory NEW MAX is computed at 1812. NEW MAX equals the base value of the most significant symbol position times the number of non-zero index values or valid flags plus one in that bank.

The STORED RECORD LOGIC 94 moves the old directory to its new location. The MOVE directory process iterates over the old directory starting at the bottom and going up until all blocks have been processed. Initially the data between the beginning of the directory and the partition point is already the beginning of the new directory. Next, at step 1816 a group of data corresponding to directory locations utilizing the removed index value are skipped or removed from the directory. This group of removed data blocks is equal to the value of NEW SIZE.

Next, a block of data directly after the removed block and equal to BLOCK SIZE is moved down to fill in the removed block of data at step 1818. If inquiry step 1820 determines the last block has not been reached, control passes to step 1816 where a block of data is skipped in the old directory corresponding to NEW SIZE and a BLOCK SIZE number of entries are moved down to fill the removed data. Finally, the last block of data having a size corresponding to the value of BLOCK SIZE minus the length of the block of data between the beginning of the directory and the original partition point is moved below the final block at step 1822.

After the new directory has been created, new index values are assigned at step 1824 in the index value table and are calculated using the new base values and current count for the bank as described earlier. The new index values may be calculated at any point after the NEW BASE values are calculated 1810. Once the new index values are assigned, the compact processing is complete.

Figure 20:
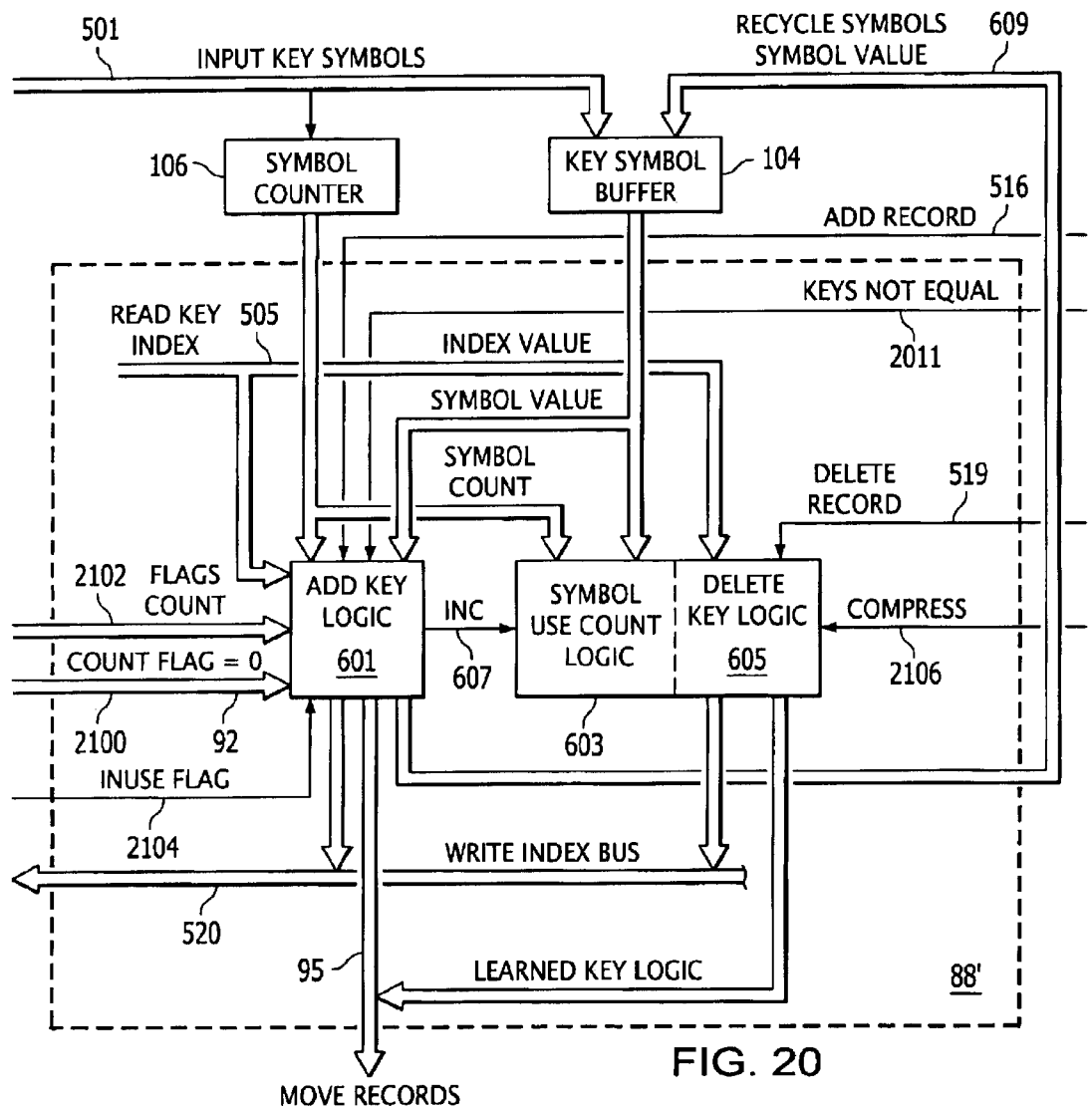
FIG. 20 is a schematic representation of a circuit for learned key logic for the associative memory of FIG. 19.
Figure 21:
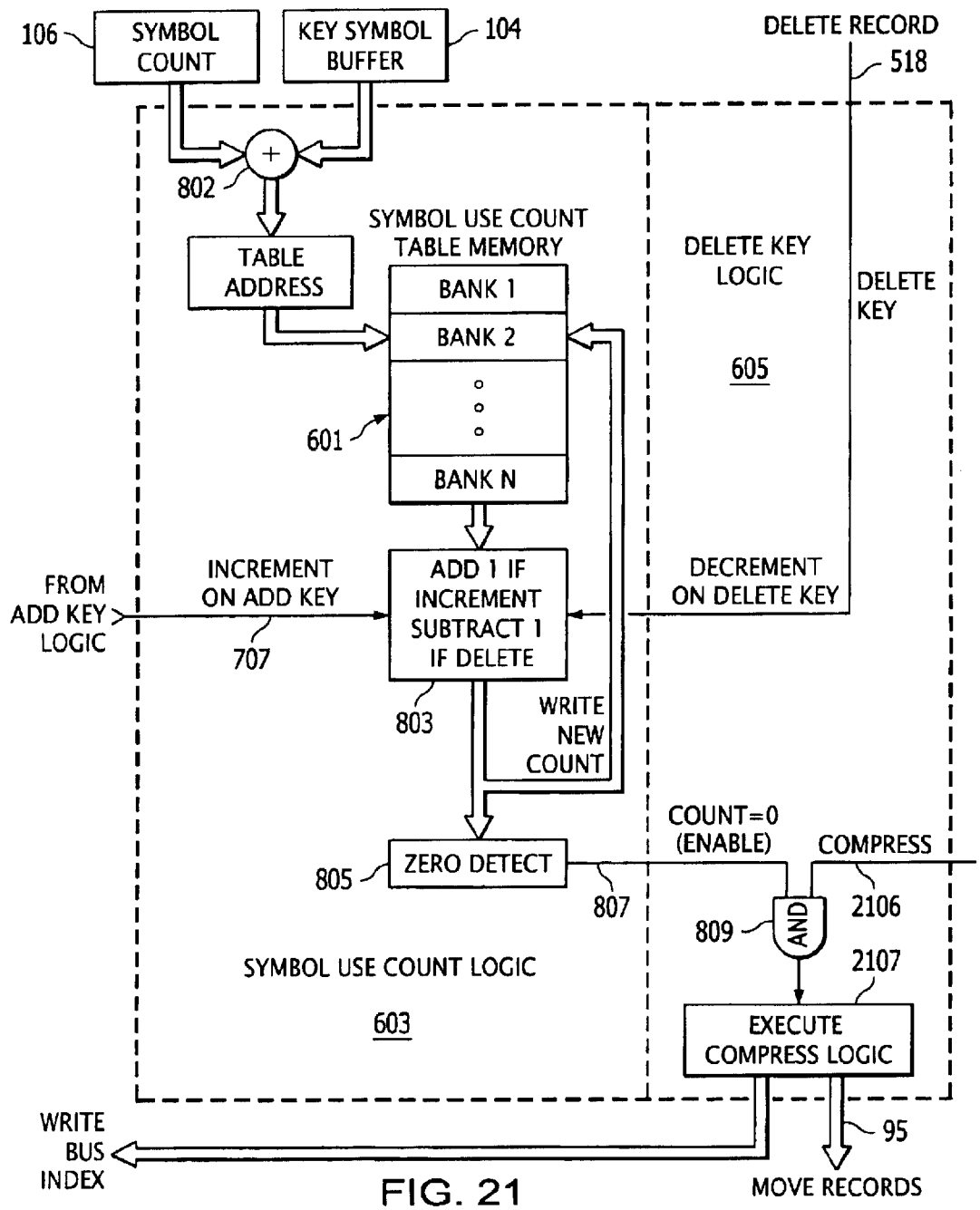
FIG. 21 is a schematic representation of a circuit implementing symbol use-count logic and delete key logic for the learned key logic circuit of FIG. 20.

Referring now to FIGS. 19 to 21, there is illustrated yet another embodiment of the invention. The embodiments in FIGS. 19 to 21 are slightly altered from the apparatus disclosed in FIGS. 5, 6 and 7 and enables index values to be assigned to valid and invalid key symbol locations within the INDEX VALUE TABLE 68. This allows an index value to be calculated for record keys containing invalid key symbols. The calculated index value will point to a location in the neighborhood of index values for record data with similar key values.

Referring now to FIG. 19, this figure illustrates the generic associative memory of FIG. 5, shown with the addition of count flag logic 2000 and in-use logic 2002, flag count logic 2003 and compare keys logic 2009. Other than the above mentioned components, the circuitry and logic are the same as described with respect to FIG. 5 and similar reference numbers have been used. The count flag logic 2000 counts the number of invalid key symbols in a key symbol string. An invalid key symbol is one whose corresponding valid symbol flag bit in the INDEX TABLE of FIG. 5 is zero. In the method of FIG. 19, all index table entries are non-zero (zero value entries may also be used) and each index table entry includes a valid symbol flag bit to indicate whether a symbol value is valid or invalid. The count flag logic 2000 determines the number of invalid symbols by checking the valid symbol flag bit for a symbol position in the INDEX VALUE TABLE 68 for each symbol presented. Each integer value in the INDEX VALUE TABLE 68 has an additional flag bit which is set to one (1), if the index value stored at that location is different from the next higher location in that bank. This occurs when the table location (i.e., the BANK and symbol value) was used to compute the index value stored at this location. The flag is set to zero (0) if the table location is not used to determine a record index value stored at this location. Index values stored at these zero flag locations are duplicate of the higher adjacent location.

The memory in-use logic 2002 checks a memory in-use flag bit within the key record memory 78 to determine if record data is stored in the location pointed to by a record index 74 value. The bit is set to one (1) if data is currently stored at a location and zero (0) if no data is currently stored at the location. The flag count logic 2003 is the value from the count flag logic 2000 generated when the record index 74 is computed. In addition, the input key 501 being presented to the associative memory must be compared in compare keys logic 2009 to the sequence stored in the key record to determine if the keys are identical. If the input key 501 and the stored key 2010 are not identical, the learn key logic 88 is notified by the keys not equal flag line 2011.

Referring now to FIG. 20, this figure illustrates the learned key logic circuitry 88 from FIG. 19. The learned key logic 88 functions in a similar manner as that discussed in FIG. 6. Where appropriate, the reference numbers in FIGS. 6 and 20 are the same. The circuitry is similar to that of FIG. 6 with the following exceptions. The add key logic 601 no longer is connected to a zero detect line but instead receives input over the count flag line 2100. The count flag line indicates when an invalid input key symbol has been detected. Also connected to the add key logic 601 is the flags count line 2102 which inputs to the add key logic 68 the number of invalid symbols contained within a key record stored in record memory 78. The in-use flag line 2104 provides the add key logic 68 with an indication of whether a key record memory 78 location presently contains record data. The keys not equal flag line 2011 provides the add key logic 68 with an indication of whether the stored key (if there is a stored record) and the input key match. The delete key logic 605 receives commands over the compress logic line 2106 and the delete record line 519.

Referring now to FIG. 21, there is shown the symbol use-count logic 603 and delete key logic 605. The circuitry shown in FIG. 21 is similar to that of FIG. 7. Where applicable the previous description and reference numbers remain the same. The circuitry functions in a similar fashion with the following exceptions. The compress line 2106, as described in FIG. 20, enters the delete key logic 605 and connects to AND gate 809. The compress signal command and a logical signal from the zero detect circuitry 805 are applied to AND gate 809. Both signals being true causes the execute compress logic 2107 to compress record data to fill in locations vacated by removed data.

Figure 22A:
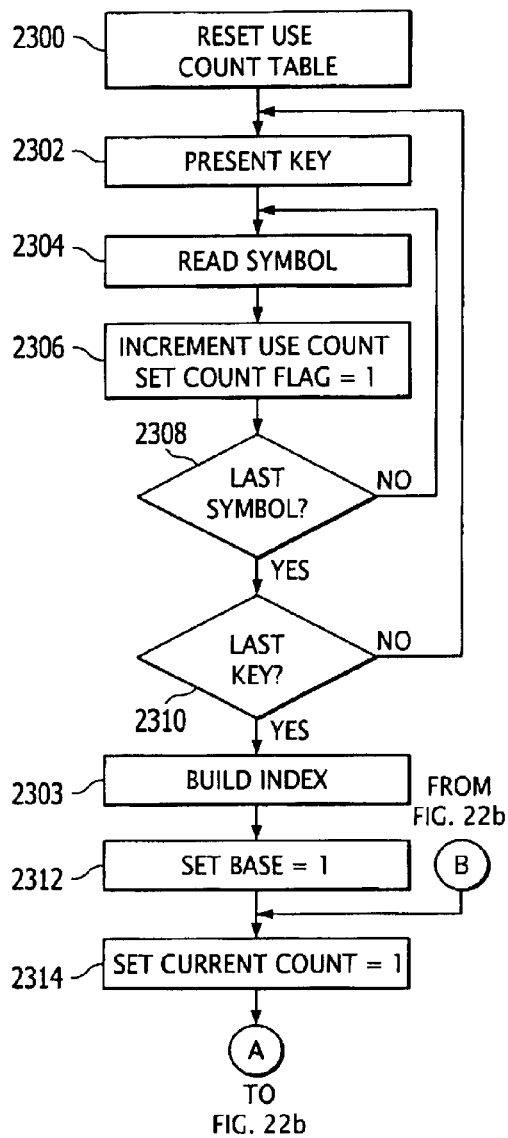
FIG. 22 is a flow diagram illustrating the method for assigning index values to an entire key set group, including all invalid symbol values.
Figure 22B:
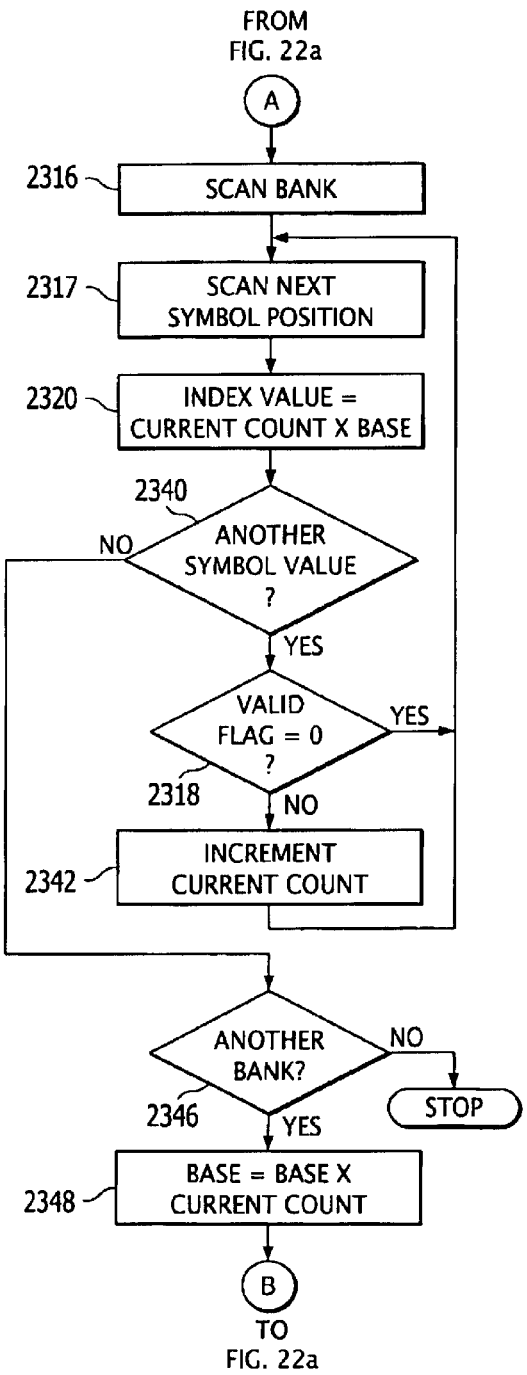

Referring now to FIGS. 22a and 22b, there is illustrated a flow diagram describing the method for assigning index values to an initial or entire key-set group including valid and invalid symbol values using an alternative method for assigning index values. The USE-COUNT TABLE (801 of FIGS. 7 and 21) is updated as a set of keys are presented to the circuitry. Before the process of updating the USE-COUNT TABLE 801 begins, all positions within the USE-COUNT TABLE are reset to zero or a null value at step 2300. The first key (for instance a text string or DNA sequence) is then presented at step 2302 to the system logic and the first symbol of the key is read at step 2304.

At step 2306, the USE-COUNT for the symbol value in the present symbol position is incremented by one and the index table count flags set to one to indicate a use of the symbol value at the present symbol position. Next, a determination is made at step 2308 as to whether the final symbol has been presented for a key. If the last symbol has not been presented, control passes to step 2304 and the next symbol is read. If the last symbol for the key has been presented, step 2310 determines if another key is to be presented to the control logic. If another key is to be presented, control passes back to step 2302. At step 2303, the build index logic 2305 initiates the building of the INDEX VALUE TABLE.

At step 2312, the BASE value for the least significant symbol position is set equal to one. For each subsequent symbol position or BANK, the base value will equal the maximum index value for the previous symbol position. The CURRENT COUNT for the symbol position is then set equal to one at step 2314. The control logic initially scans at step 2316 the least significant BANK values of the USE-COUNT TABLE. The first symbol value entry for the BANK is read at step 2317. An index value is assigned to the symbol position in the INDEX VALUE TABLE at step 2320 by multiplying the CURRENT COUNT by the BASE VALUE and the result is placed in the corresponding BANK and position in the INDEX VALUE TABLE 68 of FIG. 19.

Inquiry step 2340 determines if another symbol value exists for the current symbol BANK. If so, a determination is made at step 2318 if the SYMBOL VALID FLAG entry equals zero. If the entry equals zero, control passes back to step 2317 and the next symbol position for the present BANK in the USE-COUNT TABLE is read and assigned an index value which is the same as the previously assigned index value. If the count flag equals one, CURRENT COUNT is incremented by one at step 2342 and control returns to step 2317. When no further symbol values exists in the current BANK, the control logic determines if another BANK exist at step 2346. If another BANK exists, the BASE value is set equal to the present BASE value times current count at step 2348 and control returns to step 2314. Otherwise, all index values for the keys have been assigned and the process is complete.

Once completed, each symbol position within the INDEX VALUE TABLE 68 is assigned an index value, including invalid symbol positions not used by the presently stored symbol key set. With all the index table locations assigned a value, one can rapidly determine the "closeness" of an input key string sequence containing invalid symbols to key sequences already encoded into the USE-COUNT TABLE. Once the initial INDEX VALUE TABLE 68 values have been assigned using the process of FIGS. 22a thru 22c, additional keys may be added to associative memory. If the sum of the symbol index values identifies a location in RECORD MEMORY 78 where the IN-USE flag is not set (location not currently used) then the IN-USE flag is set and the record and key are stored with no modification to any index values in the INDEX VALUE TABLE 68. The USE-COUNT TABLE is updated with counts for all the new key symbols. If RECORD MEMORY 78 location for the new key (i.e., the sum of the symbol index values) is IN-USE (IN-USE set) and the keys are different then the values in the INDEX VALUE TABLE 68 must be modified to make room for the new key using the method described in FIG. 16.

When a key is entered for which the sum of the symbol index values equals a record location which is already in use, and the key already stored in the location is different from the new key, the values in the INDEX VALUE TABLE 68 must be expanded to make room for the new key (or one of the keys must be discarded). The new key and the stored key are compared in the compare keys logic 2009. The compare keys logic 2009 informs the learned key logic 88 of the symbol positions and symbol values that differentiate the two keys. Symbol positions with different symbol values must be assigned the same index value or the two keys would not have the same index sum. To distinguish the two keys, one of the different symbol values must be assigned a different index value. The process defined in FIG. 16 describes the method for assigning one symbol a new-index value and relocating all the effected key records.

Figure 25:
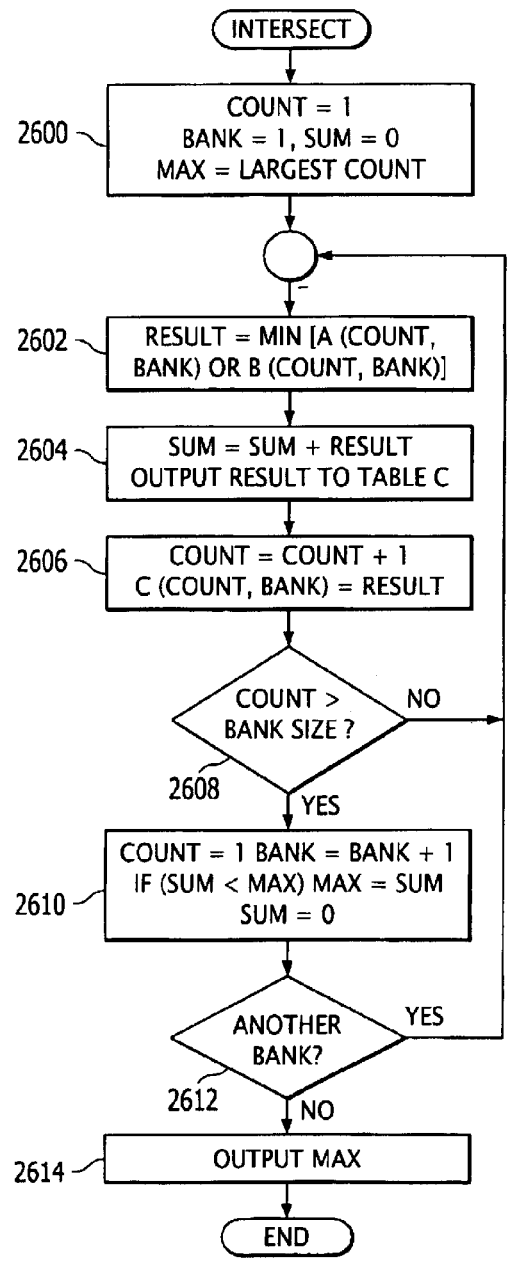
FIG. 25 is a flow diagram of a intersect function for use with the associative set processor of FIG. 23.

In yet another embodiment of the invention, the USE-COUNT TABLES for various key sets may be applied to an associative set processor to obtain information regarding maximum key set sizes resulting from set operations union or intersection of one or more key sets. Referring now to FIG. 25, there is shown a block diagram for an associative set processor 2400 and its included circuitry. Two separate memory locations contain the set A symbol USE-COUNT TABLE 2402 and the set B symbol USE-COUNT TABLE 2404. It is to be understood that while the following description of operations relates to the use of two USE-COUNT TABLES, the operations are not limited to the union or intersection of two USE-COUNT TABLES. Both of these memory locations are connected to the associative set processor 2400.

The associative set processor 2400 is capable of performing a number of set operations. These operations include a union function 2406 for creating a table of all elements existing within the two USE-COUNT TABLES (2402 and 2404), an intersect function 2408 for creating a table containing all common elements between the two USE-COUNT TABLES and a mask function 2410 for combining a mask table, where some or all of the entries equals one (1), with a symbol USE-COUNT TABLE to create an output table, wherein each USE-COUNT position, having a value greater than zero (0) and the corresponding location in the mask table is equal to one (1), then the resulting table location is set to the USE-COUNT. The associative set processor 2400 outputs to a result table location 2412. A table access counter 2414 allows the associative set processor 2400 to sequentially read through all the locations of the two input tables 2402 and 2404 and place the results of the set operation in the corresponding location of the result table 2412. The table access counter includes the BANK and COUNT of FIG. 24. At the end of an operation on two input tables, set A and set B, the maximum set size 2415 has been computed for the resulting set C which is the largest number of records in the set resulting from the same union, interest or mask operation being performed on the two key sets represented by table A 2402 and table B 2404.

Figure 23:
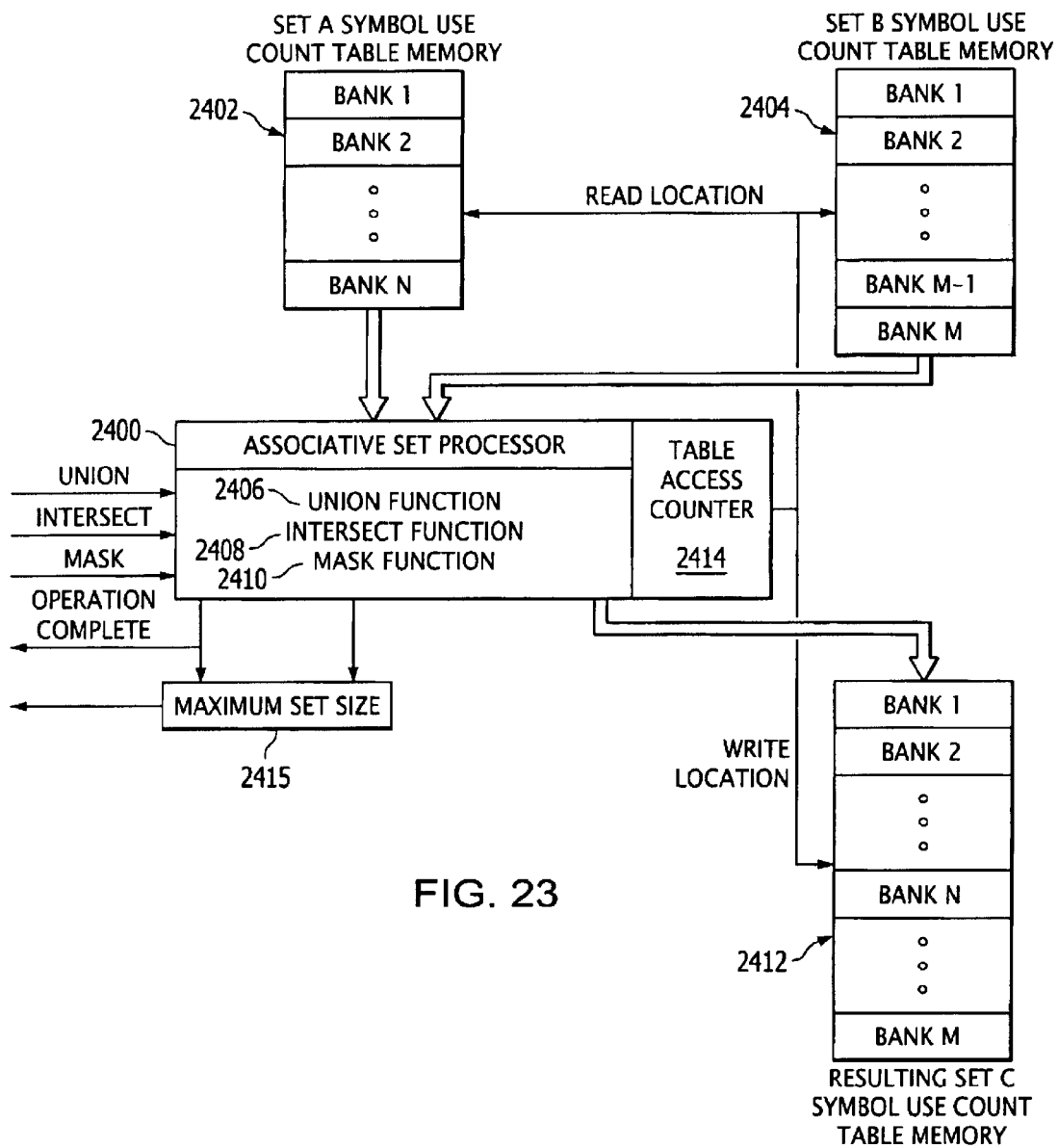
FIG. 23 is a schematic diagram for an associative set processor and its included circuitry.
Figure 24:
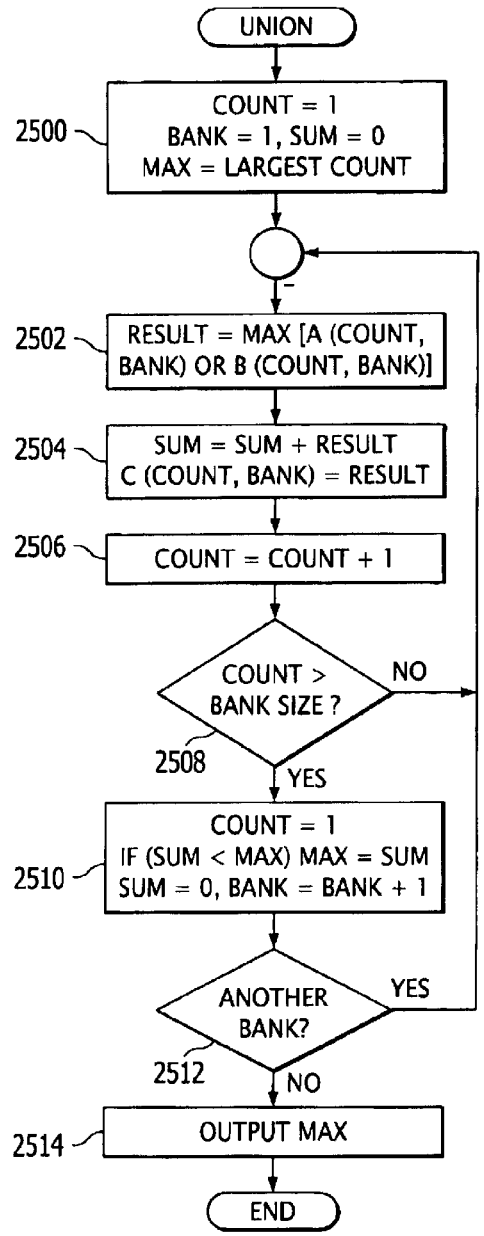
FIG. 24 is a flow diagram of a union function for use with the associative set processor of FIG. 23.

Referring now to FIG. 24, there is shown a flow diagram illustrating the method for carrying out the union function 2406. Initially, several counters are set at step 2500. COUNT and BANK, the table access counter 2314, are both set equal to one (1) and SUM is set equal to zero (0). MAX is set equal to the largest integer count. At step 2502, the maximum value of the first COUNT and first BANK position between the first USE-COUNT TABLE and second USE-COUNT TABLE is determined and stored at RESULT. RESULT is added to SUM at step 2504. Then RESULT is stored in the corresponding location of table 2412. Next, COUNT is incremented by one (1) at step 2506, and inquiry step 2508 determines if the value of COUNT has exceeded the size of the largest bank position. If the value of COUNT is less than the size of the bank position control passes back to step 2502 to determine the maximum value of the next position within the bank of the USE-COUNT TABLES A 2402 and B 2404. The RESULT is stored in TABLE C 2412. Once the maximum value of all symbol positions within a bank have been determined by (COUNT>BANK size) at 2508, control passes to step 2510 where COUNT is set equal to one (1). If SUM is less than MAX the value of the MAX is set equal to SUM. SUM is then set equal to zero (0), and BANK is incremented by one (1). Inquiry step 2512 determines if another bank exists, and proceeds to step 2502 to determine the maximum values within the next bank. If other banks do not exist, the value of MAX is output at step 2514 into maximum set size 2415 (FIG. 23). The value of MAX stored in maximum set size 2415 (FIG. 23) represents the maximum number of RECORD MEMORY 78 entries that could result from a union of the key sets of the RECORD MEMORIES corresponding to USE-COUNT TABLES A and B. That is a union of the keys of RECORD MEMORIES A and B can result in a RECORD MEMORY C with no more than MAX key records.

Referring now to FIG. 25, there is illustrated a flow diagram of the operation of the intersect function 2408. Counters are initialized at step 2600. These counters include COUNT and BANK, which are set equal to one (1), and the SUM counter, which is set equal to zero (0). MAX is set to the largest count value. The initial value of RESULT is determined by finding the minimum value in the first BANK, first COUNT position of the A and B USE-COUNT TABLES (2402, 2404) at step 2602. RESULT is added to the value of SUM at step 2604 and the value of RESULT is output to the RESULT TABLE 2412. Next, COUNT is incremented by one (1) at step 2506 and inquiry step 2608 determines if the COUNT is greater than the size of the present bank. If count is less than the present bank size, control returns to step 2602. Otherwise at step 2610, COUNT is reset to one (1), the BANK value is incremented by one (1) and the value of MAX is set equal to SUM if SUM is less than MAX. SUM is then reset to zero (0).

Inquiry step 2612 determines if another bank exists within the USE-COUNT TABLES. If additional banks exists control returns to step 2602. If all banks have been reviewed by the intersect function, the value of MAX is output to maximum set size 2415 (FIG. 24) at step 2514 by the associative processor. MAX represents the maximum number of key records contained in the record memory C from an intersect of the keys of record memories A and B.

Figure 26:
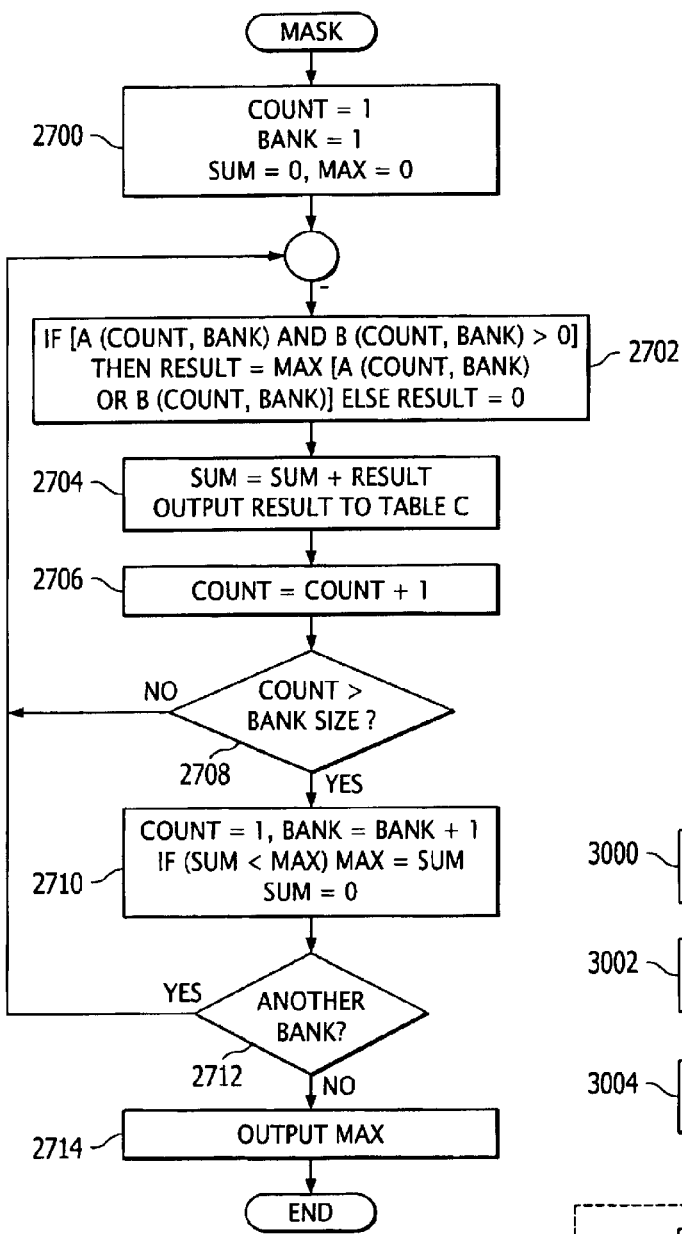
FIG. 26 is a flow diagram of a mask function for use with the associative set processor of FIG. 23.

Referring now to FIG. 26, there is shown the method for performing the mask function of the associative set processor 2400. The mask table may be either table A or B. Counters are initialized at step 2700, wherein COUNT and BANK are set equal to one (1) and SUM is set equal to zero (0). MAX is set to the largest count value. Decision step 2702 determines if the value in the symbol position presently pointed to by the COUNT and BANK counters in USE-COUNT TABLES A and B, are both greater than zero (0). If so, then RESULT is set equal to the maximum value at this symbol position in either USE-COUNT TABLE A or B. If the symbol position in USE-COUNT TABLES A and B are not both greater than zero (0), RESULT is set equal to zero (0). SUM is then set at step 2704 equal to the value of SUM plus RESULT and the value of RESULT is output to the RESULT TABLE 2412.

COUNT is incremented at step 2706 and inquiry step 2708 determines if COUNT is greater than the size of the present bank. If COUNT is less than or equal to BANK SIZE then all symbol positions within a bank have not been examined and control returns to step 2702. If all symbol positions have been examined, control passes to step 2710, COUNT is reset to one (1) and BANK is incremented by one (1). Also at step 2710, if SUM is less than the value of MAX, MAX is set equal to SUM then SUM is set equal to zero (0). Inquiry step 2712 determines if another bank exists to be examined. If another bank exists control passes to step 2702. If no other banks are present, the value of MAX is output at step 2714 to indicate the maximum number of key records that can be in the key record memory resulting from the mask operation.

Figure 27:
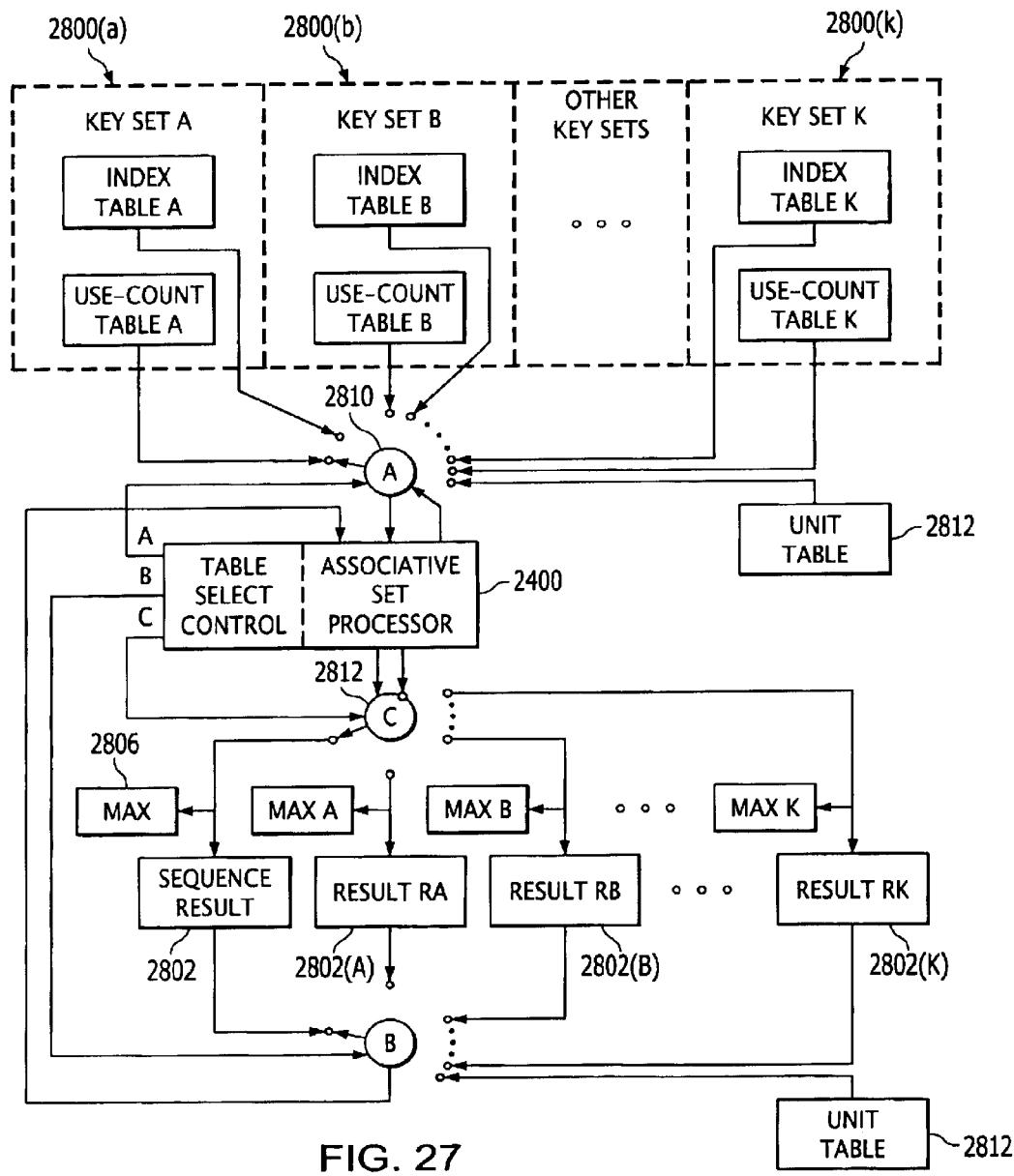
FIG. 27 is a block diagram illustrating the use of an associative set processor to combine a plurality of use count tables.

Referring now to FIG. 27, a series of USE-COUNT or INDEX tables 2800(*a*) through 2800(*k*) may be combined by a series of set operations into a result table 2802. This sequence of set operations is performed on like tables (either USE-COUNT or INDEX) using the associative set processor 2400. Initially, the RESULT table 2802 has all its entries set to the counts in the first table 2800(*a*). The table select switch 2810 selects the next table 2800(*b*) and the set operation is performed with set A stored in the result table 2802. Result table 2802 holds the USE-COUNT results of the operation between the first two record memories tables, for example the results of A intersect B. The input table selector switch 2810 is then set to the third USE-COUNT Table C 2800(*c*) and the set operation with the result table 2802 is preformed, for example R union C. is (A intersection B) union C. The input and output table selection switches (2810 and 2812) are controlled by the associative set processor 2400 and sequence through all the USE-COUNT tables for all the record memory to be combined according to a user specified sequence of operations to perform the required set operations on each input USE-COUNT table. The result of each set operation includes a MAX value 2806 which is the maximum number of key records which meet the combined set operations. If during the processing, no union operations are left to be performed and the MAX value is zero (0), then there are no records in the resulting set, all the values in one bank of the result table 2802 are zero (0), and processing may stop with a null result. If after processing all the input tables, MAX is greater than zero (0), then the result table 2802 stores the resulting USE-COUNT table. This resulting USE-COUNT table may be used to filter all the original record memories to produce the record memory data set resulting from the sequence of operations. The resulting record memory can have no more than the final MAX records.

To filter the original record memory data sets, the following operations are executed. First the result table 2802 containing the resulting USE-COUNTS for the sequence of set operations is intersected using the associative set processor 2400 with a unit table 2812 containing all one counts in every location. This intersection operation produces a results MASK table where every entry is either zero (0) if the result count was zero (0), or one (1) if the result count was greater than zero (0). Using the associative set processor 2400, a MASK operation as illustrated in FIG. 26 is performed with each of the initial input index tables 2800(*a*), 2800(*b*) . . . 2800(*k*) to produce result index tables 2802(*a*), 2802(*b*) . . . 2802(*k*) for the original record memory data sets. If the MAX value is zero (0), then the results set has no records.

Figure 28:
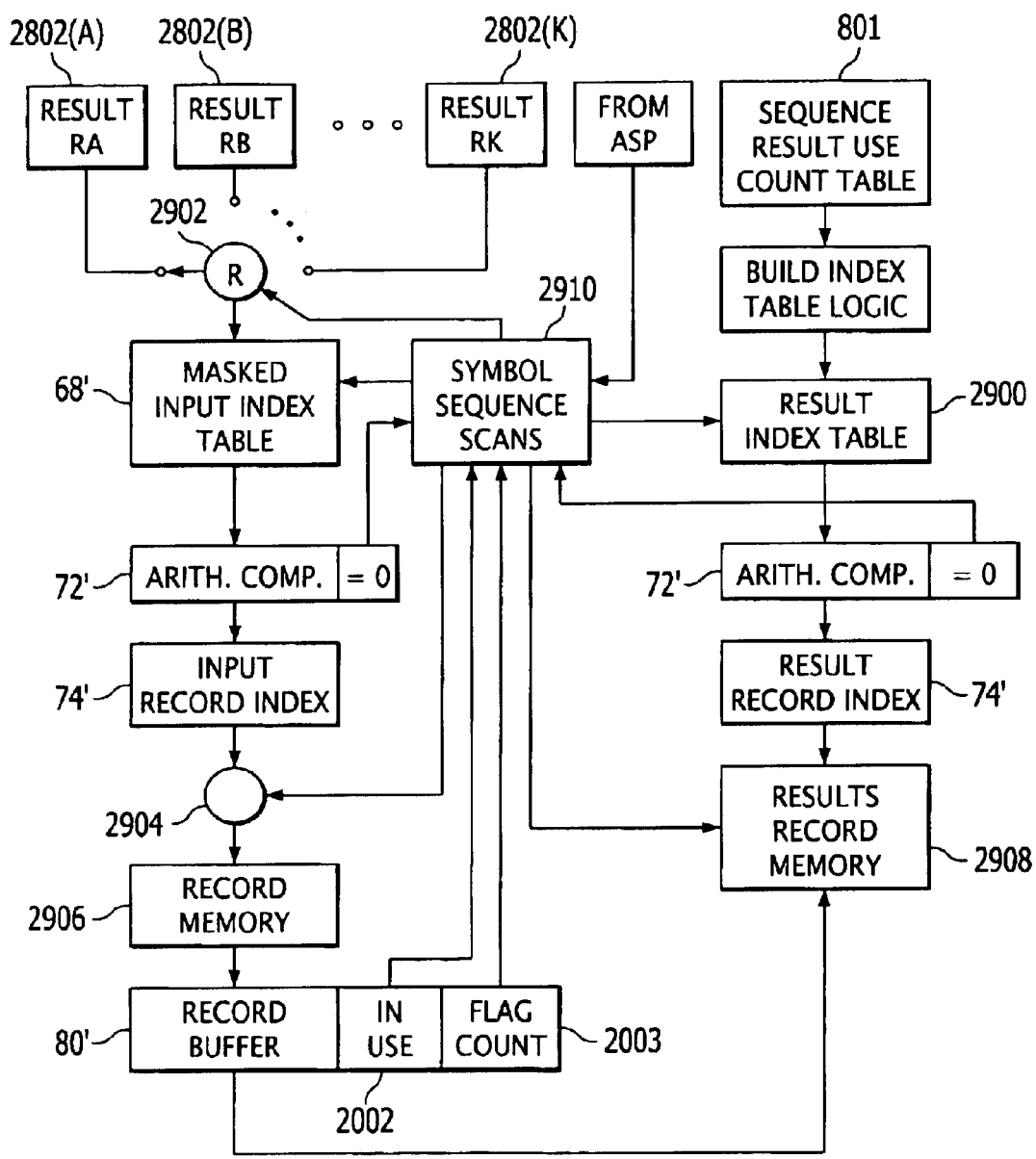
FIG. 28 is a block diagram illustrating the preparation of a result record memory from a plurality of results tables.

Referring now to FIG. 28, the results table 2802 in FIG. 27 containing the USE-COUNTS resulting from a sequence of set operations is used to generate an result index table 2900 using one of the index table creation processes previously described in FIGS. 5 to 22. Wherein similar functional elements to those previously described in FIGS. 5 to 22 are used, the same reference numerals have been utilized and the previous drawings and related description may be referred to for a more detailed disclosure of the functional element. By cycling through only the combinations of index values greater than zero (0) in each input index result table 2802, only the records belonging to the resulting set are selected from the record memory for each original set. The table selector switch 2902 and the record memory selector switch 2904 provide access to a result index table 2802(*n*) and its associated record memory 2906(*n*). For each resulting index table 2802(A), 2802(B) . . . 2802(K) the record memory 2906(A), 2906(B) . . . 2906(K) is accessed for each combination of non-zero index values. For each such record memory location which has a record stored indicated by INUSE flag bit 2002, that record is placed in the results record memory 2908. The location in the results record memory 2908 is computed using the sum of index values from the new result index table 2900.

Figure 29:
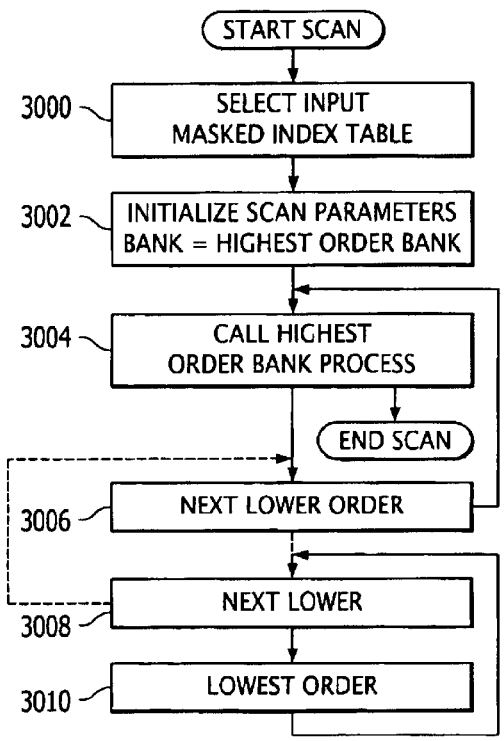
FIG. 29 is a flow diagram illustrating the symbol sequence scanner logic of FIG. 28.
Figure 30C:
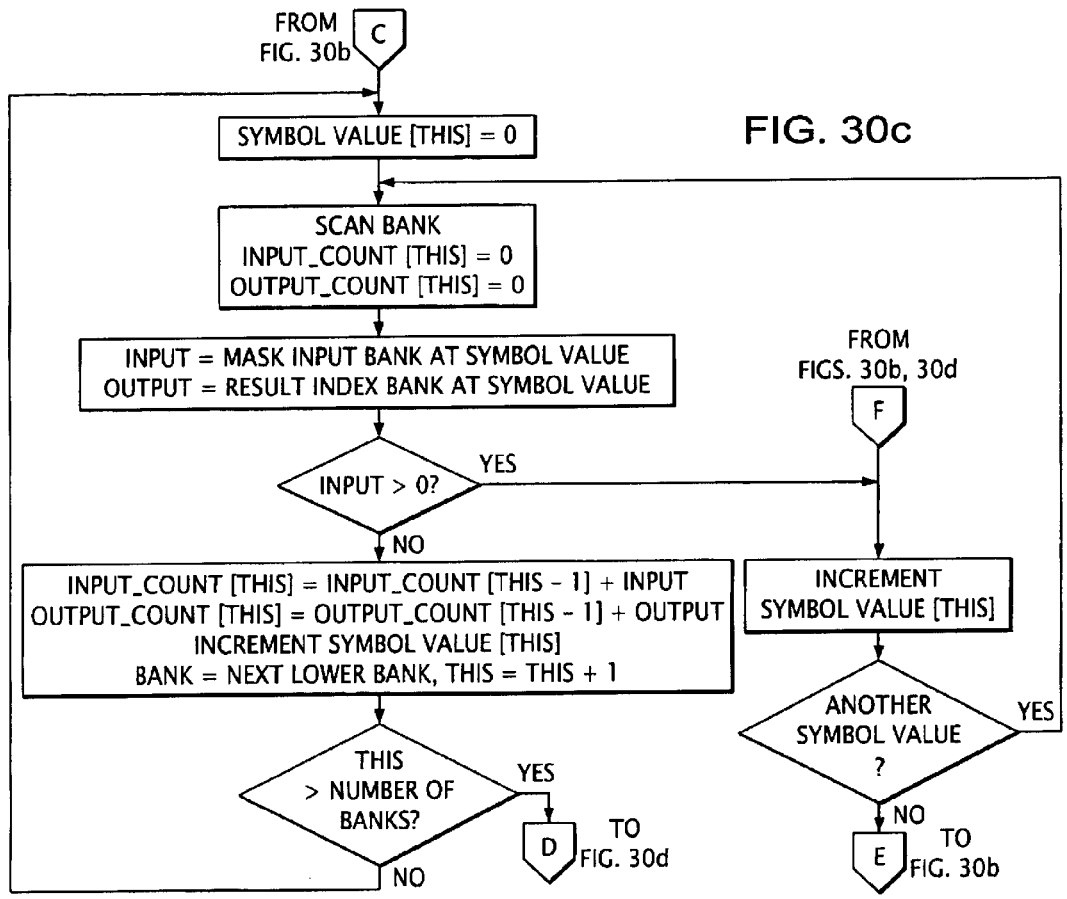
Figure 30D:
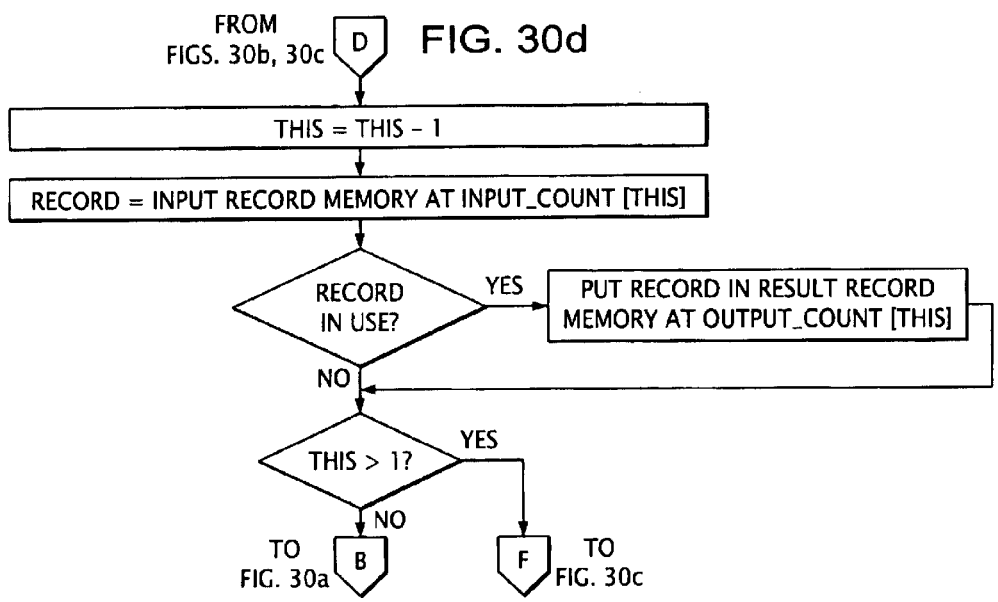

FIG. 29, is a flow chart of the symbol sequence scanner logic 2910 of FIG. 28. The scanner sequences through the all input result index table 2802(A) . . . 2802(K) at step 3000 and selects one at a time. At steps 3002 through 3010 the scanner generates all the non-zero input record indexes for the table. These are the records which could possibly meet the results set of a sequence of set operations between this set and all of other sets. First, the highest order bank or symbol position is scanned for a non-zero index value or count flag at step 3004. For each non-zero value found in the highest order bank, all the lower order bank values are scanned at step 3006 through 3010 and each non-zero index value is used to compute a record index. A record index is the sum of a non-zero index value from bank. FIG. 30*a* shows a flow chart for the highest order bank process. INPUT is the index value at the current symbol value location in the masked input index table 67. OUTPUT is the index value from the result index table 2900 for the same location. FIGS. 30*b* and 30 *c* are continuations of the flow chart for the next lower order bank processes. A partial index sum INPUT-COUNT and OUTPUT-COUNT is kept for each bank. FIG. 30*d* illustrates the lowest order bank process where all INUSE=true records are copied from the input record memory to the results record memory. Each record is stored at a location which is the sum of the index values from the result index table 2900 of FIG. 28.

Although preferred and alternative embodiments of the present invention have been illustrated in the accompanying Drawings and described in the foregoing Detailed Description, it will be understood that the invention is not limited to the embodiments disclosed, but is capable of numerous rearrangements, modifications and substitutions of parts and elements without departing from the spirit of the invention.

What is claimed is:

1. In a communications node of a system, a method for routing data packets comprising:

receiving a first data packet, the data packet including a a first internet protocol (IP) address for identifying a mobile source of the data packet independently of the physical media over which the mobile source is communicating;

storing the first IP address and associating it with a physical media path from which the first data packet was received;

receiving a second data packet, the second data packet including the first IP address for identifying the mobile source as a destination of the second data packet and a second IP address for identifying the sender of the data packet;

looking up the physical media path associated with the first IP address; and forwarding the second data packet based on the stored physical media path.

2. The method of claim 1 wherein first IP address uniquely identifies the mobile source for routing data packets within public; interconnected networks.

3. The method of claim 1, further comprising, looking up filtering information for second IP address; and filtering the data packet based on the filtering information.

4. In a communications node of a system of interconnected networks, a method for routing data packets comprising:

storing a unique internet protocol (IP) address for identifying a mobile receiver of a data packet anywhere within the interconnected networks, independently of the physical media over which the mobile receiver is communicating;

associating the unique IP address with a physical media path;

receiving a data packet having a source IP address identifying a sender of the data packet and the mobile receiver's IP address identifying the mobile receiver as a destination for the data packet;

looking up the physical media path along which to forward the data packet using the entire mobile receiver's IP address contained in the data packet; and forwarding the data packet according to the physical media path.

5. The method of claim 4, further comprising, looking up filtering information for source IP address; and filtering the data packet based on the filtering information.

6. A communications node for routing data packets, each such data packet including a first internet protocol (IP) address for uniquely identifying a mobile source of each such data packet independently of the physical media over which the mobile source is communicating within the interconnected networks the communications node including a packet routing device for routing the data packets and a data structure stored in a memory for associating the first IP address of a first data packet sent by a mobile source with a physical media path identifier identifying the physical media path from which the first data packet was received; wherein, when the communications node receives a second data packet that includes the first IP address as identifying the mobile source as a destination of the second data packet, and a second IP address for identifying a source of the second data packet, the packet routing device looks up in the data structure the physical media path identifier associated with the first IP address and forwards the second data packet to the physical media path identified by the physical media path identifier.

7. The communication system of claim 6 wherein the first IP address is a globally unique identifier.

8. The communications node of claim 6, wherein the communications node stores source IP address filtering information and includes circuitry for filtering the data packet in response to the source filtering information stored for the second IP address.

9. A communications node for routing data packets, each such data packet including a source internet protocol (IP) address for uniquely identifying a source of each such data packet independently of the physical media over which the source is communicating with the interconnected networks, and a destination IP address for identifying a destination of the data packet, the communications node including a packet routing device and a data structure stored in a memory for storing the source IP address of a first data packet sent by a mobile source and associating it with a physical media path identifier to which the first data packet was forwarded by the communications node; wherein, when the communications node receives a second data packet, which includes the first source IP address of the first data packet as identifying the source of the second data packet, the packet routing device looks up in the data structure the physical media path identifier of the node associated with the the source IP address and forwards the second data packet.

10. The communication system of claim 9 wherein the first IP address is a globally unique identifier.

11. A communications node for connecting a plurality of networks comprising:

a packet routing device for routing data packets, each of the data packets containing a source IP address identifying a source of the data packet and a destination IP address identifying a destination of the packet, and a data structure for storing a first internet protocol (IP) address that uniquely identifies a host within the plurality of networks independently of physical media on which the host is communicating, the data structure associating the first IP address with routing information for forwarding data packets containing the first IP address as the destination IP address;

wherein the packet routing device includes a circuit for looking up routing information in the data structure for forwarding a data packet to the host using the entire first IP address contained in the data packet.

12. The communications network of claim 11, wherein the circuit for looking up includes a circuit for determining an index into the table.

13. The communications node of claim 11, wherein the communications node stores source filtering information, and includes circuitry for looking up source filtering information using the source IP address of each data packet and filtering the data packet.

14. A communication system comprising a message handling node for routing a data packet between two or more networks, the data packet destined for a mobile receiver having an internet protocol (IP) address for identifying the mobile receiver to each of the two or more networks independently of the physical media path over which the mobile receive is communicating; the data packet including a source IP address for identifying a sender of the data packet and the mobile receiver's IP address as a destination IP address; the message handling node storing a data structure associating routing information for the IP address of the mobile receiver and routing the data packet based on the routing information for the mobile receiver's IP address.

15. The communication system of claim 14, wherein the at least one messaging handling node routes the data packet based on the entire IP address of the mobile receiver.

16. The communication system of claim 14 wherein the IP address of the mobile receiver is a globally unique IP address.

17. The communication system of claim 14, wherein the message handling node includes storage of source IP address filtering information and circuitry for filtering the data packet in response to the source filtering information stored for the source IP address of the data packet.

* * * * *

UNITED STATES PATENT AND TRADEMARK OFFICE
CERTIFICATE OF CORRECTION

PATENT NO. : 6,819,670 B1
DATED : November 16, 2004
INVENTOR(S) : Peter R. Fenner It is certified that error appears in the above-identified patent and that said Letters Patent is hereby corrected as shown below:

Column 3,
Lines 28-40, should be deleted and the following inserted:
-- (1) Sorted Tables. The keys are sorted by some rule which allows a particular search strategy (e.g., binary search) to locate the key. Associated with the key location is a pointer to the data.
  (2) Tree Structures. Parts of the key field are used to traverse a tree data structure to a leaf node which holds the data or a pointer to the data.
  (3) Hashing. Some arithmetic function is applied to the key which compresses the key field into a chosen integer range which is the initial directory size. This integer is the index into the directory which usually contains a pointer to the data. --.

Column 27,
Line 51, after "circuit" insert -- 601 (FIG. 6) --.
Line 67, before "methods" insert -- two --.

Column 28,
Line 1, after "2-4" insert -- and 6, respectively --.

Column 44,
Line 17, "a a" should be changed to -- a --.

Column 45,
Line 40, "the the" should be changed to -- the --.

Column 46,
Line 28, "receive" should be changed to -- receiver --.

Signed and Sealed this

Eleventh Day of October, 2005

JON W. DUDAS
*Director of the United States Patent and Trademark Office*

(12) EX PARTE REEXAMINATION CERTIFICATE (6581st)
United States Patent
Fenner

(10) Number: US 6,819,670 C1
(45) Certificate Issued: *Dec. 23, 2008

(54) DATA PACKET ROUTING FOR MOBILE NETWORKS

(75) Inventor: Peter R. Fenner, Dallas County, TX (US)

(73) Assignee: 4 Eagle Magic, LLC, Richardson, TX (US)

Reexamination Request:
No. 90/007,970, Mar. 9, 2006

Reexamination Certificate for:
Patent No.: 6,819,670
Issued: Nov. 16, 2004
Appl. No.: 09/227,688
Filed: Jan. 8, 1999

(*) Notice: This patent is subject to a terminal disclaimer.

Certificate of Correction issued Oct. 11, 2005.

Related U.S. Application Data

(63) Continuation of application No. 08/174,361, filed on Dec. 28, 1993, now Pat. No. 5,860,136, which is a continuation-in-part of application No. 07/952,988, filed on Sep. 29, 1992, now Pat. No. 5,490,258, which is a continuation-in-part of application No. 07/737,147, filed on Jul. 29, 1991, now abandoned, which is a continuation-in-part of application No. 07/367,012, filed on Jun. 16, 1989, now Pat. No. 5,095,480.

(51) Int. Cl.
*H04J 3/24* (2006.01)
*H04L 12/28* (2006.01)

(52) U.S. Cl. .................. 370/392; 370/349; 370/400
(58) Field of Classification Search .................. None
See application file for complete search history.

(56) References Cited

U.S. PATENT DOCUMENTS

| | | |
|---|---|---|
| 3,355,556 A | 11/1967 | Chaney |
| 3,678,391 A | 7/1972 | Gough |
| 3,906,445 A | 9/1975 | Beckmann et al. |
| 3,979,733 A | 9/1976 | Fraser |
| 3,987,251 A | 10/1976 | Texler et al. |
| 3,988,544 A | 10/1976 | Texler et al. |
| 4,040,023 A | 8/1977 | Curtis et al. |
| 4,112,257 A | 9/1978 | Frost |
| 4,168,401 A | 9/1979 | Molleron et al. |
| 4,233,473 A | 11/1980 | Frost |
| 4,276,643 A | 6/1981 | Laprie et al. |
| 4,287,592 A | 9/1981 | Paulish et al. |

(Continued)

FOREIGN PATENT DOCUMENTS

| | | |
|---|---|---|
| EP | 0255767 A2 | 10/1988 |
| FR | 2513472 A | 3/1983 |
| GB | 2189112 A | 10/1987 |
| GB | 2193861 | 2/1988 |

OTHER PUBLICATIONS

Karn, P., "TCP/IP: A Proposal For Amateur Packet Radio Levels 3 and 4," Jan. 1, 1998, pp. 4.62–4.68, Radio Amateur Satellite Corporation.

(Continued)

*Primary Examiner*—Majid A. Banankhah

(57) ABSTRACT

To provide fast access times with very large key fields, an associative memory utilizes a location addressable memory and lookup table to generate from a key the address in memory storing an associated record. The lookup tables, stored in memory, are constructed with the aid of arithmetic data compression methods to create a near perfect hashing of the keys. For encoding into the lookup table, keys are divided into a string of symbols. Each valid and invalid symbol is assigned an index value, such that the sum of valid index values for symbols of a particular key is a unique value that is used as an address to the memory storing the record associated with that key, and the sum of keys containing invalid index values point to a location in memory containing similar data. Utilizing the lookup tables set and relational operations maybe carried out that provide a user with a maximum number of key records resulting from a sequence of intersection, union and mask operations.

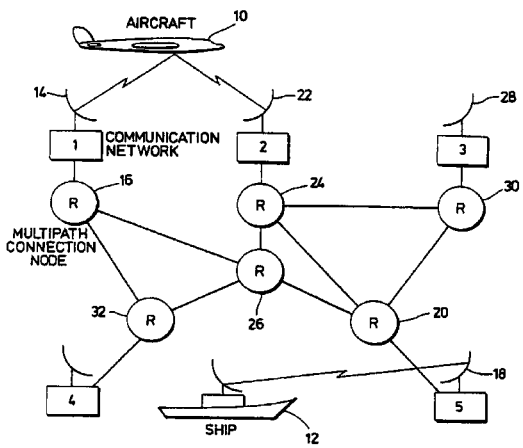

U.S. PATENT DOCUMENTS

| | | |
|---|---|---|
| 4,313,035 A | 1/1982 | Jordan et al. |
| 4,480,328 A | 10/1984 | Alaria et al. |
| 4,494,230 A | 1/1985 | Turner |
| 4,513,175 A | 4/1985 | Smith |
| 4,519,068 A | 5/1985 | Krebs et al. |
| 4,547,877 A | 10/1985 | Lehman et al. |
| 4,565,903 A | 1/1986 | Riley |
| 4,597,078 A | 6/1986 | Kempf |
| 4,603,416 A | 7/1986 | Servel et al. |
| 4,606,002 A | 8/1986 | Waisman et al. |
| 4,627,052 A | 12/1986 | Hoare et al. |
| 4,644,351 A | 2/1987 | Zabarsky et al. |
| 4,658,416 A | 4/1987 | Tanaka |
| 4,661,951 A | 4/1987 | Segarra |
| 4,706,081 A | 11/1987 | Hart et al. |
| 4,707,827 A | 11/1987 | Bione et al. |
| 4,715,030 A | 12/1987 | Koch et al. |
| 4,720,855 A | 1/1988 | Ohnishi et al. |
| 4,736,363 A | 4/1988 | Aubin et al. |
| 4,737,953 A | 4/1988 | Koch et al. |
| 4,740,954 A | 4/1988 | Cotton et al. |
| 4,742,511 A | 5/1988 | Johnson |
| 4,751,728 A | 6/1988 | Treat |
| 4,756,020 A | 7/1988 | Fodale |
| 4,769,834 A | 9/1988 | Billinger et al. |
| 4,775,999 A | 10/1988 | Williams |
| 4,776,003 A | 10/1988 | Harris |
| 4,791,665 A | 12/1988 | Bogart |
| 4,792,753 A | 12/1988 | Iwai |
| 4,797,881 A | 1/1989 | Ben-Artzi |
| 4,807,222 A | 2/1989 | Amitay |
| 4,811,337 A | 3/1989 | Hart |
| 4,812,843 A | 3/1989 | Champion, III et al. |
| 4,831,620 A | 5/1989 | Conway et al. |
| 4,831,647 A | 5/1989 | D'Avello et al. |
| 4,833,701 A | 5/1989 | Comroe |
| 4,843,622 A | 6/1989 | Yotsutani et al. |
| 4,845,740 A | 7/1989 | Tokuyama et al. |
| 4,860,003 A | 8/1989 | DeLuca et al. |
| 4,860,336 A | 8/1989 | D'Avello et al. |
| 4,860,341 A | 8/1989 | D'Avello et al. |
| 4,865,432 A | 9/1989 | Aoyagi et al. |
| 4,866,431 A | 9/1989 | Andros et al. |
| 4,866,763 A | 9/1989 | Cooper et al. |
| 4,870,679 A | 9/1989 | Hanna et al. |
| 4,875,208 A | 10/1989 | Furuhashi et al. |
| 4,876,738 A | 10/1989 | Selby |
| 4,887,265 A | 12/1989 | Felix |
| 4,896,319 A | 1/1990 | Lidinsky et al. |
| 4,905,231 A | 2/1990 | Leung et al. |
| 4,912,756 A | 3/1990 | Hop |
| 4,916,691 A | 4/1990 | Goodman |
| 4,922,503 A | 5/1990 | Leone |
| 4,933,937 A | 6/1990 | Konishi |
| 4,953,162 A | 8/1990 | Lyons et al. |
| 4,975,906 A | 12/1990 | Takiyaso et al. |
| 4,989,204 A | 1/1991 | Shimizu et al. |
| 5,050,165 A | 9/1991 | Yoshioka et al. |
| 5,095,480 A | 3/1992 | Fenner |
| 5,168,498 A | 12/1992 | Adams et al. |
| 5,365,520 A | 11/1994 | Wang et al. |
| 5,490,258 A | 2/1996 | Fenner |
| 5,561,706 A | 10/1996 | Fenner |
| 5,842,224 A | 11/1998 | Fenner |
| 5,860,136 A | 1/1999 | Fenner |
| 6,819,670 B1 | 11/2004 | Fenner |
| 2005/0063382 A1 | 3/2005 | Fenner |

OTHER PUBLICATIONS

Brayer, K., "Routing in a Mobile Network—Fact or Fantasy," Data Communications, Aug. 1, 1983, pp. 145–159, Mitre Corporation; Bedford, MA.

"DECnet Digital Network Architecture routing layer functional specification," May 1, 1983, pp. 2–94 + Appendix A–2 through I–5, Digital Equipment Corporation; Maynard, MA.

Oran, D., "Digital Network Architecture Phase V Seminar," Jan. 1, 1988, pp. 1–38.

Finn, G., "Routing and Addressing Problems in Large Metropolitan–Scale Internetworks," Mar. 1, 1987, pp. 1–61, Information Sciences Institute; Marina del Rey, CA.

Hawe, B., et al., Transparent Interconnection of Local Area Networks with Bridges, Jun. 1, 1984, pp. 116–130, Computer Science Press, Inc.

Sincoskie, W., "Transparent Interconnection of Broadcast Networks," Mar. 11, 1986, pp. 131–134, Bell Communication Research; Morristown, NJ.

Sincoskie, W., et al., "Extended Bridge Algorithms for Large Networks," Jan. 1, 1988, pp. 16–24, vol. 2, No. 1, IEEE Network.

Su, Zaw–Sing, et al., "Internetwork Accommodation of Network Dynamics: Naming and Addressing," Oct. 30, 1984, pp. 686–690, SRI International; Menlo Park, CA.

Sunshine, C., et al., Addressing Mobile Hosts in the ARPA Internet Environment, Mar, 1, 1980, pp. 1–6, USC–ISI.

Sunshine, C. et al.; "Interconnection of Broadband Local Area Networks"; Jan. 1, 1983, pp. 25–32, Sytek, Inc., Culver City, CA.

Wecker, S.; DNA, "The Digital Network Architecture," Apr. 1, 1980, pp. 510–526, Digital Equipment Corporation; Maynard, MA.

"AX.25 Amateur Packet–Radio Link–Layer Protocol," Version 2.0, Oct. 1, 1984; pp. 1–35.

Bertsekas, D., "Dynamic Behavior of Shortest Path Routing Algorithms for Communication Networks," Feb. 1, 1982, pp. 60–74, vol. AC–27, No. 1, IEEE Transaction on Automatic Control.

Braden, R. et al., "A Distributed Approach to the Interconnection of Heterogeneous Computer Networks," Jan. 1, 1983, pp. 254–259, Univ. College London, London, UK.

Brayer, Kenneth, "An Adaptive Computer Communications Network Designed with Decentralized Control," Jan. 1, 1983, IEEE Communications Magazine.

Cassel, L., et al., "Network Management Architectures and Protocols: Problems and Approaches," Sep. 1, 1989, pp. 1104–1114, vol. 7, No. 7, IEEE Journal of Selected Areas in Communications.

Cerf, V. et al., "The DoD Internet Architecture Model," Jan. 1, 1983, pp. 307–318, Elsevier Science Publishers B.V. (North Holland).

Cerf, V., et al., "A Protocol for Packet Network Intercommunication," May 1, 1984, pp. 637–648, vol. Com–22, No. 5, Transactions on Communications.

Davies, B., et al., "The Application of Packet Switching Techniques to Combat Net Radio," Jan. 1, 1987, pp. 43–55, vol. 75, No. 1, Proceedings of the IEEE.

Detreville, J., et al., "A Distributed Experimental Communications System," Dec. 1, 1983, pp. 1070–1075, vol. SAC–1, No. 6, IEE Journal on Selected Areas in Communications.

Estrin, D., "Inter–Organization Networks: Implicaitons of Access Control Requirements for Interconnection Protocols," Jan. 1, 1986, pp. 254–264, Univ. Southern California, Los Angeles, CA.

Estrin, D., et al. "Visa Protocols for Controlling Interorganizational Datagram Flow," May 1, 1989, pp. 486–498, vol. 7, No. 4, IEEE Journal on Selected Areas of Communications.

Fifer, W., et al., "The Low–Cost Packet Radio," Jan. 1, 1987, pp. 33–42, vol. 75, No. 1, Proceedings of the IEEE.

Frankel, M., "Telecommunications and Processing for Military Command and Control: Meeting User Needs in the Twenty–First Century," Jul. 1, 1984, pp. 18–25, vol. 22, No. 7, IEEE Communications Magazine.

Frankel, M., "Advanced Technology Testbeds for Distributed, Survivable Command, Control and Communications," Jan. 1, 1982, pp. 10.2–1 to 10.2.13, SRI International, Menlo Park, CA.

Frankel, M., et al., "An Overview of the Army/DARPA Distributed Communications and Processing Experiment," Mar. 1, 1986, pp. 207–215, vol. SAC–4, No. 2, IEEE Journal of Selected Areas in Communications.

Friedman, E., et al., "Packet Voice Communications Over PC–Based Local Area Networks," Feb. 1, 1989, pp. 211–218, vol. 7, No. 2, IEEE Journal of Selected Areas in Communications.

Gonsalves, T., et al., "On the Performance Effects of Station Locations and Access Protocol Parameters in Ethernet Networks," Apr. 1, 1988, pp. 441–449, vol. 36, No. 4, IEEE Transaction on Communications.

Heggestad, H., "An Overview of Packet–Switching Communications," Apr. 1, 1984, pp. 24–31, vol. 22, No. 4, IEEE Communications Magazine.

Sunshine, C., "Addressing Problems in Multi–Network Systems," Apr. 1981, pp. 1–22 + cites, IEN 178, Univ. of So. California, Marina del Rey, CA.

Sunshine, C., et al., "Comments on Rosen's Memos," Jul. 1981, pp. 1–9, Internet Experiment Note: 191.

Sunshine, C., "Comments on NBS Transport Protocol Proposal," Aug. 1981, pp. 1–9, Internet Experiment Note: 195, Information Sciences Institute, Univ. of So. California.

Sunshine, C., "Protocol Specification and Verification Work at USC/ISI," Summary Report, Aug. 1982, 10 pages, Internet Experiment Note: 211.

Clark, David, et al., "A Proposal for Addressing and Routing in the Internet," Jun. 1978, pp. 1–12, Internet Notebook Section 2.3.3.15, IEN No. 46.

Jubin, J., et al., "The DARPA Packet Radio Network Protocols," Jan. 1987, pp. 21–32, vol. 75, No. 1, Proceedings of the IEEE.

Khanna, A., et al., "The Revised ARPANET Routing Metric," Jan. 1987, pp. 45–56, BBN Communications Corporation, Cambridge, MA.

Leiner, B., et al., "The DARPA Internet Protocol Suite," Mar. 1985, pp. 29–34, vol. 23, No. 3, IEEE Communications Magazine.

Postel, J., "Internework Protocol Approaches," Jan. 1980, pp. 604–611, vol. COM–28, No. 4, IEEE Transactions on Communications.

Hardwick, K., et al., "Internet Protocol on Network Systems HYPERchannel Protocol Specification," Request for Comments: 1044, Feb. 1988, pp. 1–43, Network Working Group, NASA–Ames, GE.

Mockapetris, P., "Domain Names—Concepts and Facilities," Request for Comments: 1034, Obsoletes, RFCs 882 883, 973, Nov. 1987, pp. 1–55, ISI, Network Working Group.

Mockapetris, P., "Domain Names—Implementation and Specification," Request for Comments: 1035, Obsoletes RFCs 882, 883, 973, Nov. 1987, pp. 1–55, ISI, Network Working Group.

Hedrick, C., "Routing Information Protocol," Request for Comments: 1058, Jun. 1988, pp. 1–33, Rutgers University, Network Working Group.

Braden, R., "Requirements for Internet Hosts—Communication Layers," Request for Comments: 1122, Oct. 1989, pp. 1–116, Internet Engineering Task Force.

Hinden, R., "The DARFA Internet Gateway," Request for Comments: 823, Obsoletes IEN–30 and IEN–109, Sep. 1982, pp. 1–43, Bolt Baranet and Newman, Inc., Cambridge, MA.

Hornig, C., "A Standard for the Transmission of IP Datagrams over Ethernet Networks," Request for Comments: 894, Apr. 1984, pp. 1–3, Symbolics Cambridge Research Center.

Postel, J., et al.., "A Standard for the Transmission of IP Datagrams over IEEE 802 Networks," Request for Comments: 1042, Obsoletes RFC–948, Feb. 1988, pp. 1–15, Symbolics Cambridge Research Center.

Shacham, N. et al., "Speech Transport in Packet–Radio Networks with Mobile Nodes," IEEE Journal on Selected Areas in Communications, Dec. 1983, pp. 1084–1097, vol. SAC–1, No. 6.

Teraoka, F., et al., "Muse–IP: A Network Layer Protocol for Large Distributed Systems with Mobile Hosts," Jan. 1989 (estimated), pp. 1–10, Sony Computer Science Laboratory Inc., Tokyo, Japan.

Tobagi, F., et al., "Packet Radio and Satellite Networks," IEEE Communications Magazine, Nov. 1984, pp. 24–40, vol. 22, No. 11.

Tsudik, G., "Datagram Authentication in Internet Gateways: Implications of Fragmentation and Dynamic Routing," IBEE Journal on Selected Areas of Communications, May 1989, vol. 7, No. 4.

Verjinski, R. "PHASE, A Portable Host Access System Environment," Jan. 1, 1989, McLean, VA.

Weinstein, C., et al., "Experience With Speech Communication In Packet Networks," IBEE Journal on Selected Areas of Communications, vol. SAC–1, No. 6, Dec. 1983.

Zimmerman, H., "OSI Reference Model–the ISO Model of Architecture for Open Systems Interconnection," IBEE Transactions on Communications, Apr. 1980, vol. COM–28, No. 4.

Callendar, M., "International Standards for Personal Communications," 1989, pp. 722–728, British Columbia, Canada.

Cox, D., "Universal Digital Portable Radio Communications," IEEE, Apr. 1987, pp. 436–477, vol. 75, No. 4.

Cox, D., et al., "Universal Digital Portable Communications: A System Perspective," IEEE Journal on Selected Areas in Communications, Jun. 1987, pp. 764–773, vol. SAC–5, No. 5.

Gilmour, J., et al., "Intelligent Network/2: The Architecture, The Technical Challenges, The Opportunities," IEEE Communications Magazine, Dec. 1988, pp. 8–11.

Cheriton, D., et al., "A Multicast Extension to the Internet Protocol," Apr. 7, 1985, presented at the end2end Services Task Force, Apr. 1985.

Ennis, G., "Routing Tables Locate Resources in Bridged Broadband Networks," Systems & Software, Mar. 1983, copyright by Hayden Publishing Co., Inc.

Ennis, G., "Upper Level Protocols for Broadband Local Networks," Jan. 1, 1983, Systek, Incorporated, Mountain View, CA.

Ennis, G., et al., "Overview of a Broad–Band Local Area Network Protocol Architecture," IEEE Journal on Selected Areas of Communications, vol. _, No. _, Nov. 1983, 10 pages.

Deering, S., "Host Extensions for IP Multicasting," Network Working Group, RFC 988, Jul. 1986.

Xerox System Integration Standard: Internet Transport Protocols, XSIS 028112, Dec. 1981, Stamford, CT.

Backes, F., "Transparent Bridges for Interconnection of IEEE 802 LANs," IEEE Network, The Magazine of Computer Communications, Jan. 1988, vol. 2, No. 1.

Mann, W., et al., forthcoming publications from USC/Information Sciences Institute, Apr. 1987, Marina del Rey, CA.

Network, The Magazine of Computer Communications, Jan. 1988, vol. 2, No. 1.

NTIS—"Addressing for Mobile Subscribers in a Packet–Switching Multi–Network Environment," Air Force Inst. of Tech., Wright–Patterson AFB, Oh. School of Engineering, Dec. 1984, U.S. Dept. of Commerce, National Technical Information Service.

Sunshine, C., "Addressing Problems in Multi–Network Systems," 1982 IEEE, University of Southern California, Marina del Rey, CA.

Sunshine, C., et al., "Interconnection of Broadband Local Area Networks," 1983 ACM, Systek, Inc., Culver City, CA.

"Information Processing Systems—Open Systems Interconnection—Internal Organization Of The Network Layer," ISO 8648, UDC 681.327.8.01, 1st Edition, Feb. 15, 1988, pp. 1–31.

Ludwig, G., et al., "Saturation Routing Network Limits," Proceedings of the IEEE, Sep. 1977, pp. 1353–1362, vol. 65, No. 9.

Merlin, P., et al., "A Failsafe Distributed Routing Protocol," Sep. 1977 and revised May 1978, EE Pub. No. 313, pp. 1–73, Haifa, Israel.

Oppen, D., et al., "The Clearinghouse: A Decentralized Agent For Locating Named Objects In A Distributed Environment," ACM Transactions On Office Information Systems, Jul. 1983, pp. 230–253, vol. 1, No. 2.

Evenchik, L., et al., "MATNET—An Experimental Navy Shipboard Satellite Communications Network," Proceedings: Infocom 1982, IEEE Computer Society, pp. 1–11, Los Alamitos, CA.

Callon, R., et al., "Guidelines For The Use of Internet–IP Addresses In The ISO Connectionless–Mode Network Protocol," Feb. 1989, pp. 1–10, Network Working Group RFC 1069.

"Final Text of DIS 8473, Protocol For Providing The Connectionless–mode Network Service," Dec. 1986 and Mar. 1986, pp. 1–52, Network Working Group RFC 994, ANSI X393.3 86–80, ISO TC97/SC6/N 3998, USA.

"End System To Intermediate System Routing Exchange Protocol For Use In Conjunction With ISO 8473," Dec. 1986 and Apr. 1986, pp. 1–41, Network Working Group RFC 995, ANSI x393.3 86–118, ISO TC97/SC6/N 4053, USA.

Dalal, Y., "The Information Outlet: A New Tool For Office Organization," OPD–T8104, Oct. 1981, pp. 1–8, Xerox Corporation, Palo Alto, CA.

Effelsberg, W., et al.; "Principles of Database Buffer Management", ACM Transactions on Database Systems, vol. 9, No. 4, Dec. 1984, pp. 560–595.

ARRL Amateur Radio—Computer Networking Conferences 1–4, Pioneer Papers on Packet Radio 1981–1984, The American Radio Relay League, Newington, C.

Plummer, "An Ethernet Address Resolution Protocol—or—Converting Network Protocol Addresses to 48.bit Ethernet Address for Transmission on Ethernet Hardware," Nov. 1982, RFC 826.

Dalal, et al., "48–bit Absolute Internet and Ethernet Host Numbers," Seventh Data Communications Symposium, Mexico City, Oct. 1981, pp. 1–14.

Chen, W., et al., "The Strongly Connecting Problem on Multihop Packet Radio Networks," IEEE Transactions on Communications, vol. 37, No. 3, Mar. 1989.

Communications of the ACM, Jul. 1984, vol. 27, No. 7.

Mogul, J., "Simple and Flexible Datagram Access Controls for Unix–based Gateways," USENIX, Summer 1989, pp. 203–221.

Chien, E.S.K., et al., "Cellular Access Digital Network (CADN): Wireless Access to Networks of the Future," ICEE Communications Magazine, Jun. 1987, pp. 22–31, vol. 25, No. 6.

Parr, G., "A More Tolerant Approach to Address Resolution for a Multi–LAN System of Ethernets," May 1998; pp. 1–16; University of Ulster (Network Working Group Request for Comments: 1029).

Nakassis, A., "Fletcher's Error Detection Algorithm: How to Implement It Efficiently and How to Avoid the Most Common Pitfalls," pp. 63–75, Gaithersburg, MD (This paper is a revised version of an NBS report given at the NBS/OSI workshop of Sep. 1985, and released in Jan. 1986).

Murata, M., et al., "Two–Layer Modeling for Local Area Networks," IEEE Transactions on Communications, vol. 36, No. 9, Sep. 1988, pp. 10220–1034, vol. 36, No. 9.

ISO 8348; Addendum 2—Network Layer Addressing, "Information Processing Systems—Data Communications—Network Service Definition," Published Mar. 15, 1988; Ref. No. ISO 8348: 1987/Add. 2: 1988(E); pp. 1–19.

Woodside, C.M., et al., "The Effect of Buffering Strategies on Protocol Execution Performance," IEE Transactions on Communications, Jun. 1989, pp. 545–554, vol. 37, No. 6.

Fiber Data Communication Newsletter, May 1989, pp. 5 and 7.

Cohn, M., "U.S. Navy Safenet Lightweight Protocol Selection," Transfer, May 1988, pp. 7–9.

Chesson, G., et al., "XTP Protocol Definition, Revision 3.0," Protocol Engine, PEI 88–12, Jan. 1, 1998 (estimated).

Fenner, P., "Large Array Signal and Noise Analysis; Traveltime Analysis for LASA," Special Scientific Report No. 15, Texas Instruments, Inc. Dallas Science Services Div, Dec. 20, 1967.

Fenner, P., "Iterative Techniques for the Solution of Frequency–Domain Filter Sets Large–Array Signal and Noise Analysis," Special Scientific Report No. 16, Texas Instruments, Inc. Dallas Science Services Div, Mar. 22, 1968.

Bartee, T., et al., "C31 Local Area Networks—An Assessment," IDA Paper P–1715, Jun. 1983, pp. 1–60, Institute for Defense Analyses Science and Technology Division, Alexandria, VA.

Shanmugan, K., et al., "A Packet Communication Network Synthesis and Analysis System," ST*AR Corporation, RADC–TR–86–139 Final Technical Report, Aug. 1986, pp. 1–122.

Olsen, D., "Multinetwork Controller Architecture Specification," for the Advanced Technology Demonstration, Code 854, Naval Ocean Systems Center, Aug. 2, 1988 (Unclassified) UNT Library #230–U–0005, Version 1.

Warner, C., "UNT Operational Concepts for The Advanced Technology Demonstration (Draft)," Aug. 25, 1988, 45 pages, NOSC, Code 8503, Unified Networking Technology Program Office.

Prepared by Tracor Applied Sciences, "Unified Networking Technology Program Master Test Plan (Draft)," Sep. 20, 1988, pp. i–10(1), Delivery Order 0137, Contract No. N00421–87–D–0021, CDRL A003, San Diego, CA.

Gutman, L., et al., "UHF LOS Network Architecture Specification," 250–U–0002, Jun. 1, 1988, pp. 1–148, NOSC Code 8503, UNT Program Office (prepared by NOSC Code 854).

"System Design and Software Specification for the High Frequency Intratask Force Communication System (Draft)," HF ITF Software Spec, 1989 (estimated), pp. 1–41.

Parr, G., "A More Fault Tolerant Approach To Address Resolution For A Multi–Law System of Ethernet," Network Working Group Request for Comments: 1029, May 1988, pp. 1–17, University of Ulster.

Estrin, D., "Interconnection Protocols For Interorganization Networks," IEEE Journal on Selected Areas in Communications, vol. 5AC–5, No. 9, Dec. 1987, pp. 1480–1491.

Tsudik, G., "Implications Of Fragmentation And Dynamic Routing For Internet Datagram Authentication," pp. 23–30, 1988 (estimated), Networks and Distributed Systems Laboratory, Computer Science Dept., Univ. of So. California, CA.

Tsuchiya, P., "The Landmark Hierarchy: A New Hierarchy For Routing In Very Large Networks," ACM, Jan. 1988, pp. 35–42.

Scoch, J., "Inter–Network Naming, Addressing, And Routing," Paper 2.3.1, pp. 185–192, Palo Alto, CA (reprinted from IEEE Proc. Compcon, pp. 72–79, 1978).

Kleinrock, L., et al., "Hierarchical Routing For Large Networks," Paper 2.2.2, Jan. 1977, pp. 81–99, Univ. of California, Los Angeles, CA (reprinted from Computer Networks, vol. I, pp. 155–174, Jan. 1977).

Cercone, N., et al., "Minimal And Almost Minimal Perfect Hash Function Search With Application To Natural Language Lexicon Design," 1983, pp. 215–232, vol. 9, No. 1, Pergamon Press Ltd., Burnaby, BC Canada.

Introduction to the Internet Protocols, Routing—Chapter 6, 1989 (estimated) (2 pages).

Langdon Jr., G., "An Introduction To Arithmetic Coding," IBM RES Develop, Mar. 1984, pp. 135–149, vol. 28, No. 2.

Fenner, P., "Design For Real–Time Directory Access Technique," Lightbus Technology, Inc., Jun. 9, 1989, pp. 1–23, Richardson, TX.

Fenner, P., "Final Technical Report For Addressing Techniques For Navy Traffic In A Multimedia Environment," Jan. 24, 1989, pp. 1–36 plus Appendix, Lightbus Technology, Inc., Richardson, TX (prepared under Contract No. N66001–89–C–7044 for the Naval Ocean Systems Center).

Topkis, D., "A k Shortest Path Algorithm For Adaptive Routing In Communications Networks," IEEE Transactions on Communications, Jul. 1988, pp. 855–859, vol. 36, No. 7.

Orda, A., et al., "Routing With Packet Duplication And Elimination In Computer Networks," IEEE Transactions on Communications, Jul. 1988, pp. 860–866, vol. 36, No. 7.

Information Sciences Institute, "Internet Protocol DARPA Internet Program Protocol Specification," Sep. 1981, pp. 1–45, Marina del Ray, CA (prepared for DARPA).

Partial article on "truncated reverse path broadcasting (TRPB)," 1988 (estimated), pp. 60–64.

Backes, F., (Partial article on I.Spanning tree bridges Transparent bridges for interconnection of IEEE 802 LANS), IEEE Network, Jan. 1988, pp. 5–9, vol. 2, No. 1.

DECnet Digital Network Architecture (Phase IV) General Description booklet, No. AA–N149A–TC, May 1982, Ditigal Equipment Corporation.

Johnson, D., et al., "A Multifunction Operations System For New Market Applications," Record (AT&T Bell Laboratories), Sep. 1985, 2 pages.

Barshefsky, A., et al., "Building Quality Software For The Celllular Radio System," Record (AT&T Bell Laboratories), 61(7), 1983, pp. 34–42.

Johnson, D., et al., "Multifunction Operations System Support for Cellular Networks," IEEE International Conference on Communications, Conference Record vol. 3 of 3, Sep. 1985, pp. 1342–1354.

Lai, W., "Packet Forwarding," IEEE Communications Magazine, Jul. 1988, pp. 8–27, vol. 26, No. 7 (ISSN 0163–6804).

Parr, G., "Address Resolution For An Intelligent Filtering Bridge Running On A Subnetted Ethernet System", Institute of Informatics, Computer Science Dept., University of Ulster at Coleraine, County Londonderry, N. Ireland, 1987 (estimated), pp. 48–70.

Perlman, R., "Internet Routing And The Network Partition Problem", IEN #120, PRTN #279, Oct. 1979, pp. 1–11.

Sakayama, L., "New Directions For Cellular Engineering And Operations Tools", 37th IEEE Vehicular Technology Conference, IEEE, Jun. 1–Mar. 1987, pp. 464–467.

Witten, I., et al, "Arithmetic Coding For Data Compression," Communications of the ACM, Jun. 1987, pp. 520–540, vol. 30, No. 6.

Narten, T., "Internet Routing," Association for Computing Machinery, 1989, pp. 271–282.

Kline, C, et al, "Time–Out Mechanism in the Host–Host Protocol," Request for Comments: 142, May 3, 1971, pp. 1–2.

Sluizer, S., et al, "Mail Transfer Protocol: ISI TIOS20 MTP–NIMAIL Interface," Request for Comments: 786, Jul. 1981, pp. 1–2.

Postel, J., "Assigned Numbers," Request for Comments: 790, Obsoletes IEN: 127, 117, 93, Sep. 1981, pp. 1–15.

Information Sciences Institute, University of South California, "Internet Protocol DARPA Internet Program Protocol Specification," Request for Comments: 791, Sep. 1981, pp. 1–51.

"Final Text of DIS 8473, Protocol For Providing The Connectionless–mode Network Service," Request for Comments: 994, International Organization for Standardization, Mar. 1986, pp. 1–52.

"End System To Intermediate System Routing Exchange Protocol For Use In Conjunction With ISO 8473," Request for Comments: 995, International Organization for Standardization, Apr. 1986, pp. 1–41.

Callon, R., et al, "Guidelines For The Use Of Internet–IP Addresses In The ISO Connectionless–mode Network Protocol," Request for Comments: 1069, Obsoletes: RFC 986, Feb. 1989, pp. 1–10.

Head, C., "Intelligent Network: A Distributed System," IEEE Communications Magazine, Dec. 1988, pp. 16–20.

Bartee, T., et al, "C31 Information Systems Internetwork Study," Apr. 1984.

"C31 Internetwork Study," Defense Technical Information Center—DTIC, Defense Logistics Agency, Alexandria, VA, 2122D/LAN, 1984.

"Appendix H—Multimedia LAN Internetworking," pp. H–1, G–3/G–8, 2122D/LAN, 1984.

"Appendix G—Generic Gateways for LAN Interoperability," pp. G–1/G–2, "Appendix F—Remote Data Base Access Protocol," 1984, pp. F–1/F–8, E–3/E–4, 2122D/LAN, 1984.

"Appendix E—Networking and System Resource Managment Identified Protocols," pp. E–1/E–2, D–4., 2122D/LAN, 1984.

Appendix B—Some Improvements To The DOD Higher Layer Protocols, pp. A–4, V–36/V–46, R–1/R–2, Defense Technical Information Center—DTIC, 2085D/LAN, 1984.

Peleg, D., et al, "A Trade–Off Between Space And Efficiency For Routing Tables," J. ACM Jul. 1989, pp. 510–530, vol. 36, No. 1.

Milenkovic, M., "Working–Set Coprocessor," Technical Report 89–CSE–8, Dept. of Computer Science and Engineering, Southern Methodist University, Mar. 1989, pp. 1–30, Dallas, TX.

Eldon, W., et al, "LAN Interoperability Study Of Protocols Needed For Distributed Command And Control + Other Articles," RADC–TR–85–55, Final Technical Report, Mar. 1985, Def.

Deering, S., "Multicase Routing in Internetworks and Extended LANs," ACM, 1988, pp. 55–64.

Pitt, D., et al., "Table–Free Bridging," IEEE Journal on Selected Areas in Communications, pp. 1454–1462, vol. SAC–5, No. 9, IEEE.

Wong, J., et al., "Evaluation Of A Path–Finding Algorithm For Interconnected Local Area Networks," IEEE Journal on Selected Areas in Communications, Dec. 1987, pp. 1463–1470, vol. SAC–5, No. 9, IEEE.

Information Sciences Institute, University of Southern California, "DARPA Internet Program Protocol Specification," Request For Comment: 791, DARPA, Sep. 1981, pp. 1–53, Arlington, VA.

Diersing, R., et al., "Packet Radio In The Amateur Satellite Service," IEE Journal on Selected Areas in Communications, Feb. 1989, pp. 226–234, vol. 7. No. 2.

Chepponis, M., et al., "The KISS TNC: A Simple Host–to–TNC: Communications Protocol," presented at the AARL 6th Computer Networking Conference, Redondo Beach, CA 1987 (7 pages).

Karn, P., "Addressing And Routing Issues In Amateur Packet Radio," Radio Amateur Satellite Corporation, Sep. 1985, pp. 4.69–4.72.

Karn, P., et al., "Packet Radio In The Amateur Service," IEEE Journal on Selected Areas in Communication, pp. 431–439, May 1985, vol. Sac–3, No. 3.

Karn, P., et al., "Improving Round–Trip Time Estimates In Reliable Transport Protocols," Proceedings of the ACM Sigcomm 1987, Aug. 11–13, 1987, pp. 2–7 (pp. 2–9 attached).

McQuillan, J. et al, "The New Routing Algorithm for the Arpanet," IEEE Transactions on Communication, May 1980, pp. 711–719.

Abrahamson, "An Adaptive Dependency Source Model for Data Compression", Communications of the ACM, vol. 32, Jan. 1989, pp. 77–83.

Rissanen et al., "A Multiplication–Free Multialphabet Arithmetic Code", IEEE, vol. 37, No. 2, Feb. 1989, pp. 93–98.

Kam, "Beyond Level Two, High–level networking comes to packet radio", 73 Amateur Radio, Aug. 1986, 4 pages.

Karn, "Bellcore Internet", IEEE, Bell Communications Research, 1985, 1 page.

Memorandum Opinion and Order, *Fenner Investments* v. *Juniper Networks, Inc., et al.* Civil Action No. 2:05–CV–05–LED, 32 pages.

Alcatel USA, Inc.'s Preliminary Invalidity Contentions, *Fenner Investments* v. *Juniper Networks, Inc., et al.* Civil Action No. 2:05–CV–05–LED, 200 pages.

Cisco Systems, Inc.'s Preliminary Invalidity Contentions, *Fenner Investments* v. *Juniper Networks, Inc., et al.* Civil Action No. 2:05–CV–05–LED, 339 pages.

Ericsson's Preliminary Invalidity Contentions, *Fenner Investments* v. *Juniper Networks, Inc., et al.* Civil Action No. 2:05–CV–05–LED, 301 pages.

Juniper Networks, Inc.s, Preliminary Invalidity Contentions, *Fenner Investments* v. *Juniper Networks, Inc., et al.* Civil Action No. 2:05–CV–05–LED, 226 pages.

Lucent's Preliminary Invalidity Contentions, *Fenner Investments* v. *Juniper Networks, Inc., et al.* Civil Action No. 2:05–CV–05–LED, 141 pages.

Lucent's Supplemental Preliminary Invalidity Contentions, *Fenner Investments* v. *Juniper Networks, Inc., et al.* Civil Action No. 2:05–CV–05–LED, 75 pages.

Nokia, Inc.'s , Preliminary Invalidity Contentions, *Fenner Investments* v. *Juniper Networks, Inc., et al.* Civil Action No. 2:05–CV–05–LED, 95 pages.

Nortel Networks, Inc.'s, Preliminary Invalidity Contentions, *Fenner Investments* v. *Juniper Networks, Inc., et al.* Civil Action No. 2:05–CV–05–LED,291 pages.

UTStarcom, Inc.'s Preliminary Invalidity Contentions, *Fenner Investments* v. *Juniper Networks, Inc., et al.* Civil Action No. 2:05–CV–05–LED, 108 pages.

U.S. Appl. No. 07/737,147, Fenner, (abandoned).

W. David Sincoskie and Charles J. Cotton, "Extended Bridge Algorithms for Large Networks," IEEE Networks, vol. 2, No. 1, Jan. 1988.

C. Sunshine and J. Postel, "Addressing Mobile Hosts in the ARPA Internet Environment," IEN 135, Mar. 1980.

C. Sunshine, D. Kaufman, G. Ennis, K. Biba, "Interconnection of broadband local area networks," Proceedings of 8th Data Communications Symposium, p. 25–32, Oct. 3–6, 1983, North Falmouth, Massachusetts.

W.D. Sincoskie, "Transparent Interconnection of Broadcast Networks", Ditigal Communications, Proceedings of the International Seminar, Zurich, Switzerland, Mar. 11–13, 1986.

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 3, 5, 8, 12, 13 and 17 is confirmed.

Claims 1, 4, 6, 9–11 and 14 are cancelled.

Claims 2, 7, 15 and 16 are determined to be patentable as amended.

2. The method of claim [1] *3* wherein first IP address uniquely identifies the mobile source for routing data packets within public; interconnected networks.

7. The communication system of claim [6] *8* wherein the first IP address is a globally unique identifier.

15. The communication system of claim [14]*17*, wherein the at least one messaging handling node routes the data packet based on the entire IP address of the mobile receiver.

16. The communication system of claim [14] *17* wherein the IP address of the mobile receiver is a globally unique IP address.

* * * * *